US011937129B2

(12) United States Patent
Rico Alvarino et al.

(10) Patent No.: US 11,937,129 B2
(45) Date of Patent: Mar. 19, 2024

(54) OUT-OF-ORDER HANDLING WITHOUT FLOW CONTROL FEEDBACK

(71) Applicant: QUALCOMM Incorporated, San Diego, CA (US)

(72) Inventors: Alberto Rico Alvarino, San Diego, CA (US); Xiao Feng Wang, San Diego, CA (US); Seyedkianoush Hosseini, San Diego, CA (US); Liangping Ma, San Diego, CA (US); Ayan Sengupta, San Diego, CA (US); Bharat Shrestha, San Diego, CA (US); Jun Ma, San Diego, CA (US); Umesh Phuyal, San Diego, CA (US); Le Liu, Fremont, CA (US); Peter Gaal, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 115 days.

(21) Appl. No.: 17/224,531

(22) Filed: Apr. 7, 2021

(65) Prior Publication Data

US 2021/0321299 A1 Oct. 14, 2021

Related U.S. Application Data

(60) Provisional application No. 63/008,154, filed on Apr. 10, 2020, provisional application No. 63/007,308, filed on Apr. 8, 2020.

(51) Int. Cl.
*H04L 1/00* (2006.01)
*H04L 1/1812* (2023.01)
(Continued)

(52) U.S. Cl.
CPC .......... *H04W 28/12* (2013.01); *H04L 1/1819* (2013.01); *H04L 1/1822* (2013.01);
(Continued)

(58) Field of Classification Search
None
See application file for complete search history.

(56) References Cited

U.S. PATENT DOCUMENTS 11,323,902 B2 * 5/2022 Kwak ................. H04B 7/0626
2015/0049727 A1 2/2015 Wentink et al.
(Continued)

FOREIGN PATENT DOCUMENTS

GB 201812996 * 8/2018 ............. H04L 1/887
GB 2573577 A 11/2019
(Continued)

OTHER PUBLICATIONS

Huawei, et al., "Discussion on HARQ for NTN", 3GPP Draft, R1-1908050, 3GPP TSG RAN WG1 Meeting #98, 3rd Generation Partnership Project (3GPP), Mobile Competence Centre, 650, Route Des Lucioles, F-06921 Sophia-Antipolis Cedex, France, vol. RAN WG1. No. Prague. Czech Republic, Aug. 26, 2019-Aug. 30, 2019, Aug. 17, 2019 (Aug. 17, 2019), 5 Pages, XP051764673, Retrieved from the Internet: URL:http://www.3gpp.org/ftp/tsg_ran/WG1_RL1/TSGR1_98/Docs/R1-1908050.zip [retrieved on Aug. 17, 2019] p. 1-p. 4, figure 2.
(Continued)

*Primary Examiner* — Brandon M Renner
(74) *Attorney, Agent, or Firm* — Holland & Hart / Qualcomm

(57) ABSTRACT

Methods, systems, and devices for wireless communication are described. Generally, the described techniques provide for establishing rules for scheduling downlink data transmissions and flow control feedback for the downlink data transmissions to avoid confusion at a base station and a user equipment (UE). In one example, when flow control feedback from a UE is disabled for a downlink data transmission, the UE may still operate according to a timing for reporting flow control feedback for the downlink data transmission. In
(Continued)

this example, the UE may drop (e.g., refrain from decoding) other downlink data transmissions based on the timing for reporting flow control feedback. In another example, when flow control feedback from a UE is disabled for a downlink data transmission, other downlink data transmissions to the UE may be scheduled according to one or more rules to avoid confusion.

43 Claims, 25 Drawing Sheets

(51) Int. Cl.
| | |
|---|---|
| *H04L 1/1822* | (2023.01) |
| *H04L 1/1825* | (2023.01) |
| *H04L 1/1829* | (2023.01) |
| *H04L 1/1867* | (2023.01) |
| *H04W 28/12* | (2009.01) |
| *H04W 72/0446* | (2023.01) |
| *H04W 72/1273* | (2023.01) |
| *H04W 72/23* | (2023.01) |
| *H04W 72/50* | (2023.01) |
| *H04W 84/06* | (2009.01) |

(52) U.S. Cl.
CPC .......... *H04L 1/1825* (2013.01); *H04L 1/1854* (2013.01); *H04L 1/1887* (2013.01); *H04L 1/1896* (2013.01); *H04W 72/0446* (2013.01); *H04W 72/1273* (2013.01); *H04W 72/23* (2023.01); *H04W 72/535* (2023.01); *H04W 84/06* (2013.01)

(56) References Cited

U.S. PATENT DOCUMENTS

| | | | |
|---|---|---|---|
| 2015/0078270 A1* | 3/2015 | Seo | H04W 52/46 370/329 |
| 2018/0048432 A1 | 2/2018 | Sun et al. | |
| 2018/0205441 A1 | 7/2018 | Asterjadhi et al. | |
| 2019/0052416 A1 | 2/2019 | Babaei et al. | |
| 2019/0182830 A1* | 6/2019 | Chen | H04W 56/0005 |
| 2019/0306876 A1 | 10/2019 | Golitschek Edler Von Elbwart et al. | |
| 2019/0394009 A1* | 12/2019 | Yoshimoto | H04L 5/0094 |
| 2020/0229240 A1 | 7/2020 | Zhang et al. | |
| 2020/0328848 A1* | 10/2020 | He | H04L 1/1854 |
| 2020/0412485 A1* | 12/2020 | Wang | H04L 1/0081 |
| 2021/0007126 A1 | 1/2021 | Su et al. | |
| 2021/0274327 A1* | 9/2021 | Zhao | H04W 4/40 |
| 2021/0274492 A1 | 9/2021 | Yin et al. | |
| 2021/0321441 A1 | 10/2021 | Rico Alvarino et al. | |
| 2021/0385029 A1* | 12/2021 | Guo | H04W 72/20 |
| 2022/0022241 A1 | 1/2022 | Zhang et al. | |
| 2022/0030661 A1 | 1/2022 | Jeong et al. | |
| 2022/0045803 A1 | 2/2022 | Lin et al. | |
| 2022/0159674 A1 | 5/2022 | Deng et al. | |
| 2022/0191851 A1 | 6/2022 | Park et al. | |
| 2022/0279489 A1* | 9/2022 | Zhao | H04L 5/0053 |
| 2022/0294591 A1 | 9/2022 | Liu et al. | |

FOREIGN PATENT DOCUMENTS

| | | |
|---|---|---|
| WO | WO-2018201005 A1 | 11/2018 |
| WO | WO-2019157669 A1 | 8/2019 |
| WO | WO-2019160737 A1 | 8/2019 |
| WO | WO-2020065530 A1 | 4/2020 |

OTHER PUBLICATIONS

International Search Report and Written Opinion—PCT/US2021/026358—ISA/EPO—dated Jul. 15, 2021.

Mediatek Inc: "Delay-Tolerant Re-Transmission Mechanisms in NR-NTN", 3GPP Draft, 3GPP TSG RAN WG1 Meeting #97, R1-1906466-Mediatek-Delay-Tolerant Re-Transmission Mechanisms for NR-NTN, 3rd Generation Partnership Project (3GPP), Mobile Competence Centre, 650, Route Des Lucioles, F-06921 Sophia-Ant vol. RAN WG1, No. Reno, Nevada, USA, May 13, 2019-May 17, 2019, May 13, 2019 (May 13, 2019), XP051727916, 6 Pages, Retrieved from the Internet: URL:http://www.3gpp.org/ftp/Meetings%5F3GPP%5FSYNC/RAN1/Docs/R1%2D1906466%2Ezip [retrieved on May 13, 2019] p. 1-p. 6.

Huawei, et al., "Discussion on Disabling HARQ in NTN", 3GPP Draft, 3GPP TSG-RAN WG2 Meeting 107, R2-1911236, Discussion on Disabling HARQ in NTN, 3rd Generation Partnership Project (3GPP), Mobile Competence Centre, 650, Route Des Lucioles, F-06921 Sophia-Antipolis Cedex, France, vol. RAN WG2, No. Prague, Czech Republic, Aug. 26, 2019-Aug. 30, 2019, Aug. 16, 2019 (Aug. 16, 2019), XP051768996, 3 Pages, Retrieved from the Internet: URL: http://www.3gpp.org/ftp/tsg_ran/WG2_RL2/TSGR2_107/Docs/R2-1911236.zip. [retrieved on Aug. 16, 2019] Section 2.1 Section 2.2.

Mediatek Inc: "Summary Delay-Tolerant re-Transmission Mechanisms in NR-NTN", 3GPP Draft, 3GPP TSG RAN WG1 Meeting #96bis, R1-1905840, MEDIATEK-Summary Delay-Tolerant re-Transmission Mechanisms in NR-NTN, 3rd Generation Partnership Project (3GPP), Mobile Competence Centre, 650, Route Des Lucioles, F-06921 Sophia, vol. RAN WG1, No. Xian, China, Apr. 8, 2019-Apr. 12, 2019, Apr. 15, 2019 (Apr. 15, 2019), XP051707886, 7 Pages, Retrieved from the Internet: URL: http://www.3gpp.org/ftp/tsg%5Fran/WG1%5FRL1/TSGR1%5F96b/Docs/R1%2D1905840%2Ezip. [retrieved on Apr. 15, 2019] Section 4.

OPPO: "Discussion on CG and SPS in NTN", 3GPP Draft, 3GPP TSG-RAN WG2 Meeting #108, R2-1915166, 3rd Generation Partnership Project (3GPP), Mobile Competence Centre, 650, Route Des Lucioles, F-06921 Sophia-Antipolis Cedex, France, vol. RAN WG2, No. Reno, USA, Nov. 18, 2019-Nov. 22, 2019, Nov. 8, 2019 (Nov. 8, 2019), XP051817062, 3 Pages, Retrieved from the Internet: URL: https://ftp.3gpp.org/tsg_ran/WG2_RL2/TSGR2_108/Docs/R2-1915166.zip. R2-1915166.doc [retrieved on Nov. 8, 2019] Section 1 Section 2.

* cited by examiner

OUT-OF-ORDER HANDLING WITHOUT FLOW CONTROL FEEDBACK

CROSS REFERENCE

The present application for patent claims the benefit of U.S. Provisional Patent Application No. 63/008,154 by RICO ALVARINO et al., entitled "OUT-OF-ORDER HANDLING WITHOUT FLOW CONTROL FEEDBACK," filed Apr. 10, 2020, and to U.S. Provisional Patent Application No. 63/007,308 by RICO ALVARINO et al., entitled "INDICATING ORIGINAL DATA COMMUNICATIONS" filed Apr. 8, 2020, each of which are assigned to the assignee hereof, and expressly incorporated by reference herein.

INTRODUCTION

The following relates generally to wireless communications and more specifically to managing data transmissions with and without flow control feedback.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

A method for wireless communication at a UE is described. The method may include receiving, from a base station, a first downlink data transmission and a second downlink data transmission, the first downlink data transmission preceding the second downlink data transmission, where the first downlink data transmission and the second downlink data transmission are associated with a same flow control feedback process and decoding or refraining from decoding the second downlink data transmission based on flow control feedback being disabled for the flow control feedback process.

An apparatus for wireless communication at a UE is described. The apparatus may include a processor, and memory coupled to the processor. The processor and memory may be configured to receive, from a base station, a first downlink data transmission and a second downlink data transmission, the first downlink data transmission preceding the second downlink data transmission, where the first downlink data transmission and the second downlink data transmission are associated with a same flow control feedback process and decode or refrain from decoding the second downlink data transmission based on flow control feedback being disabled for the flow control feedback process.

Another apparatus for wireless communication at a UE is described. The apparatus may include means for receiving, from a base station, a first downlink data transmission and a second downlink data transmission, the first downlink data transmission preceding the second downlink data transmission, where the first downlink data transmission and the second downlink data transmission are associated with a same flow control feedback process and means for decoding or refraining from decoding the second downlink data transmission based on flow control feedback being disabled for the flow control feedback process.

A non-transitory computer-readable medium storing code for wireless communication at a UE is described. The code may include instructions executable by a processor to receive, from a base station, a first downlink data transmission and a second downlink data transmission, the first downlink data transmission preceding the second downlink data transmission, where the first downlink data transmission and the second downlink data transmission are associated with a same flow control feedback process and decode or refrain from decoding the second downlink data transmission based on flow control feedback being disabled for the flow control feedback process.

Some examples of the method, apparatuses, and non-transitory computer-readable medium described herein may further include operations, features, means, or instructions for decoding or refraining from decoding the second downlink data transmission based on whether the second downlink data transmission may be scheduled within or after a threshold amount of time after the first downlink data transmission.

Some examples of the method, apparatuses, and non-transitory computer-readable medium described herein may further include operations, features, means, or instructions for refraining from decoding the second downlink data transmission based on the second downlink data transmission being scheduled within the threshold amount of time after the first downlink data transmission.

Some examples of the method, apparatuses, and non-transitory computer-readable medium described herein may further include operations, features, means, or instructions for decoding the second downlink data transmission based on the second downlink data transmission being scheduled after the threshold amount of time after the first downlink data transmission.

In some examples of the method, apparatuses, and non-transitory computer-readable medium described herein, the first downlink data transmission and the second downlink data transmission include a same transport block.

In some examples of the method, apparatuses, and non-transitory computer-readable medium described herein, the threshold amount of time may be based on a numerology used for the first downlink data transmission, the second downlink data transmission, or both.

In some examples of the method, apparatuses, and non-transitory computer-readable medium described herein, the threshold amount of time is based at least in part on a number of symbols for the first downlink data transmission, a number of symbols for the second downlink data transmission, a demodulation reference signal (DMRS) pattern associated with the first downlink data transmission, a DMRS pattern associated with the second downlink data transmission, or a processing capability of the UE, or a combination thereof.

Some examples of the method, apparatuses, and non-transitory computer-readable medium described herein may further include operations, features, means, or instructions for decoding the second downlink data transmission regardless of when the second downlink data transmission may be scheduled and regardless of a timing for reporting the flow control feedback for the second downlink data transmission.

In some examples of the method, apparatuses, and non-transitory computer-readable medium described herein, the UE and the base station may be operating in a non-terrestrial network (NTN).

Some examples of the method, apparatuses, and non-transitory computer-readable medium described herein may further include operations, features, means, or instructions for receiving downlink control information (DCI) scheduling the first downlink data transmission and the second downlink data transmission.

A method for wireless communication at a base station is described. The method may include transmitting a first downlink data transmission and a second downlink data transmission to a UE, the first downlink data transmission preceding the second downlink data transmission, where the first downlink data transmission and the second downlink data transmission are associated with a same flow control feedback process and transmitting the second downlink data transmission based on flow control feedback being disabled for the flow control feedback process.

An apparatus for wireless communication at a base station is described. The apparatus may include a processor, and memory coupled to the processor. The processor and memory may be configured to transmit a first downlink data transmission and a second downlink data transmission to a UE, the first downlink data transmission preceding the second downlink data transmission, where the first downlink data transmission and the second downlink data transmission are associated with a same flow control feedback process and transmit the second downlink data transmission based on flow control feedback being disabled for the flow control feedback process.

Another apparatus for wireless communication at a base station is described. The apparatus may include means for transmitting a first downlink data transmission and a second downlink data transmission to a UE, the first downlink data transmission preceding the second downlink data transmission, where the first downlink data transmission and the second downlink data transmission are associated with a same flow control feedback process and means for transmitting the second downlink data transmission based on flow control feedback being disabled for the flow control feedback process.

A non-transitory computer-readable medium storing code for wireless communication at a base station is described. The code may include instructions executable by a processor to transmit a first downlink data transmission and a second downlink data transmission to a UE, the first downlink data transmission preceding the second downlink data transmission, where the first downlink data transmission and the second downlink data transmission are associated with a same flow control feedback process and transmit the second downlink data transmission based on flow control feedback being disabled for the flow control feedback process.

Some examples of the method, apparatuses, and non-transitory computer-readable medium described herein may further include operations, features, means, or instructions for determining that the flow control feedback may be disabled for the first downlink data transmission and transmitting DCI scheduling the second downlink data transmission after a threshold amount of time after the first downlink data transmission based on the flow control feedback being disabled for the first downlink data transmission.

In some examples of the method, apparatuses, and non-transitory computer-readable medium described herein, the first downlink data transmission and the second downlink data transmission include a same transport block.

Some examples of the method, apparatuses, and non-transitory computer-readable medium described herein may further include operations, features, means, or instructions for determining that the flow control feedback may be disabled for the first downlink data transmission and transmitting DCI scheduling the second downlink data transmission regardless of when the first downlink data transmission may be scheduled and regardless of a timing for reporting the flow control feedback for the second downlink data transmission.

In some examples of the method, apparatuses, and non-transitory computer-readable medium described herein, the UE and the base station may be operating in an NTN.

Some examples of the method, apparatuses, and non-transitory computer-readable medium described herein may further include operations, features, means, or instructions for transmitting DCI scheduling the first downlink data transmission and the second downlink data transmission.

A method for wireless communication at a UE is described. The method may include receiving, from a base station, DCI scheduling a downlink data transmission, the downlink data transmission associated with a flow control feedback process, decoding a first field in the DCI indicating that flow control feedback is disabled for the flow control feedback process, decoding a second field in the DCI associated with the flow control feedback process associated with the downlink data transmission, where decoding the second field is based on the first field indicating that the flow control feedback is disabled for the flow control feedback process, and refraining from transmitting the flow control feedback to the base station for the downlink data transmission based on the flow control feedback being disabled for the downlink data transmission, the flow control feedback being disabled based on the flow control feedback process being associated with the downlink data transmission.

An apparatus for wireless communication at a UE is described. The apparatus may include a processor, and memory coupled to the processor. The processor and memory may be configured to receive, from a base station, DCI scheduling a downlink data transmission, the downlink data transmission associated with a flow control feedback process, decode a first field in the DCI indicating that flow control feedback is disabled for the flow control feedback process, decode a second field in the DCI associated with the flow control feedback process associated with the downlink data transmission, where decoding the second field is based on the first field indicating that the flow control feedback is disabled for the flow control feedback process, and refrain from transmitting the flow control feedback to the base station for the downlink data transmission based on the flow control feedback being disabled for the downlink data transmission, the flow control feedback being disabled based on the flow control feedback process being associated with the downlink data transmission.

Another apparatus for wireless communication at a UE is described. The apparatus may include means for receiving, from a base station, DCI scheduling a downlink data transmission, the downlink data transmission associated with a flow control feedback process, means for decoding a first field in the DCI indicating that flow control feedback is disabled for the flow control feedback process, means for decoding a second field in the DCI associated with the flow control feedback process associated with the downlink data transmission, where decoding the second field is based on the first field indicating that the flow control feedback is disabled for the flow control feedback process, and means for refraining from transmitting the flow control feedback to the base station for the downlink data transmission based on the flow control feedback being disabled for the downlink data transmission, the flow control feedback being disabled based on the flow control feedback process being associated with the downlink data transmission.

A non-transitory computer-readable medium storing code for wireless communication at a UE is described. The code may include instructions executable by a processor to receive, from a base station, DCI scheduling a downlink data transmission, the downlink data transmission associated with a flow control feedback process, decode a first field in the DCI indicating that flow control feedback is disabled for the flow control feedback process, decode a second field in the DCI associated with the flow control feedback process associated with the downlink data transmission, where decoding the second field is based on the first field indicating that the flow control feedback is disabled for the flow control feedback process, and refrain from transmitting the flow control feedback to the base station for the downlink data transmission based on the flow control feedback being disabled for the downlink data transmission, the flow control feedback being disabled based on the flow control feedback process being associated with the downlink data transmission.

In some examples of the method, apparatuses, and non-transitory computer-readable medium described herein, the first field includes a flow control field.

In some examples of the method, apparatuses, and non-transitory computer-readable medium described herein, the second field includes a downlink assignment index (DAI) or transmit power control (TPC) field.

In some examples of the method, apparatuses, and non-transitory computer-readable medium described herein, the UE and the base station may be operating in an NTN.

A method for wireless communication at a base station is described. The method may include transmitting a first field in DCI indicating that flow control feedback is disabled for a flow control feedback process, where the DCI schedules transmission of downlink data and indicates that the downlink data is associated with the flow control feedback process and transmitting a second field in the DCI associated with the flow control feedback process associated with the downlink data.

An apparatus for wireless communication at a base station is described. The apparatus may include a processor, and memory coupled to the processor. The processor and memory may be configured to transmit a first field in DCI indicating that flow control feedback is disabled for a flow control feedback process, where the DCI schedules transmission of downlink data and indicates that the downlink data is associated with the flow control feedback process and transmit a second field in the DCI associated with the flow control feedback process associated with the downlink data.

Another apparatus for wireless communication at a base station is described. The apparatus may include means for transmitting a first field in DCI indicating that flow control feedback is disabled for a flow control feedback process, where the DCI schedules transmission of downlink data and indicates that the downlink data is associated with the flow control feedback process and means for transmitting a second field in the DCI associated with the flow control feedback process associated with the downlink data.

A non-transitory computer-readable medium storing code for wireless communication at a base station is described. The code may include instructions executable by a processor to transmit a first field in DCI indicating that flow control feedback is disabled for a flow control feedback process, where the DCI schedules transmission of downlink data and indicates that the downlink data is associated with the flow control feedback process and transmit a second field in the DCI associated with the flow control feedback process associated with the downlink data.

In some examples of the method, apparatuses, and non-transitory computer-readable medium described herein, the first field includes a flow control field.

In some examples of the method, apparatuses, and non-transitory computer-readable medium described herein, the second field includes a DAI or TPC field.

In some examples of the method, apparatuses, and non-transitory computer-readable medium described herein, the UE and the base station may be operating in an NTN.

A method for wireless communication at a UE is described. The method may include receiving, from a base station, a downlink data transmission, where flow control feedback is disabled for the downlink data transmission, refraining from reporting the flow control feedback for the downlink data transmission based on the flow control feedback being disabled for the downlink data transmission, receiving a second downlink data transmission scheduled after the downlink data transmission, the second downlink data transmission associated with a same flow control feedback process as the downlink data transmission, and refraining from decoding the second downlink data transmission based on the second downlink data transmission being received before a timing for reporting the flow control feedback to the base station for the downlink data transmission.

An apparatus for wireless communication at a UE is described. The apparatus may include a processor, and memory coupled to the processor. The processor and memory may be configured to receive, from a base station, a downlink data transmission, where flow control feedback is disabled for the downlink data transmission, refrain from reporting the flow control feedback for the downlink data transmission based on the flow control feedback being disabled for the downlink data transmission, receive a second downlink data transmission scheduled after the downlink data transmission, the second downlink data transmission associated with a same flow control feedback process as the downlink data transmission, and refrain from decoding the second downlink data transmission based on the second downlink data transmission being received before a timing for reporting the flow control feedback to the base station for the downlink data transmission.

Another apparatus for wireless communication at a UE is described. The apparatus may include means for receiving, from a base station, a downlink data transmission, where flow control feedback is disabled for the downlink data transmission, means for refraining from reporting the flow control feedback for the downlink data transmission based on the flow control feedback being disabled for the downlink data transmission, means for receiving a second downlink data transmission scheduled after the downlink data transmission, the second downlink data transmission associated with a same flow control feedback process as the downlink data transmission, and means for refraining from decoding the second downlink data transmission based on the second downlink data transmission being received before a timing for reporting the flow control feedback to the base station for the downlink data transmission.

A non-transitory computer-readable medium storing code for wireless communication at a UE is described. The code may include instructions executable by a processor to receive, from a base station, a downlink data transmission, where flow control feedback is disabled for the downlink data transmission, refrain from reporting the flow control feedback for the downlink data transmission based on the flow control feedback being disabled for the downlink data transmission, receive a second downlink data transmission scheduled after the downlink data transmission, the second downlink data transmission associated with a same flow control feedback process as the downlink data transmission, and refrain from decoding the second downlink data transmission based on the second downlink data transmission being received before a timing for reporting the flow control feedback to the base station for the downlink data transmission.

In some examples of the method, apparatuses, and non-transitory computer-readable medium described herein, the downlink data transmission scheduled by DCI, the DCI includes first DCI and the method, apparatuses, and non-transitory computer-readable medium may include further operations, features, means, or instructions for receiving second DCI scheduling a second downlink data transmission, determining that the second downlink data transmission may be scheduled after the downlink data transmission and the flow control feedback for the second downlink data transmission may be scheduled before the flow control feedback for the first downlink data transmission, and refraining from decoding the second downlink data transmission based on the determining.

Some examples of the method, apparatuses, and non-transitory computer-readable medium described herein may further include operations, features, means, or instructions for receiving, in DCI, an indication of the timing for reporting the flow control feedback to the base station for the downlink data transmission.

Some examples of the method, apparatuses, and non-transitory computer-readable medium described herein may further include operations, features, means, or instructions for receiving, in radio resource control (RRC) signaling, a set of multiple timings for reporting the flow control feedback to the base station for the downlink data transmission.

In some examples of the method, apparatuses, and non-transitory computer-readable medium described herein, identifying the timing may include operations, features, means, or instructions for selecting the timing for reporting the flow control feedback to the base station from the set of multiple timings in the RRC signaling.

In some examples of the method, apparatuses, and non-transitory computer-readable medium described herein, the selected timing may be a maximum, minimum, or a first timing of the set of multiple timings in the RRC signaling, or the selected timing of the set of multiple timings may be indicated by another parameter.

In some examples of the method, apparatuses, and non-transitory computer-readable medium described herein, the selected timing may be based on a flow control feedback round trip time (RTT) configured in the RRC signaling.

In some examples of the method, apparatuses, and non-transitory computer-readable medium described herein, the timing for reporting the flow control feedback to the base station for the downlink data transmission may be preconfigured at the UE.

In some examples of the method, apparatuses, and non-transitory computer-readable medium described herein, the timing for reporting the flow control feedback to the base station for the downlink data transmission may be based on a subcarrier spacing configured for the downlink data transmission.

In some examples of the method, apparatuses, and non-transitory computer-readable medium described herein, the UE and the base station may be operating in an NTN.

Some examples of the method, apparatuses, and non-transitory computer-readable medium described herein may further include operations, features, means, or instructions for receiving DCI scheduling the downlink data transmission.

A method for wireless communication at a base station is described. The method may include transmitting, to a UE, a downlink data transmission, where flow control feedback is disabled for the downlink data transmission and transmitting, to the UE, an indication of a timing for reporting the flow control feedback to the base station for the downlink data transmission with the flow control feedback being disabled for the downlink data transmission.

An apparatus for wireless communication at a base station is described. The apparatus may include a processor, and memory coupled to the processor. The processor and memory may be configured to transmit, to a UE, a downlink data transmission, where flow control feedback is disabled for the downlink data transmission and transmit, to the UE, an indication of a timing for reporting the flow control feedback to the base station for the downlink data transmission with the flow control feedback being disabled for the downlink data transmission.

Another apparatus for wireless communication at a base station is described. The apparatus may include means for transmitting, to a UE, a downlink data transmission, where flow control feedback is disabled for the downlink data transmission and means for transmitting, to the UE, an indication of a timing for reporting the flow control feedback to the base station for the downlink data transmission with the flow control feedback being disabled for the downlink data transmission.

A non-transitory computer-readable medium storing code for wireless communication at a base station is described. The code may include instructions executable by a processor to transmit, to a UE, a downlink data transmission, where flow control feedback is disabled for the downlink data transmission and transmit, to the UE, an indication of a timing for reporting the flow control feedback to the base station for the downlink data transmission with the flow control feedback being disabled for the downlink data transmission.

In some examples of the method, apparatuses, and non-transitory computer-readable medium described herein, transmitting the indication of the timing may include operations, features, means, or instructions for transmitting, in DCI, the indication of the timing for reporting the flow control feedback to the base station for the downlink data transmission.

In some examples of the method, apparatuses, and non-transitory computer-readable medium described herein, transmitting the indication of the timing may include operations, features, means, or instructions for transmitting, in RRC signaling, a set of multiple timings for reporting the flow control feedback to the base station for the downlink data transmission.

In some examples of the method, apparatuses, and non-transitory computer-readable medium described herein, the timing for reporting the flow control feedback to the base station for the downlink data transmission may be preconfigured at the base station.

In some examples of the method, apparatuses, and non-transitory computer-readable medium described herein, the timing for reporting the flow control feedback to the base station for the downlink data transmission may be based on a subcarrier spacing configured for the downlink data transmission.

In some examples of the method, apparatuses, and non-transitory computer-readable medium described herein, the UE and the base station may be operating in an NTN.

Some examples of the method, apparatuses, and non-transitory computer-readable medium described herein may further include operations, features, means, or instructions for transmitting DCI scheduling the downlink data transmission to the UE.

A method of wireless communication at a UE is described. The method may include receiving, from a base station, DCI scheduling a downlink data transmission, where flow control feedback is disabled for the downlink data transmission, identifying a timing for reporting flow control feedback to the base station for the downlink data transmission with flow control feedback being disabled for the downlink data transmission, and refraining from reporting flow control feedback for the downlink data transmission based on the flow control feedback being disabled for the downlink data transmission.

An apparatus for wireless communication at a UE is described. The apparatus may include a processor and memory coupled with the processor. The processor and memory may be configured to receive, from a base station, DCI scheduling a downlink data transmission, where flow control feedback is disabled for the downlink data transmission, identify a timing for reporting flow control feedback to the base station for the downlink data transmission with flow control feedback being disabled for the downlink data transmission, and refrain from reporting flow control feedback for the downlink data transmission based on the flow control feedback being disabled for the downlink data transmission.

Another apparatus for wireless communication at a UE is described. The apparatus may include means for receiving, from a base station, DCI scheduling a downlink data transmission, where flow control feedback is disabled for the downlink data transmission, identifying a timing for reporting flow control feedback to the base station for the downlink data transmission with flow control feedback being disabled for the downlink data transmission, and refraining from reporting flow control feedback for the downlink data transmission based on the flow control feedback being disabled for the downlink data transmission.

A non-transitory computer-readable medium storing code for wireless communication at a UE is described. The code may include instructions executable by a processor to receive, from a base station, DCI scheduling a downlink data transmission, where flow control feedback is disabled for the downlink data transmission, identify a timing for reporting flow control feedback to the base station for the downlink data transmission with flow control feedback being disabled for the downlink data transmission, and refrain from reporting flow control feedback for the downlink data transmission based on the flow control feedback being disabled for the downlink data transmission.

In some examples of the method, apparatuses, and non-transitory computer-readable medium described herein, the DCI may include operations, features, means, or instructions for receiving second DCI scheduling a second downlink data transmission, the second downlink data transmission associated with a same flow control feedback process as the first downlink data transmission, determining that the second downlink data transmission may be scheduled after the first downlink data transmission and before flow control feedback for the first downlink data transmission based on the identified timing, and refraining from decoding the second downlink data transmission based on the determining.

In some examples of the method, apparatuses, and non-transitory computer-readable medium described herein, the DCI may include operations, features, means, or instructions for receiving second DCI scheduling a second downlink data transmission, determining that the second downlink data transmission may be scheduled after the first downlink data transmission and flow control feedback for the second downlink data transmission may be scheduled before flow control feedback for the first downlink data transmission based on the identified timing, and refraining from decoding the second downlink data transmission based on the determining. Some examples of the method, apparatuses, and non-transitory computer-readable medium described herein may further include operations, features, means, or instructions for receiving, in the DCI, an indication of the timing for reporting flow control feedback to the base station for the downlink data transmission.

Some examples of the method, apparatuses, and non-transitory computer-readable medium described herein may further include operations, features, means, or instructions for receiving, in RRC signaling, a set of timings for reporting flow control feedback to the base station for the downlink data transmission. In some examples of the method, apparatuses, and non-transitory computer-readable medium described herein, identifying the timing may include operations, features, means, or instructions for selecting the timing for reporting flow control feedback to the base station from the set of timings in the RRC signaling. In some examples of the method, apparatuses, and non-transitory computer-readable medium described herein, the selected timing may be a maximum, minimum, or first timing of the set of timings in the RRC signaling, or the selected timing of the set of timings may be indicated by another parameter.

In some examples of the method, apparatuses, and non-transitory computer-readable medium described herein, the selected timing may be based on a flow control feedback RTT configured in the RRC signaling. In some examples of the method, apparatuses, and non-transitory computer-readable medium described herein, the timing for reporting flow control feedback to the base station for the downlink data transmission may be preconfigured at the UE. In some examples of the method, apparatuses, and non-transitory computer-readable medium described herein, the timing for reporting flow control feedback to the base station for the downlink data transmission may be based on a subcarrier spacing configured for the downlink data transmission. In some examples of the method, apparatuses, and non-transitory computer-readable medium described herein, the UE and the base station may be operating in a NTN.

A method of wireless communication at a base station is described. The method may include transmitting, to a UE, DCI scheduling a downlink data transmission to the UE, where flow control feedback is disabled for the downlink data transmission and transmitting, to the UE, an indication of a timing for reporting flow control feedback to the base station for the downlink data transmission with flow control feedback being disabled for the downlink data transmission.

An apparatus for wireless communication at a base station is described. The apparatus may include a processor and memory coupled with the processor. The processor and memory may be configured to transmit, to a UE, DCI scheduling a downlink data transmission to the UE, where flow control feedback is disabled for the downlink data transmission and transmit, to the UE, an indication of a timing for reporting flow control feedback to the base station for the downlink data transmission with flow control feedback being disabled for the downlink data transmission.

Another apparatus for wireless communication at a base station is described. The apparatus may include means for transmitting, to a UE, DCI scheduling a downlink data transmission to the UE, where flow control feedback is disabled for the downlink data transmission and transmitting, to the UE, an indication of a timing for reporting flow control feedback to the base station for the downlink data transmission with flow control feedback being disabled for the downlink data transmission.

A non-transitory computer-readable medium storing code for wireless communication at a base station is described. The code may include instructions executable by a processor to transmit, to a UE, DCI scheduling a downlink data transmission to the UE, where flow control feedback is disabled for the downlink data transmission and transmit, to the UE, an indication of a timing for reporting flow control feedback to the base station for the downlink data transmission with flow control feedback being disabled for the downlink data transmission.

In some examples of the method, apparatuses, and non-transitory computer-readable medium described herein, transmitting the indication of the timing may include operations, features, means, or instructions for transmitting, in the DCI, the indication of the timing for reporting flow control feedback to the base station for the downlink data transmission. In some examples of the method, apparatuses, and non-transitory computer-readable medium described herein, transmitting the indication of the timing may include operations, features, means, or instructions for transmitting, in RRC signaling, a set of timings for reporting flow control feedback to the base station for the downlink data transmission.

In some examples of the method, apparatuses, and non-transitory computer-readable medium described herein, the timing for reporting flow control feedback to the base station for the downlink data transmission may be preconfigured at the base station. In some examples of the method, apparatuses, and non-transitory computer-readable medium described herein, the timing for reporting flow control feedback to the base station for the downlink data transmission may be based on a subcarrier spacing configured for the downlink data transmission. In some examples of the method, apparatuses, and non-transitory computer-readable medium described herein, the UE and the base station may be operating in a NTN.

A method of wireless communication at a UE is described. The method may include receiving, from a base station, DCI scheduling a first downlink data transmission and a second downlink data transmission, the first downlink data transmission preceding the second downlink data transmission, determining whether flow control feedback is disabled for the first downlink data transmission, decoding the first downlink data transmission, and decoding or refraining from decoding the second downlink data transmission based on whether flow control feedback is disabled for the first downlink data transmission.

An apparatus for wireless communication at a UE is described. The apparatus may include a processor and memory coupled with the processor. The processor and memory may be configured to receive, from a base station, DCI scheduling a first downlink data transmission and a second downlink data transmission, the first downlink data transmission preceding the second downlink data transmission, determine whether flow control feedback is disabled for the first downlink data transmission, decode the first downlink data transmission, and decode or refraining from decoding the second downlink data transmission based on whether flow control feedback is disabled for the first downlink data transmission.

Another apparatus for wireless communication at a UE is described. The apparatus may include means for receiving, from a base station, DCI scheduling a first downlink data transmission and a second downlink data transmission, the first downlink data transmission preceding the second downlink data transmission, determining whether flow control feedback is disabled for the first downlink data transmission, decoding the first downlink data transmission, and decoding or refraining from decoding the second downlink data transmission based on whether flow control feedback is disabled for the first downlink data transmission.

A non-transitory computer-readable medium storing code for wireless communication at a UE is described. The code may include instructions executable by a processor to receive, from a base station, DCI scheduling a first downlink data transmission and a second downlink data transmission, the first downlink data transmission preceding the second downlink data transmission, determine whether flow control feedback is disabled for the first downlink data transmission, decode the first downlink data transmission, and decode or refraining from decoding the second downlink data transmission based on whether flow control feedback is disabled for the first downlink data transmission.

Some examples of the method, apparatuses, and non-transitory computer-readable medium described herein may further include operations, features, means, or instructions for determining that flow control feedback may be disabled for the first downlink data transmission, and decoding or refraining from decoding the second downlink data transmission based on whether the second downlink data transmission may be scheduled within or after a threshold amount of time after the first downlink data transmission. Some examples of the method, apparatuses, and non-transitory computer-readable medium described herein may further include operations, features, means, or instructions for determining that the second downlink data transmission may be scheduled within the threshold amount of time after the first downlink data transmission, and refraining from decoding the second downlink data transmission based on the second downlink data transmission being scheduled within the threshold amount of time after the first downlink data transmission.

Some examples of the method, apparatuses, and non-transitory computer-readable medium described herein may further include operations, features, means, or instructions for determining that the second downlink data transmission may be scheduled after the threshold amount of time after the first downlink data transmission, and decoding the second downlink data transmission based on the second downlink data transmission being scheduled after the threshold amount of time after the first downlink data transmission. In some examples of the method, apparatuses, and non-transitory computer-readable medium described herein, the first downlink data transmission and the second downlink data transmission may be associated with a same flow control feedback process or include a same transport block.

In some examples of the method, apparatuses, and non-transitory computer-readable medium described herein, the threshold amount of time may be based on a numerology used for the first downlink data transmission, the second downlink data transmission, or both. Some examples of the method, apparatuses, and non-transitory computer-readable medium described herein may further include operations, features, means, or instructions for determining that flow control feedback may be disabled for the first downlink data transmission, and decoding the second downlink data transmission regardless of when the second downlink data transmission may be scheduled and regardless of a timing for reporting flow control feedback for the second downlink data transmission. In some examples of the method, apparatuses, and non-transitory computer-readable medium described herein, the UE and the base station may be operating in a NTN.

A method of wireless communication at a base station is described. The method may include transmitting DCI scheduling a first downlink data transmission to a UE, identifying a second downlink data transmission for the UE, the first downlink data transmission preceding the second downlink data transmission, determining whether flow control feedback is disabled for the first downlink data transmission, and transmitting DCI scheduling the second downlink data transmission based on whether flow control feedback is disabled for the first downlink data transmission.

An apparatus for wireless communication at a base station is described. The apparatus may include a processor and memory coupled with the processor. The processor and memory may be configured to transmit DCI scheduling a first downlink data transmission to a UE, identify a second downlink data transmission for the UE, the first downlink data transmission preceding the second downlink data transmission, determine whether flow control feedback is disabled for the first downlink data transmission, and transmit DCI scheduling the second downlink data transmission based on whether flow control feedback is disabled for the first downlink data transmission.

Another apparatus for wireless communication at a base station is described. The apparatus may include means for transmitting DCI scheduling a first downlink data transmission to a UE, identifying a second downlink data transmission for the UE, the first downlink data transmission preceding the second downlink data transmission, determining whether flow control feedback is disabled for the first downlink data transmission, and transmitting DCI scheduling the second downlink data transmission based on whether flow control feedback is disabled for the first downlink data transmission.

A non-transitory computer-readable medium storing code for wireless communication at a base station is described. The code may include instructions executable by a processor to transmit DCI scheduling a first downlink data transmission to a UE, identify a second downlink data transmission for the UE, the first downlink data transmission preceding the second downlink data transmission, determine whether flow control feedback is disabled for the first downlink data transmission, and transmit DCI scheduling the second downlink data transmission based on whether flow control feedback is disabled for the first downlink data transmission.

Some examples of the method, apparatuses, and non-transitory computer-readable medium described herein may further include operations, features, means, or instructions for determining that flow control feedback may be disabled for the first downlink data transmission, and transmitting DCI scheduling the second downlink data transmission after a threshold amount of time after the first downlink data transmission based on the flow control feedback being disabled for the first downlink data transmission. In some examples of the method, apparatuses, and non-transitory computer-readable medium described herein, the first downlink data transmission and the second downlink data transmission may be associated with a same flow control feedback process or include a same transport block.

Some examples of the method, apparatuses, and non-transitory computer-readable medium described herein may further include operations, features, means, or instructions for determining that flow control feedback may be disabled for the first downlink data transmission, and transmitting DCI scheduling the second downlink data transmission regardless of when the first downlink data transmission may be scheduled and regardless of a timing for reporting flow control feedback for the second downlink data transmission. In some examples of the method, apparatuses, and non-transitory computer-readable medium described herein, the UE and the base station may be operating in a NTN.

A method of wireless communication at a UE is described. The method may include receiving, from a base station, DCI scheduling a downlink data transmission, identifying a flow control feedback process associated with the downlink data transmission, determining that flow control feedback is disabled for the downlink data transmission based on the flow control feedback process associated with the downlink data transmission, and refraining from transmitting flow control feedback to the base station for the downlink data transmission based on the determining.

An apparatus for wireless communication at a UE is described. The apparatus may include a processor and memory coupled with the processor. The processor and memory may be configured to receive, from a base station, DCI scheduling a downlink data transmission, identify a flow control feedback process associated with the downlink data transmission, determine that flow control feedback is disabled for the downlink data transmission based on the flow control feedback process associated with the downlink data transmission, and refrain from transmitting flow control feedback to the base station for the downlink data transmission based on the determining.

Another apparatus for wireless communication at a UE is described. The apparatus may include means for receiving, from a base station, DCI scheduling a downlink data transmission, identifying a flow control feedback process associated with the downlink data transmission, determining that flow control feedback is disabled for the downlink data transmission based on the flow control feedback process associated with the downlink data transmission, and refraining from transmitting flow control feedback to the base station for the downlink data transmission based on the determining.

A non-transitory computer-readable medium storing code for wireless communication at a UE is described. The code may include instructions executable by a processor to receive, from a base station, DCI scheduling a downlink data transmission, identify a flow control feedback process associated with the downlink data transmission, determine that flow control feedback is disabled for the downlink data transmission based on the flow control feedback process associated with the downlink data transmission, and refrain from transmitting flow control feedback to the base station for the downlink data transmission based on the determining.

In some examples of the method, apparatuses, and non-transitory computer-readable medium described herein, identifying the flow control feedback process may include operations, features, means, or instructions for decoding a first field in the DCI indicating that flow control feedback may be disabled for the flow control feedback process, and decoding a second field in the DCI indicating the flow control feedback process associated with the downlink data transmission, where decoding the second field may be based on the first field indicating that flow control feedback may be disabled for the flow control feedback process. In some examples of the method, apparatuses, and non-transitory computer-readable medium described herein, the first field includes a flow control field. In some examples of the method, apparatuses, and non-transitory computer-readable medium described herein, the second field includes a DAI or TPC field. In some examples of the method, apparatuses, and non-transitory computer-readable medium described herein, the UE and the base station may be operating in a NTN.

A method of wireless communication at a base station is described. The method may include identifying downlink data to transmit to a UE, determining to disable flow control feedback from the UE for the downlink data, identifying a flow control feedback process indicating that flow control feedback from the UE is disabled based on the determining, and transmitting DCI scheduling transmission of the downlink data and indicating that the downlink data is associated with the identified flow control feedback process.

An apparatus for wireless communication at a base station is described. The apparatus may include a processor and memory coupled with the processor. The processor and memory may be configured to identify downlink data to transmit to a UE, determine to disable flow control feedback from the UE for the downlink data, identify a flow control feedback process indicating that flow control feedback from the UE is disabled based on the determining, and transmit DCI scheduling transmission of the downlink data and indicating that the downlink data is associated with the identified flow control feedback process.

Another apparatus for wireless communication at a base station is described. The apparatus may include means for identifying downlink data to transmit to a UE, determining to disable flow control feedback from the UE for the downlink data, identifying a flow control feedback process indicating that flow control feedback from the UE is disabled based on the determining, and transmitting DCI scheduling transmission of the downlink data and indicating that the downlink data is associated with the identified flow control feedback process.

A non-transitory computer-readable medium storing code for wireless communication at a base station is described. The code may include instructions executable by a processor to identify downlink data to transmit to a UE, determine to disable flow control feedback from the UE for the downlink data, identify a flow control feedback process indicating that flow control feedback from the UE is disabled based on the determining, and transmit DCI scheduling transmission of the downlink data and indicating that the downlink data is associated with the identified flow control feedback process.

In some examples of the method, apparatuses, and non-transitory computer-readable medium described herein, transmitting DCI indicating that the downlink data may be associated with the identified flow control feedback process may include operations, features, means, or instructions for transmitting a first field in the DCI indicating that flow control feedback may be disabled for the flow control feedback process, and transmitting a second field in the DCI indicating the flow control feedback process associated with the downlink data. In some examples of the method, apparatuses, and non-transitory computer-readable medium described herein, the first field includes a flow control field. In some examples of the method, apparatuses, and non-transitory computer-readable medium described herein, the second field includes a DAI or TPC field. In some examples of the method, apparatuses, and non-transitory computer-readable medium described herein, the UE and the base station may be operating in a NTN.

DETAILED DESCRIPTION

Figure 1:
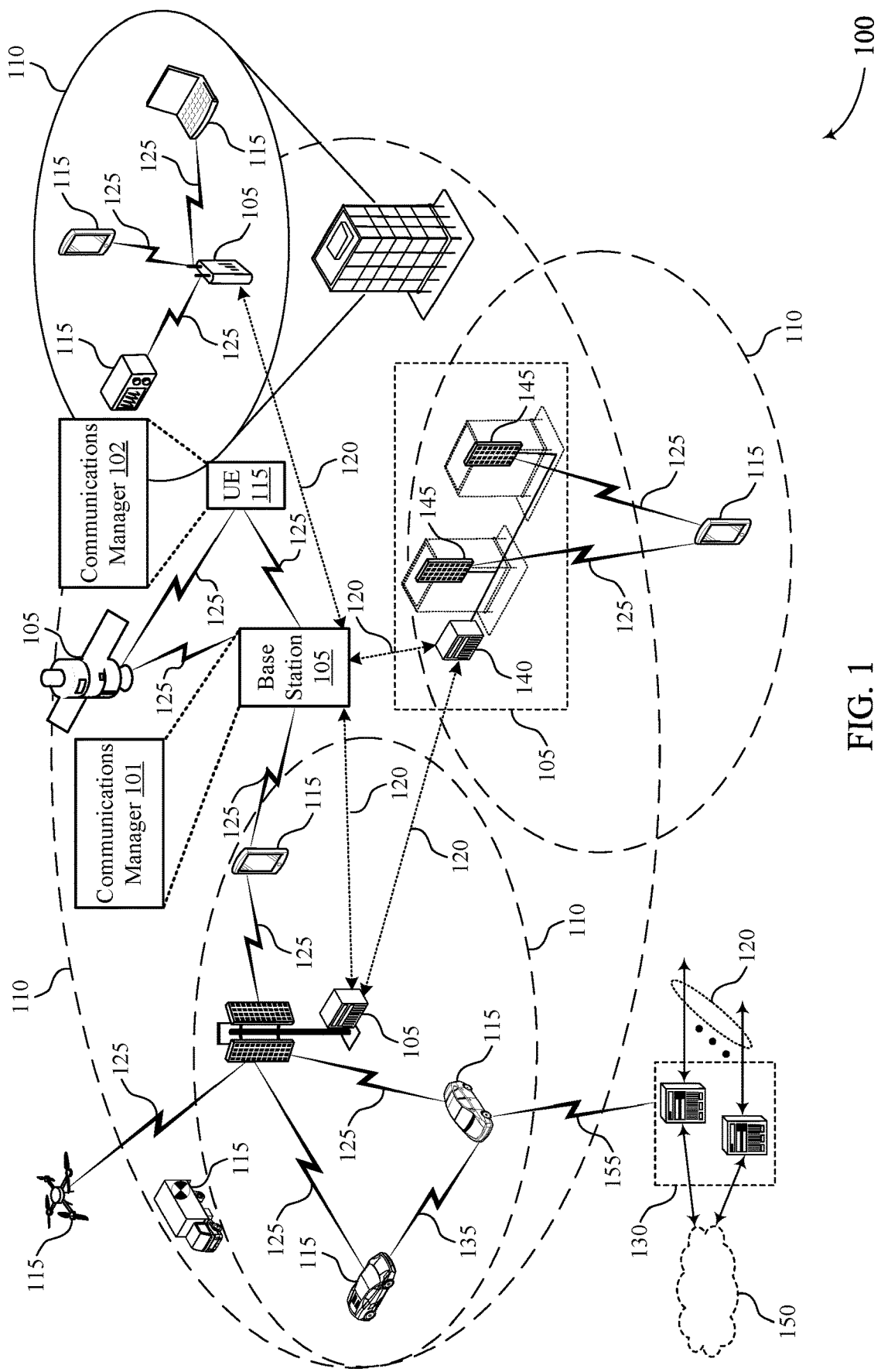
FIG. 1 illustrates an example of a wireless communications system that supports out-of-order handling without flow control feedback in accordance with one or more aspects of the present disclosure.

In some wireless communications systems, a base station may transmit data to a UE in multiple downlink data channels. In some cases, the UE may be configured to report flow control feedback (e.g., hybrid automatic repeat request (HARQ) feedback) to the base station for downlink data in a downlink data channel. The base station may use the flow control feedback to determine whether to schedule a retransmission of the downlink data (e.g., if the UE failed to receive the downlink data). Additionally, when a UE is configured to report flow control feedback to a base station for downlink data in multiple downlink data channels, a wireless communications system may establish rules to prevent confusion at the UE or the base station.

In one example, if a UE is scheduled for a first data transmission, such as a downlink data transmission (e.g., a first PDSCH transmission) or an uplink data transmission (e.g., a first physical uplink shared channel (PUSCH) transmission), the UE may not be expected to receive and/or transmit a second data transmission, such as a downlink data transmission (e.g., a second PDSCH transmission) or an uplink data transmissions (e.g., a second PUSCH transmission) before transmitting flow control feedback for the first downlink data transmission if the first downlink data transmission and the second downlink data transmission are associated with a same flow control feedback process. In another example, if a UE is scheduled for a first downlink data transmission, the UE may not be expected to receive a second downlink data transmission after the first downlink data transmission and report flow control feedback for the second downlink data transmission before reporting flow control feedback for the first downlink data transmission.

In these examples, when the base station receives flow control feedback, the base station may be able to identify that the flow control feedback is for the first downlink data transmission. That is, based on the rules described above, the base station may not misinterpret flow control feedback for one downlink data transmission as flow control feedback for another downlink data transmission. Because such confusion may be prevented, the base station may not mistakenly schedule retransmissions or avoid scheduling retransmissions for downlink data transmissions. In some cases, however, a UE may not be scheduled to report flow control feedback for downlink data transmissions, and the established rules described above that depend on the UE reporting flow control feedback may not be applicable.

As described herein a wireless communications system may support efficient techniques for facilitating downlink data transmissions and optional flow control feedback while avoiding confusion at a base station and a UE. In one example, when flow control feedback from a UE is disabled for a downlink data transmission, the UE may still operate according to a timing for reporting flow control feedback for the downlink data transmission. In this example, the UE may drop (e.g., refrain from decoding) other downlink data transmissions based on the timing for reporting flow control feedback. In another example, when flow control feedback from a UE is disabled for a downlink data transmission, other downlink data transmissions to the UE may be scheduled according to one or more rules to avoid confusion. In addition, a wireless communications system may support flow control feedback processes associated with disabled flow control feedback such that a UE may be able to identify when to refrain from reporting flow control feedback for a downlink data transmission.

Aspects of the disclosure introduced above are described below in the context of a wireless communications system. Examples of processes and signaling exchanges that support out-of-order handling without flow control feedback are then described. Aspects of the disclosure are further illustrated by and described with reference to apparatus diagrams, system diagrams, and flowcharts that relate to out-of-order handling without flow control feedback.

FIG. 1 illustrates an example of a wireless communications system 100 that supports out-of-order handling without flow control feedback in accordance with one or more aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through a communication link 155.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105 (e.g., on a physical uplink control channel (PUCCH) or a PUSCH), or downlink transmissions from a base station 105 to a UE 115 (e.g., on a physical downlink control channel (PDCCH) or a PDSCH). Carriers may carry downlink or uplink communications (e.g., in an FDD mode) or may be configured to carry downlink and uplink communications (e.g., in a TDD mode).

Signal waveforms transmitted over a carrier may be made up of multiple subcarriers (e.g., using multi-carrier modulation (MCM) techniques such as orthogonal frequency division multiplexing (OFDM) or DFT-S-OFDM). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

A base station 105 and a UE 115 may support communications using one or more numerologies on a carrier, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, such as in the range of 300 megahertz (MHz) to 300 gigahertz (GHz). The region from 300 MHz to 3 GHz may be known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. Flow control feedback is one technique for increasing the likelihood that data is received correctly over a communication link 125. An example of flow control feedback (i.e., feedback controlling the flow of communications between a base station 105 and a UE 115) is HARQ feedback. HARQ feedback may include an acknowledgment (ACK) indicating that a receiving device successfully decoded a transmission and a negative ACK (NACK) indicating that a receiving device failed to decode a transmission. HARQ may include a combination of error detection (e.g., using a cyclic redundancy check (CRC)), forward error correction (FEC), and retransmission (e.g., automatic repeat request (ARQ)). HARQ may improve throughput at the media access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In wireless communications system 100, a base station 105 may transmit data to a UE 115 in multiple PDSCHs. In some cases, the UE 115 may be configured to report flow control feedback to the base station 105 for downlink data in a PDSCH. The base station 105 may use the flow control feedback to determine whether to schedule a retransmission of the downlink data (e.g., if the UE 115 failed to receive the downlink data). In addition, when a UE 115 is configured to report flow control feedback to a base station 105 for downlink data in multiple PDSCHs, wireless communications system 100 may establish rules to prevent confusion at the UE 115 or the base station 105.

In one example, if a UE 115 is scheduled to receive a first PDSCH, the UE may not be expected to receive a second PDSCH before transmitting flow control feedback for the first PDSCH if the first PDSCH and the second PDSCH are associated with a same flow control feedback process. In another example, if a UE 115 is scheduled for a first PDSCH, the UE 115 may not be expected to receive a second PDSCH after the first PDSCH and report flow control feedback for the second PDSCH before reporting flow control feedback for the first PDSCH. In yet another example, for any PDSCH corresponding to a system information radio network temporary identifier (SI-RNTI), a UE 115 may not be expected to decode a retransmission of an earlier PDSCH with a starting symbol less than N symbols after the last symbol of that PDSCH, where the value of N depends on the PDSCH subcarrier spacing configuration. In some cases, a first transmission (e.g., PDSCH, feedback, or other transmission) precedes or is scheduled before a second transmission (e.g., PDSCH, feedback, or other transmission) if the first transmission starts before the second transmission (e.g., a starting symbol for the first transmission precedes a starting symbol for the second transmission).

In these examples, when the base station 105 receives flow control feedback, the base station 105 may be able to identify that the flow control feedback is for the first PDSCH. That is, based on the rules described above, the base station 105 may not misinterpret flow control feedback for one downlink data transmission (e.g., the first PDSCH) as flow control feedback for another downlink data transmission (e.g., the second PDSCH). Because such confusion may be prevented, the base station 105 may not mistakenly schedule retransmissions or avoid scheduling retransmissions for downlink data transmissions. In some cases, however, a UE 115 may not be configured to report flow control feedback for some PDSCHs (e.g., in an NTN), and the established rules described above that depend on the UE 115 reporting flow control feedback may not be applicable. Wireless communications system 100 may support efficient techniques for facilitating downlink data transmissions and optional flow control feedback while avoiding confusion at a base station 105 and a UE 115.

A base station 105 may include a communications manager 101. Communications manager 101 may transmit, to a UE 115, DCI scheduling a downlink data transmission to the UE, where flow control feedback is disabled for the downlink data transmission. Communications manager 101 may then transmit, to the UE, an indication of a timing for reporting flow control feedback to the base station 105 for the downlink data transmission with flow control feedback being disabled for the downlink data transmission.

Communications manager 101 may also transmit DCI scheduling a first downlink data transmission to a UE 115. The communications manager 101 may identify a second downlink data transmission for the UE 115, the first downlink data transmission preceding the second downlink data transmission. The communications manager 101 may determine whether flow control feedback is disabled for the first downlink data transmission and transmit DCI scheduling the second downlink data transmission based on whether flow control feedback is disabled for the first downlink data transmission.

Communications manager 101 may also identify downlink data to transmit to a UE and determine to disable flow control feedback from the UE for the downlink data. Communications manager 101 may identify a flow control feedback process indicating that flow control feedback from the UE is disabled based on the determining. The communications manager 101 may then transmit DCI scheduling transmission of the downlink data and indicating that the downlink data is associated with the identified flow control feedback process.

A UE 115 may include a communications manager 102. Communications manager 102 may receive, from a base station, DCI scheduling a downlink data transmission, where flow control feedback is disabled for the downlink data transmission. Communications manager 102 may identify a timing for reporting flow control feedback to the base station for the downlink data transmission with flow control feedback being disabled for the downlink data transmission. Communications manager 102 may refrain from reporting flow control feedback for the downlink data transmission based on the flow control feedback being disabled for the downlink data transmission.

Communications manager 102 may receive, from a base station, DCI scheduling a first downlink data transmission and a second downlink data transmission, the first downlink data transmission preceding the second downlink data transmission. Communications manager 102 may determine whether flow control feedback is disabled for the first downlink data transmission. Communications manager 102 may then decode the first downlink data transmission and decode or refrain from decoding the second downlink data transmission based on whether flow control feedback is disabled for the first downlink data transmission.

Communications manager 102 may receive, from a base station, DCI scheduling a downlink data transmission and identify a flow control feedback process associated with the downlink data transmission. Communications manager 102 may determine that flow control feedback is disabled for the downlink data transmission based on the flow control feedback process associated with the downlink data transmission and refrain from transmitting flow control feedback to the base station for the downlink data transmission based on the determining.

Figure 2:
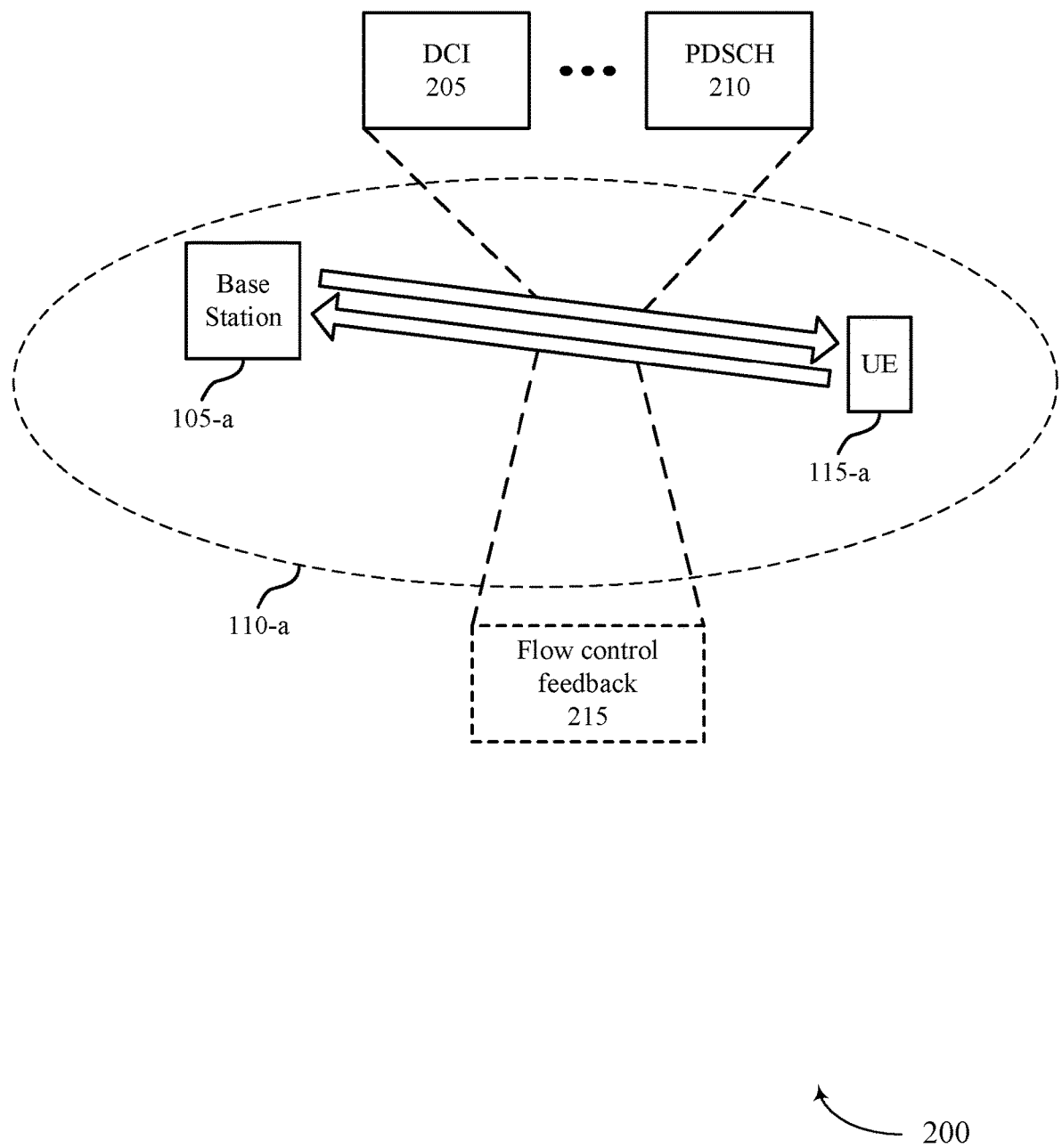
FIG. 2 illustrates an example of a wireless communications system that supports out-of-order handling without flow control feedback in accordance with one or more aspects of the present disclosure.

FIG. 2 illustrates an example of a wireless communications system 200 that supports out-of-order handling without flow control feedback in accordance with one or more aspects of the present disclosure. The wireless communications system 200 includes a UE 115-a, which may be an example of a UE 115 as described with reference to FIG. 1. The wireless communications system 200 may also include a base station 105-a, which may be an example of a base station 105 described with reference to FIG. 1. The base station 105-a may provide communication coverage for a coverage area 110-a. The wireless communications system 200 may implement aspects of wireless communications system 100. For example, the wireless communications system 200 may support efficient techniques for facilitating downlink data transmissions and optional flow control feedback while avoiding confusion at the base station 105-a and the UE 115-a.

In the example of FIG. 2, the base station 105-a may transmit DCI 205 to the UE 115-a scheduling a downlink data transmission in a PDSCH 210. However, flow control feedback 215 for the PDSCH 210 may be disabled. For example, the base station 105-a may not configure the UE 115-a to report flow control feedback 215 for the PDSCH 210. Thus, the base station 105-a and the UE 115-a may use the techniques described herein to facilitate the downlink data transmission in the PDSCH 210 and other downlink data transmissions in other PDSCHs while avoiding confusion at the base station 105-a and the UE 115-a (e.g., if another downlink data transmission in another PDSCH is scheduled). Further, the techniques described herein may allow for efficient pipelining at the UE 115-a (e.g., successively receiving PDSCHs and optionally reporting flow control feedback for the PDSCHs). Aspects of these techniques are described with reference to FIGS. 3 and 4.

Figure 3A:
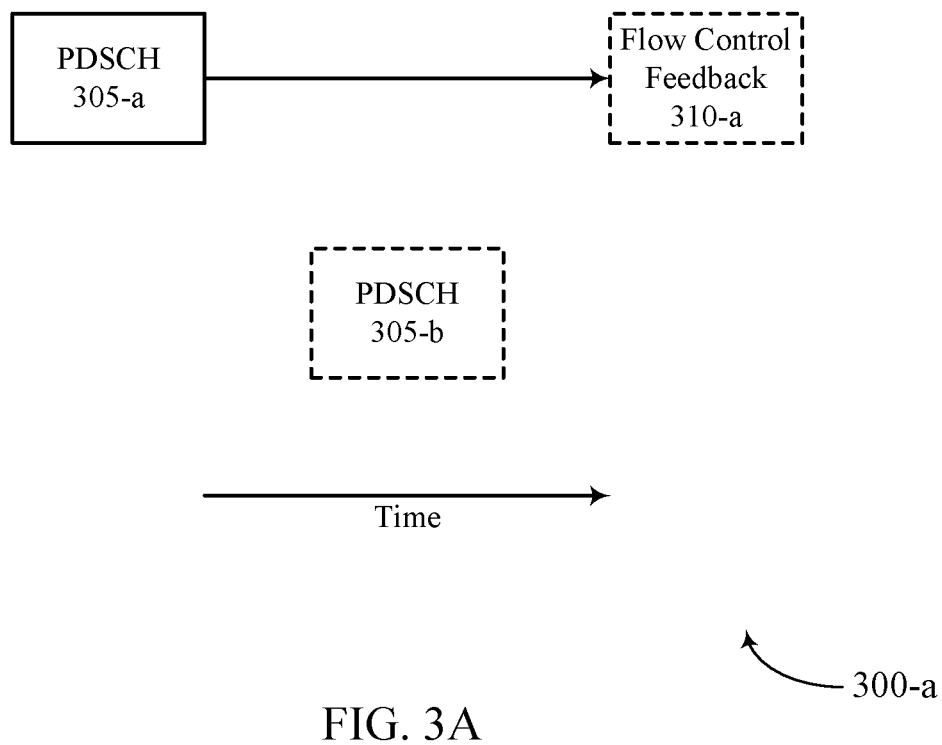
FIGS. 3A and 3B illustrate examples of block diagrams showing physical downlink shared channel (PDSCH) transmissions and flow control feedback in accordance with one or more aspects of the present disclosure.
Figure 3B:
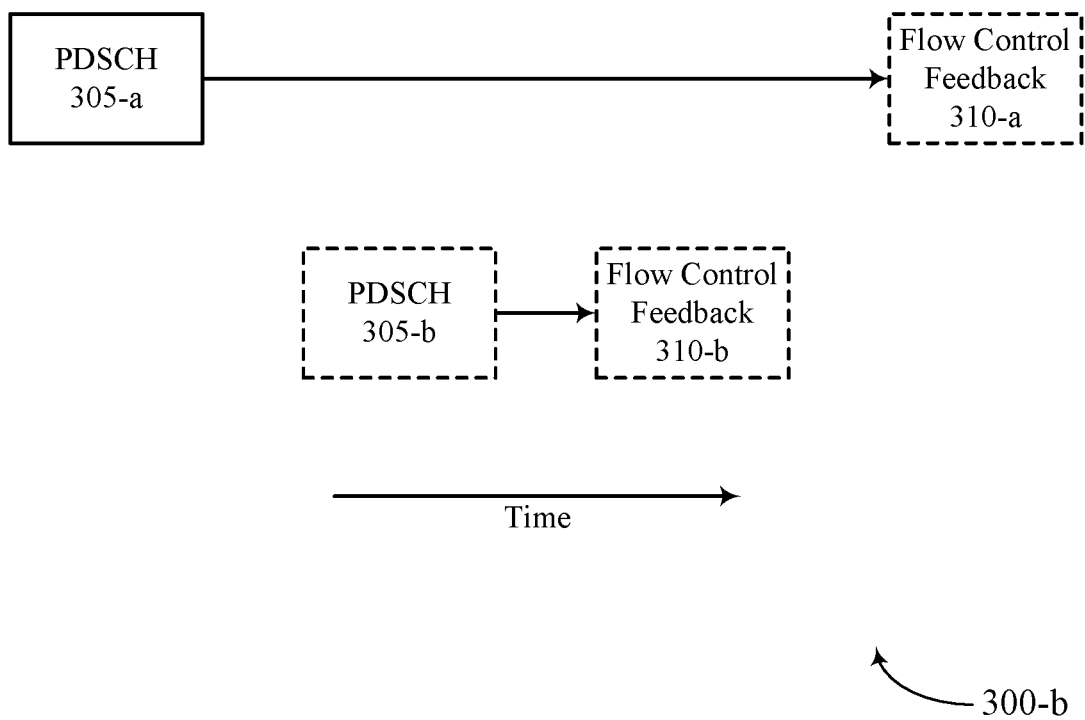

FIGS. 3A and 3B illustrate examples of block diagrams 300-a and 300-b, respectively, showing PDSCH transmissions and flow control feedback in accordance with one or more aspects of the present disclosure. In the example of FIG. 3, when flow control feedback from a UE 115 is disabled for a PDSCH, the UE 115 may still operate according to a timing for reporting flow control feedback for the PDSCH. The timing for reporting flow control feedback to a PDSCH may indicate a time interval (e.g., subframe, slot, or symbol) in which flow control feedback may be transmitted (e.g., even when flow control feedback is disabled). As illustrated, a base station 105 may schedule a first PDSCH 305-a, and flow control feedback 310-a for the first PDSCH 305-a may be disabled. Nevertheless, a UE 115 may identify a timing for reporting the flow control feedback 310-a, and the UE 115 may use the timing to determine whether to drop another PDSCH. Similarly, the base station 105 may also identify the timing for the UE to report the flow control feedback 310-a, and the base station 105 may use the timing to schedule other PDSCHs. The flow control feedback 310-a (e.g., disabled flow control feedback) may be referred to as virtual flow control feedback (e.g., virtual HARQ-ACK).

In a first example 300-a, a UE 115 may not be expected to receive a second PDSCH 305-b before a time for reporting flow control feedback 310-a for the first PDSCH 305-a if the first PDSCH 305-a and the second PDSCH 305-b are associated with a same flow control feedback process. Thus, a base station 105 may avoid scheduling the second PDSCH 305-b between the first PDSCH 305-a and the time for reporting flow control feedback 310-a. If the UE 115 is scheduled for the second PDSCH 305-b, the UE 115 may drop the second PDSCH 305-b (e.g., refrain from decoding the second PDSCH 305-b). That is, if the UE 115 is scheduled as illustrated in the first example 300-a, the UE 115 may drop the second PDSCH 305-b.

In a second example 300-b, a UE 115 may not be expected to receive a second PDSCH 305-b after the first PDSCH 305-a if a time for reporting flow control feedback 310-b for the second PDSCH 305-b precedes a time for reporting flow control feedback 310-a for the first PDSCH 305-a. In this example, flow control feedback 310-b for the second PDSCH 305-b may be enabled or disabled. If flow control feedback is disabled for the second PDSCH 305-b, a base station 105 may still use the timing for the UE 115 to report the flow control feedback 310-b to determine whether to schedule the second PDSCH 305-b, and a UE 115 may still use the timing for reporting the flow control feedback 310-b to determine whether to drop the second PDSCH 305-b. For example, a base station 105 may avoid scheduling the second PDSCH 305-b after the first PDSCH 305-a with a time for reporting flow control feedback 310-b that precedes a time for reporting flow control feedback 310-a for the first PDSCH 305-a. If the UE 115 is scheduled for the second PDSCH 305-b, the UE 115 may drop the second PDSCH 305-b (e.g., refrain from decoding the second PDSCH 305-b). FIG. 3A may be a further example of FIG. 3A. Flow control feedback 310-a as described with reference to FIG. 3A or FIG. 3B, or both may be an example of flow control feedback 215 as described with reference to FIG. 2. Flow control feedback 310-b as described with reference to FIG. 3B, or both may be an example of flow control feedback 215 as described with reference to FIG. 2. PDSCH 305-a, or PDSCH 305-b, or both as described with reference to FIG. 3A, or FIG. 3B, or both may be examples of PDSCH 210 as described with reference to FIG. 2.

In some cases, the timing (e.g., K1) for reporting flow control feedback when flow control feedback is disabled (e.g., the virtual flow control feedback) may be preconfigured at a UE 115 and a base station 105. The timing may be different for different subcarrier spacings. In other cases, a base station 105 may transmit DCI indicating the timing for reporting flow control feedback when flow control feedback is disabled. Specifically, the timing for reporting flow control feedback may be signaled in DCI, but the UE 115 may not be expected to transmit the flow control feedback (e.g., the UE 115 uses the timing value to determine the timeline and dropping rules).

In some cases, a UE 115 may derive the timing for reporting flow control feedback from an RRC configuration when flow control feedback is disabled. For example, a base station 105 may transmit a set of timings in RRC signaling (e.g., a downlink-data-to-uplink-ACK information element that indicates multiple timings between downlink data and uplink flow control feedback). The UE 115 may then select a timing for reporting flow control feedback from the set when flow control feedback is disabled (e.g., the UE 115 may use one of the timings when no flow control feedback is provided). In one example, the UE 115 may select a maximum or minimum timing of the set of timings, or the UE 115 may select a first entry in the set of timings (e.g., an entry with an index of 0). In another example, the UE 115 may select a timing of the set of timings based on another parameter indicating which one of the entries to select. For instance, the UE 115 may receive DCI including a parameter indicating the timing that the UE 115 is to select from the set of timings, and the UE 115 may select the indicated timing. In yet another example, the timing for reporting flow control feedback when flow control feedback is disabled may be based on a flow control RTT (e.g., HARQ-RTT timer configuration).

Figure 4:
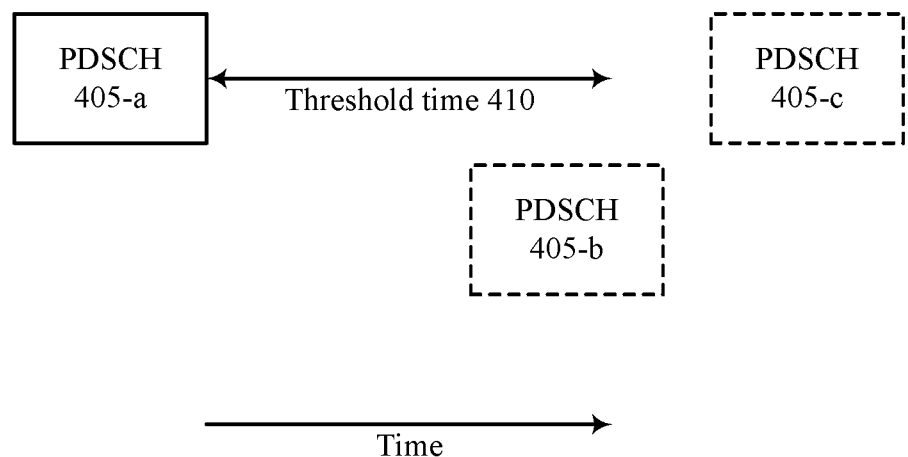
FIG. 4 illustrates an example of a block diagram showing PDSCH transmissions in accordance with one or more aspects of the present disclosure.

FIG. 4 illustrates an example of a block diagram 400 showing PDSCH transmissions in accordance with one or more aspects of the present disclosure. In the example of FIG. 4, when flow control feedback from a UE 115 is disabled for a PDSCH, a base station 105 may schedule other PDSCH transmissions to the UE 115 according to one or more rules to avoid confusion at the base station 105 and the UE 115. In one example, a wireless communications system may define a minimum distance (e.g., in slots or symbols) between two consecutive PDSCHs corresponding to the same flow control feedback process or that include the same transport block (e.g., PDSCH transmissions having the same HARQ, same new-data indicator (NDI), or same transport block). The minimum distance may be different for different numerologies, number of symbols, and DMRS patterns used for the PDSCH transmissions, or the minimum distance may depend on UE processing capability, etc. In some cases, the minimum distance may also depend on the HARQ-RTT timer. FIG. 4 may be a further example of FIG. 3A, or FIG. 3B, or both. PDSCH 405-a, PDSCH 405-b, or PDSCH 405-c, or combination thereof may be examples of PDSCH 210 as described with reference to FIG. 2, or may be examples of PDSCH 305-a, or PDSCH 305-b as described with reference to FIGS. 3A and 3B, or a combination thereof.

An example of the minimum distance (e.g., threshold time) is illustrated in FIG. 4. A base station 105 may transmit DCI scheduling a first PDSCH 405-a to a UE 115. The UE 115 may not be expected to receive another PDSCH within a threshold time 410 (e.g., minimum time or distance) after the first PDSCH 405-a. Thus, the base station 105 may avoid scheduling the second PDSCH 405-b within the threshold time 410 after the first PDSCH 405-a, but the base station 105 may schedule the third PDSCH 405-c after the threshold time after 410 after the first PDSCH 405-a. If the UE 115 is scheduled for the second PDSCH 405-b within the threshold time 410, the UE 115 may drop the second PDSCH 405-b (e.g., refrain from decoding the second PDSCH 405-b). In another example (not illustrated in FIG. 4), if a UE 115 is scheduled to receive a first PDSCH, and flow control feedback is disabled for the first PDSCH, the UE 115 may not drop a second PDSCH (e.g., regardless of when the second PDSCH is scheduled and regardless of a timing for reporting flow control feedback for the second PDSCH). That is, if the UE 115 receives a PDSCH corresponding to a HARQ process without HARQ-ACK feedback, the UE 115 may ignore out-of-order rules (e.g., the UE 115 may not be allowed to drop other PDSCHs based on the PDSCH).

In addition to the techniques described above, a wireless communications system may support flow control feedback processes associated with disabled flow control feedback such that a UE 115 may be able to identify when to refrain from transmitting flow control feedback for a downlink data transmission. As an example, the number of flow control feedback processes may be increased, and there may be a maximum number (e.g., 15) of flow control feedback processes with flow control feedback (e.g., associated with PDSCHs for which flow control feedback is enabled). Further, unused bits in DCI may be reused to signal the remaining (e.g., additional) flow control feedback processes. For example, if there are 31 flow control feedback processes, and 15 of the flow control feedback processes use flow control feedback (e.g., flow control feedback is enabled for 15 processes), a flow control ID in the 0-14 range may indicate a flow control feedback process for which flow control feedback is enabled. A flow control ID of 15 (e.g., HARQ ID=15) in the flow control ID field may indicate a flow control feedback process for which flow control feedback is disabled. Then, another field in the DCI (e.g., four bits from the DAI field or the TPC field for PUCCH) may indicate one of the 16 flow control feedback processes for which flow control feedback is disabled. Because the DAI field and TPC field for the PUCCH may provide information for reporting flow control feedback, these fields may be unused when flow control feedback is disabled. Thus, the UE 115 may interpret these fields differently based on whether flow control feedback is disabled (e.g., based on the indication in the flow control feedback ID field).

Figure 5:
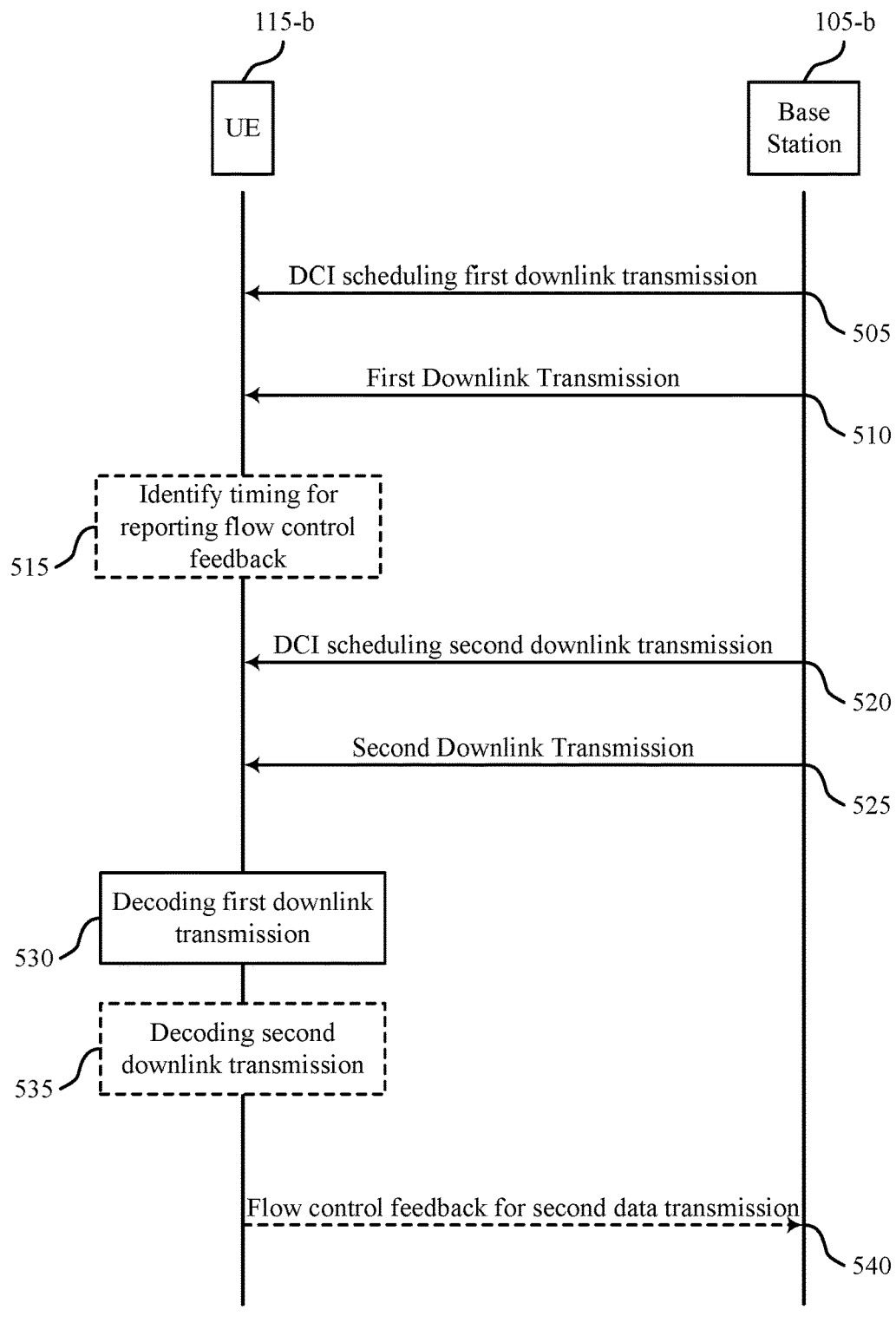
FIG. 5 illustrates an example of a process flow that supports out-of-order handling without flow control feedback in accordance with one or more aspects of the present disclosure.

FIG. 5 illustrates an example of a process flow 500 that supports out-of-order handling without flow control feedback in accordance with one or more aspects of the present disclosure. Process flow 500 illustrates aspects of techniques performed by a UE 115-*b*, which may be an example of a UE 115 described with reference to FIGS. 1 through 4. Process flow 500 also illustrates aspects of techniques performed by a base station 105-*b*, which may be an example of a base station 105 described with reference to FIGS. 1 through 4. Process flow 500 may support efficient techniques for facilitating downlink data transmissions and optional flow control feedback while avoiding confusion at the base station 105-*b* and the UE 115-*b*.

At 505, the base station 105-*b* may transmit DCI scheduling a first downlink data transmission to the UE 115-*b*, where flow control feedback may be disabled for the first downlink data transmission. At 510, the base station 105-*b* may transmit the first downlink data transmission to the UE 115-*b*. In some cases, at 515, although flow control feedback may be disabled for the first downlink data transmission, the UE 115-*b* may identify a timing for reporting flow control feedback for the first downlink data transmission. In such cases, the UE 115-*b* may still refrain from reporting flow control feedback for the downlink data transmission. In one example, the UE 115-*b* may receive, in the DCI at 505, an indication of the timing for reporting flow control feedback to the base station 105-*b* for the first downlink data transmission.

In another example, the UE 115-*b* may receive, in RRC signaling, multiple timings for reporting flow control feedback to the base station 105-*b* for downlink data transmissions. In this example, the UE 115-*b* may select the timing for reporting flow control feedback to the base station 105-*b* from the multiple timings in the RRC signaling. The selected timing may be a maximum, minimum, or first timing of the multiple timings (e.g., first timing in the set), or the selected timing may be indicated by another parameter. Further, the selected timing may be based on a flow control feedback RTT configured in the RRC signaling. In yet another example, the timing for reporting flow control feedback to the base station 105-*b* for the first downlink data transmission may be preconfigured at the base station 105-*b* and the UE 115-*b*. In this example, the timing may be based on a subcarrier spacing configured for the first downlink data transmission.

At 520, the base station 105-*b* may transmit DCI scheduling a second downlink data transmission. At 525, the base station 105-*b* may transmit the second downlink data transmission to the UE 115-*b*. At 530, the UE 115-*b* may decode the first downlink data transmission. If the UE 115-*b* determines that the second downlink data transmission is scheduled after the first downlink data transmission and before flow control feedback for the first downlink data transmission (e.g., based on the timing for reporting flow control feedback for the first downlink data transmission), at 535, the UE 115-*b* may refrain from decoding the second downlink data transmission. If the UE 115-*b* determines that the second downlink data transmission is scheduled after the first downlink data transmission and flow control feedback for the second downlink data transmission is scheduled before flow control feedback for the first downlink data transmission, at 535, the UE 115-*b* may refrain from decoding the second downlink data transmission.

In some cases, if the UE 115-*b* determines that the second downlink data transmission is scheduled within a threshold amount of time after the first downlink data transmission, at 535, the UE 115-*b* may refrain from decoding the second downlink data transmission. In other cases, if the UE 115-*b* determines that the second downlink data transmission is scheduled after a threshold amount of time after the first downlink data transmission, at 535, the UE 115-*b* may decode the second downlink data transmission. In yet other cases, at 535, the UE 115-*b* may decode the second downlink data transmission regardless of when the second downlink data transmission is scheduled and regardless of a timing for reporting flow control feedback for the second downlink data transmission. At 540, if flow control feedback is enabled for the second downlink data transmission, the UE 115-*b* may transmit flow control feedback to the base station 105-*b* for the second downlink data transmission. Otherwise, the UE 115-*b* may refrain from transmitting flow control feedback to the base station 105-*b* for the second downlink data transmission.

In some cases, the UE 115-*b* may determine that flow control feedback is disabled for the first downlink data transmission based on a flow control feedback process associated with the first downlink data transmission. For instance, the DCI at 505 may indicate a flow control feedback process associated with the first downlink data transmission, and the flow control feedback process may indicate whether flow control feedback is disabled or enabled for the first downlink data transmission. The UE 115-*b* may identify the flow control feedback process associated with the first downlink data transmission based on decoding the DCI. A first field in the DCI (e.g., the flow control feedback ID field) may indicate a flow control feedback process for which flow control feedback is enabled (e.g., HARQ ID=0-14), or the first field may indicate that flow control feedback is disabled for the flow control feedback process (e.g., HARQ ID=15). If flow control feedback is disabled for the flow control feedback process, the UE 115-*b* may decode a second field (e.g., DAI, TPC, etc.) that indicates a flow control feedback process for which flow control feedback is disabled.

Figure 6:
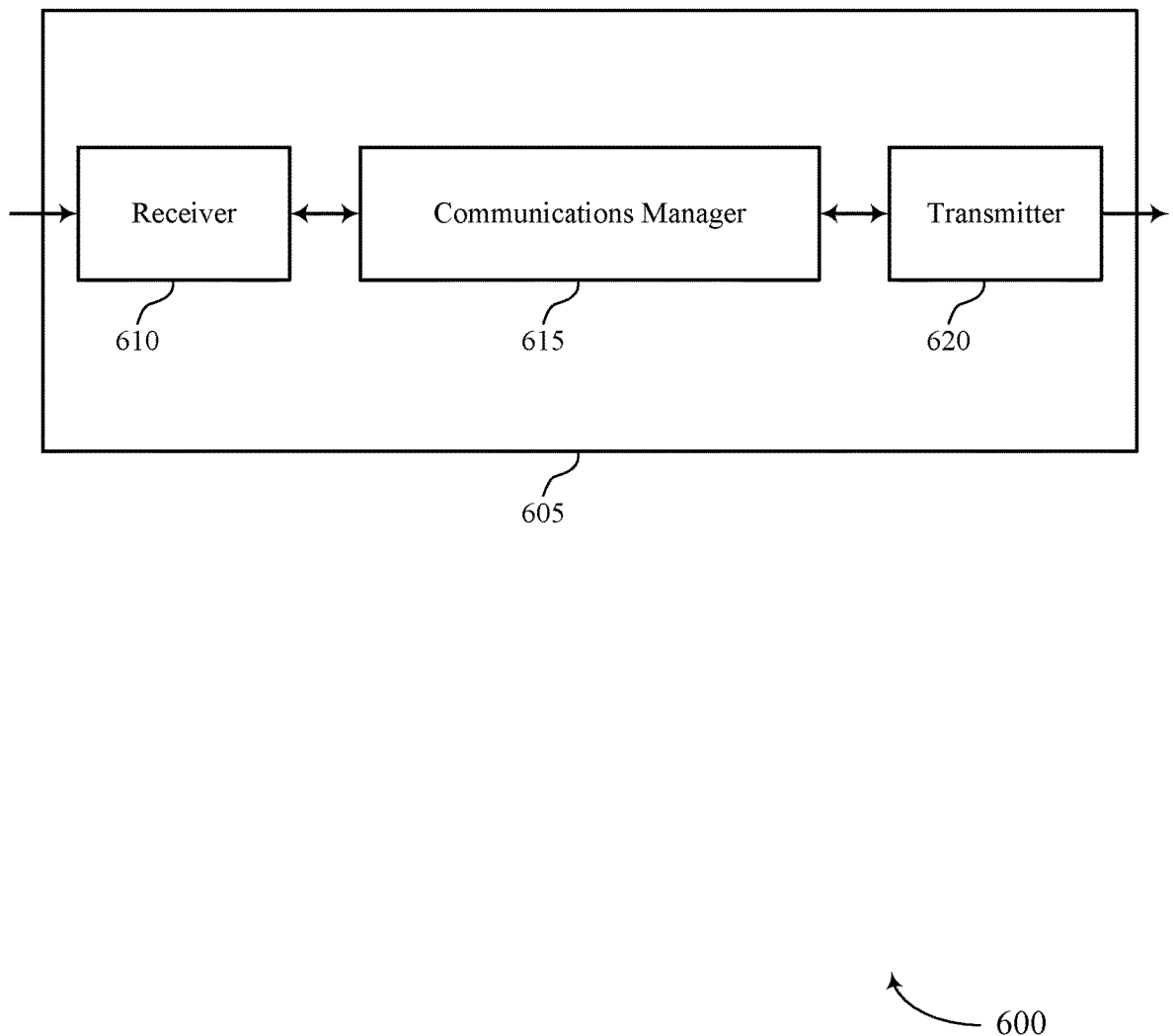
FIGS. 6 and 7 show block diagrams of devices that support out-of-order handling without flow control feedback in accordance with one or more aspects of the present disclosure.

FIG. 6 shows a block diagram 600 of a device 605 that supports out-of-order handling without flow control feedback in accordance with one or more aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to out-of-order handling without flow control feedback, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive, from a base station, a first downlink data transmission and a second downlink data transmission, the first downlink data transmission preceding the second downlink data transmission, where the first downlink data transmission and the second downlink data transmission are associated with a same flow control feedback process, and decode or refrain from decoding the second downlink data transmission based on flow control feedback being disabled for the flow control feedback process.

The communications manager 615 may also receive, from a base station, DCI scheduling a downlink data transmission, the downlink data transmission associated with a flow control feedback process, decode a first field in the DCI indicating that flow control feedback is disabled for the flow control feedback process, decode a second field in the DCI associated with the flow control feedback process associated with the downlink data transmission, where decoding the second field is based on the first field indicating that the flow control feedback is disabled for the flow control feedback process, and refrain from transmitting the flow control feedback to the base station for the downlink data transmission based on the flow control feedback being disabled for the downlink data transmission, the flow control feedback being disabled based on the flow control feedback process being associated with the downlink data transmission.

The communications manager 615 may also receive, from a base station, a downlink data transmission, where flow control feedback is disabled for the downlink data transmission, refrain from reporting the flow control feedback for the downlink data transmission based on the flow control feedback being disabled for the downlink data transmission, receive a second downlink data transmission scheduled after the downlink data transmission, the second downlink data transmission associated with a same flow control feedback process as the downlink data transmission, and refrain from decoding the second downlink data transmission based on the second downlink data transmission being received before a timing for reporting the flow control feedback to the base station for the downlink data transmission.

The communications manager 615 may also receive, from a base station, DCI scheduling a downlink data transmission, where flow control feedback is disabled for the downlink data transmission, identify a timing for reporting flow control feedback to the base station for the downlink data transmission with flow control feedback being disabled for the downlink data transmission, and refrain from reporting flow control feedback for the downlink data transmission based on the flow control feedback being disabled for the downlink data transmission.

The communications manager 615 may also receive, from a base station, DCI scheduling a first downlink data transmission and a second downlink data transmission, the first downlink data transmission preceding the second downlink data transmission, determine whether flow control feedback is disabled for the first downlink data transmission, decode the first downlink data transmission, and decode or refrain from decoding the second downlink data transmission based on whether flow control feedback is disabled for the first downlink data transmission.

The communications manager 615 may also receive, from a base station, DCI scheduling a downlink data transmission, identify a flow control feedback process associated with the downlink data transmission, determine that flow control feedback is disabled for the downlink data transmission based on the flow control feedback process associated with the downlink data transmission, and refrain from transmitting flow control feedback to the base station for the downlink data transmission based on the determining. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The described techniques, such as those described with reference to a communications manager 615, may support efficient techniques for facilitating downlink data transmissions and optional flow control feedback while avoiding confusion at a base station and a UE. In one example, when flow control feedback from a UE is disabled for a downlink data transmission, the UE may still operate according to a timing for reporting flow control feedback for the downlink data transmission. In this example, the UE may drop (e.g., refrain from decoding) other downlink data transmissions based on the timing for reporting flow control feedback. In another example, when flow control feedback from a UE is disabled for a downlink data transmission, other downlink data transmissions to the UE may be scheduled according to one or more rules to avoid confusion. In addition, a wireless communications system may support flow control feedback processes associated with disabled flow control feedback such that a UE may be able to identify when to refrain from reporting flow control feedback for a downlink data transmission.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
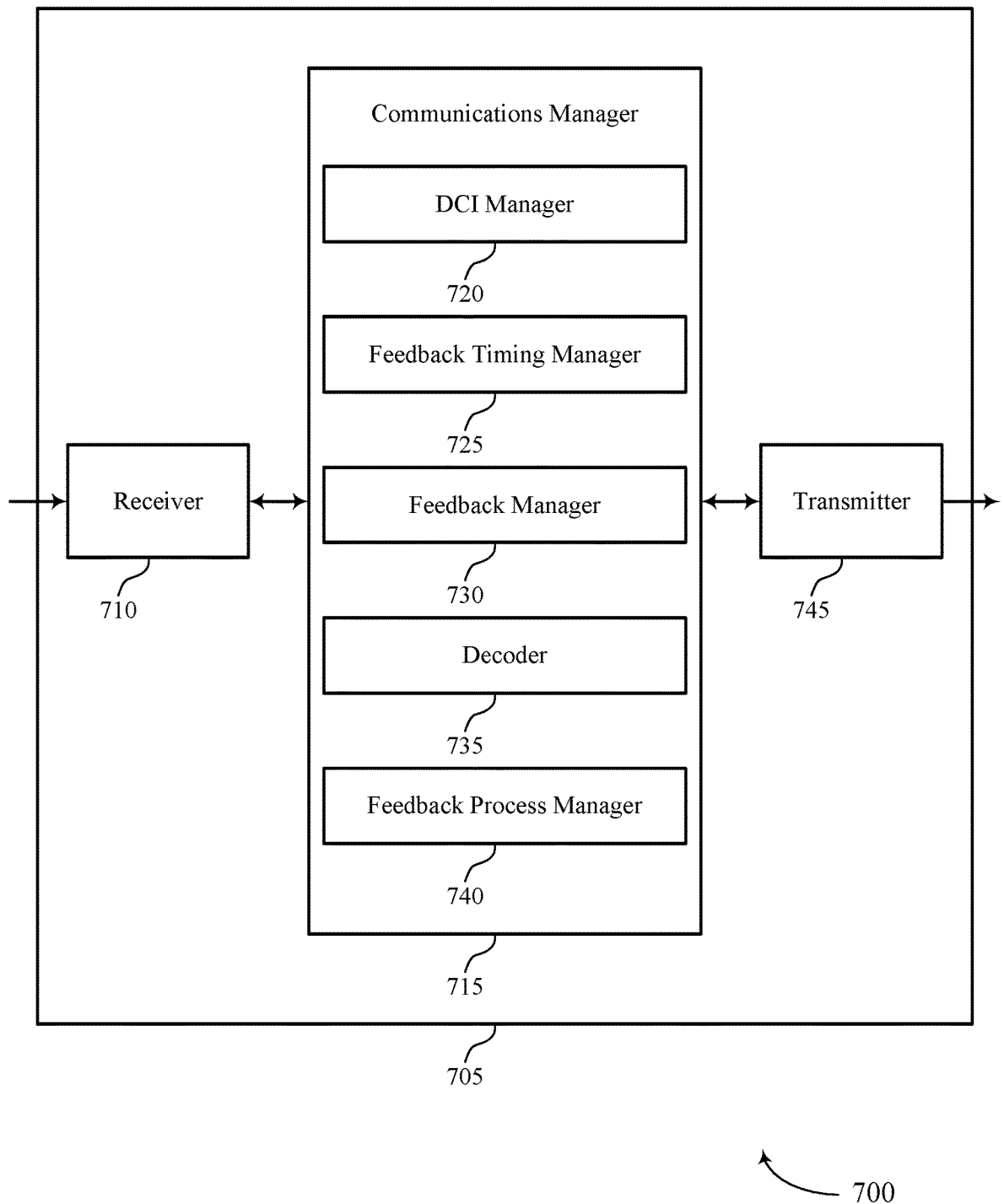

FIG. 7 shows a block diagram 700 of a device 705 that supports out-of-order handling without flow control feedback in accordance with aspects of the present disclosure. The device 705 may be an example of aspects of a device 605, or a UE 115 as described herein. The device 705 may include a receiver 710, a communications manager 715, and a transmitter 745. The device 705 may also include a processor. Each of these components may be in communication with one another (e.g., via one or more buses).

The receiver 710 may receive information such as packets, user data, or control information associated with various information channels (e.g., control channels, data channels, and information related to out-of-order handling without flow control feedback, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a DCI manager 720, a feedback timing manager 725, a feedback manager 730, a decoder 735, and a feedback process manager 740. The communications manager 715 may be an example of aspects of the communications manager 910 described herein.

The DCI manager 720 may receive, from a base station, a first downlink data transmission and a second downlink data transmission, the first downlink data transmission preceding the second downlink data transmission, where the first downlink data transmission and the second downlink data transmission are associated with a same flow control feedback process. The decoder 735 may decode or refrain from decoding the second downlink data transmission based on flow control feedback being disabled for the flow control feedback process.

The DCI manager 720 may receive, from a base station, DCI scheduling a downlink data transmission, the downlink data transmission associated with a flow control feedback process. The decoder 735 may decode a first field in the DCI indicating that flow control feedback is disabled for the flow control feedback process. The decoder 735 may decode a second field in the DCI associated with the flow control feedback process associated with the downlink data transmission, where decoding the second field is based on the first field indicating that the flow control feedback is disabled for the flow control feedback process. The feedback manager 740 may refrain from transmitting the flow control feedback to the base station for the downlink data transmission based on the flow control feedback being disabled for the downlink data transmission, the flow control feedback being disabled based on the flow control feedback process being associated with the downlink data transmission.

The DCI manager 720 may receive, from a base station, a downlink data transmission, where flow control feedback is disabled for the downlink data transmission. The feedback manager 730 may refrain from reporting the flow control feedback for the downlink data transmission based on the flow control feedback being disabled for the downlink data transmission. The DCI manager 720 may receive a second downlink data transmission scheduled after the downlink data transmission, the second downlink data transmission associated with a same flow control feedback process as the downlink data transmission. The feedback manager 730 may refrain from decoding the second downlink data transmission based on the second downlink data transmission being received before a timing for reporting the flow control feedback to the base station for the downlink data transmission.

The DCI manager 720 may receive, from a base station, DCI scheduling a downlink data transmission, where flow control feedback is disabled for the downlink data transmission. The feedback timing manager 725 may identify a timing for reporting flow control feedback to the base station for the downlink data transmission with flow control feedback being disabled for the downlink data transmission. The feedback manager 730 may refrain from reporting flow control feedback for the downlink data transmission based on the flow control feedback being disabled for the downlink data transmission.

The DCI manager 720 may receive, from a base station, DCI scheduling a first downlink data transmission and a second downlink data transmission, the first downlink data transmission preceding the second downlink data transmission. The feedback manager 730 may determine whether flow control feedback is disabled for the first downlink data transmission. The decoder 735 may decode the first downlink data transmission and decode or refrain from decoding the second downlink data transmission based on whether flow control feedback is disabled for the first downlink data transmission.

The DCI manager 720 may receive, from a base station, DCI scheduling a downlink data transmission. The feedback process manager 740 may identify a flow control feedback process associated with the downlink data transmission. The feedback manager 730 may determine that flow control feedback is disabled for the downlink data transmission based on the flow control feedback process associated with the downlink data transmission and refrain from transmitting flow control feedback to the base station for the downlink data transmission based on the determining.

The transmitter 745 may transmit signals generated by other components of the device 705. In some examples, the transmitter 745 may be collocated with a receiver 710 in a transceiver module. For example, the transmitter 745 may be an example of aspects of the transceiver 920 described with reference to FIG. 9. The transmitter 745 may utilize a single antenna or a set of antennas.

Figure 8:
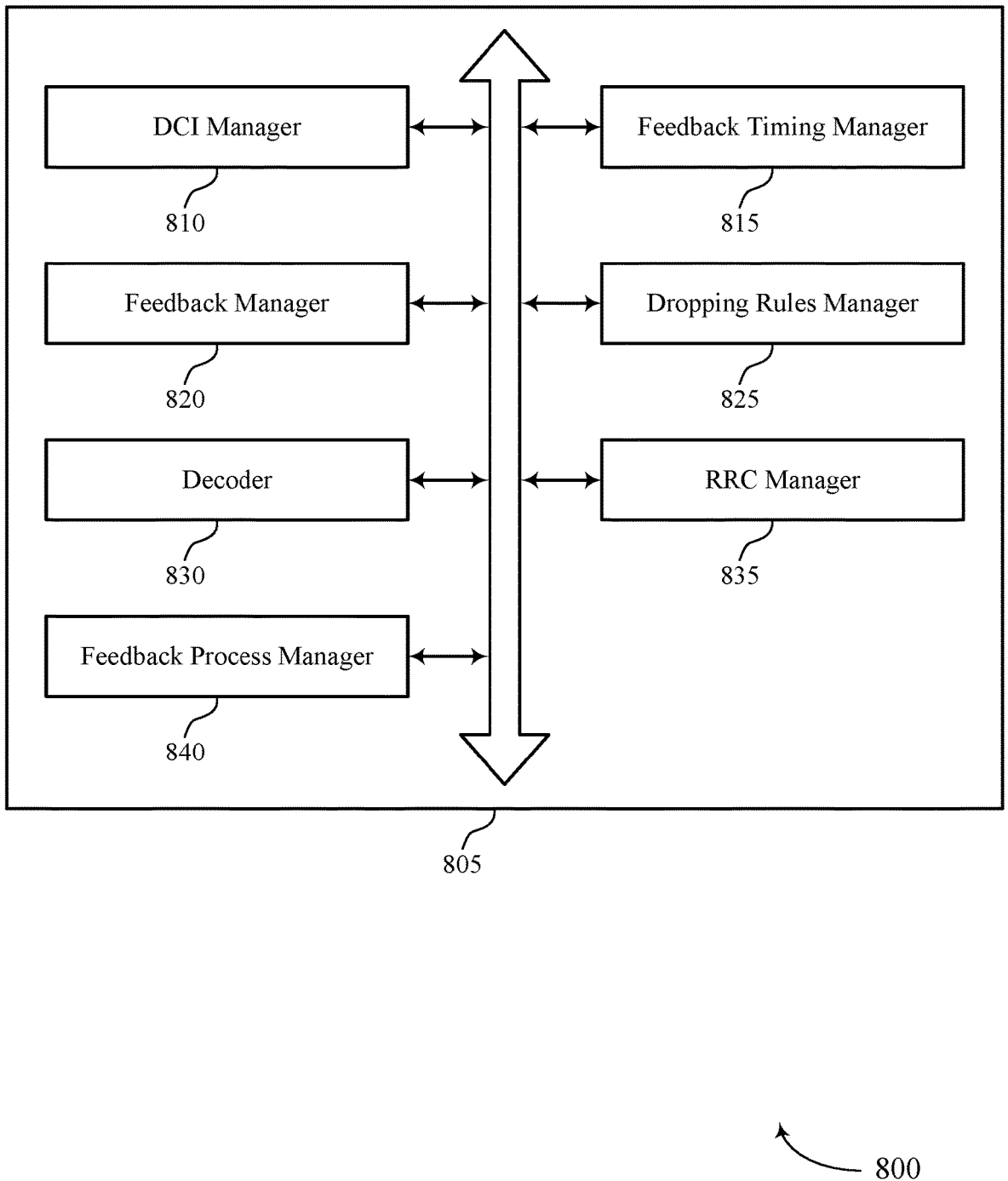
FIG. 8 shows a block diagram of a communications manager that supports out-of-order handling without flow control feedback in accordance with one or more aspects of the present disclosure.

FIG. 8 shows a block diagram 800 of a communications manager 805 that supports out-of-order handling without flow control feedback in accordance with one or more aspects of the present disclosure. The communications manager 805 may be an example of aspects of a communications manager 615, a communications manager 715, or a communications manager 910 described herein. The communications manager 805 may include a DCI manager 810, a feedback timing manager 815, a feedback manager 820, a dropping rules manager 825, a decoder 830, an RRC manager 835, and a feedback process manager 840. Each of these modules may communicate, directly or indirectly, with one another (e.g., via one or more buses).

The DCI manager 810 may receive, from a base station, a first downlink data transmission and a second downlink data transmission, the first downlink data transmission preceding the second downlink data transmission, where the first downlink data transmission and the second downlink data transmission are associated with a same flow control feedback process. The decoder 830 may decode or refrain from decoding the second downlink data transmission based on flow control feedback being disabled for the flow control feedback process.

The DCI manager 810 may receive, from a base station, DCI scheduling a downlink data transmission, the downlink data transmission associated with a flow control feedback process. The decoder 830 may decode a first field in the DCI indicating that flow control feedback is disabled for the flow control feedback process. The decoder 830 may decode a second field in the DCI associated with the flow control feedback process associated with the downlink data transmission, where decoding the second field is based on the first field indicating that the flow control feedback is disabled for the flow control feedback process. The feedback manager 820 may refrain from transmitting the flow control feedback to the base station for the downlink data transmission based on the flow control feedback being disabled for the downlink data transmission, the flow control feedback being disabled based on the flow control feedback process being associated with the downlink data transmission.

The DCI manager 810 may receive, from a base station, a downlink data transmission, where flow control feedback is disabled for the downlink data transmission. The feedback manager 820 may refrain from reporting the flow control feedback for the downlink data transmission based on the flow control feedback being disabled for the downlink data transmission. The DCI manager 810 may receive a second downlink data transmission scheduled after the downlink data transmission, the second downlink data transmission associated with a same flow control feedback process as the downlink data transmission. The feedback manager 820 may refrain from decoding the second downlink data transmission based on the second downlink data transmission being received before a timing for reporting the flow control feedback to the base station for the downlink data transmission.

The DCI manager 810 may receive, from a base station, DCI scheduling a downlink data transmission, where flow control feedback is disabled for the downlink data transmission. In some examples, the DCI manager 810 may receive, from a base station, DCI scheduling a first downlink data transmission and a second downlink data transmission, the first downlink data transmission preceding the second downlink data transmission. In some examples, the DCI manager 810 may receive, from a base station, DCI scheduling a downlink data transmission. In some examples, the DCI manager 810 may receive second DCI scheduling a second downlink data transmission, the second downlink data transmission associated with a same flow control feedback process as the first downlink data transmission. In some examples, the DCI manager 810 may receive second DCI scheduling a second downlink data transmission. In some examples, the DCI manager 810 may receive, in the DCI, an indication of the timing for reporting flow control feedback to the base station for the downlink data transmission.

The feedback timing manager 815 may identify a timing for reporting flow control feedback to the base station for the downlink data transmission with flow control feedback being disabled for the downlink data transmission. In some examples, the feedback timing manager 815 may select the timing for reporting flow control feedback to the base station from the set of timings in the RRC signaling. In some cases, the selected timing is a maximum, minimum, or first timing of the set of timings in the RRC signaling, or the selected timing of the set of timings is indicated by another parameter. In some cases, the selected timing is based on a flow control feedback RTT configured in the RRC signaling. In some cases, the timing for reporting flow control feedback to the base station for the downlink data transmission is preconfigured at the UE. In some cases, the timing for reporting flow control feedback to the base station for the downlink data transmission is based on a subcarrier spacing configured for the downlink data transmission.

The feedback manager 820 may refrain from reporting flow control feedback for the downlink data transmission based on the flow control feedback being disabled for the downlink data transmission. In some examples, the feedback manager 820 may determine whether flow control feedback is disabled for the first downlink data transmission. In some examples, the feedback manager 820 may determine that flow control feedback is disabled for the downlink data transmission based on the flow control feedback process associated with the downlink data transmission. In some examples, the feedback manager 820 may refrain from transmitting flow control feedback to the base station for the downlink data transmission based on the determining. In some examples, the feedback manager 820 may determine that flow control feedback is disabled for the first downlink data transmission.

The decoder 830 may decode the first downlink data transmission. In some examples, the decoder 830 may decode or refrain from decoding the second downlink data transmission based on whether flow control feedback is disabled for the first downlink data transmission. In some examples, the decoder 830 may refrain from decoding the second downlink data transmission based on the determining. In some examples, the decoder 830 may decode or refrain from decoding the second downlink data transmission based on whether the second downlink data transmission is scheduled within or after a threshold amount of time after the first downlink data transmission. In some examples, the decoder 830 may refrain from decoding the second downlink data transmission based on the second downlink data transmission being scheduled within the threshold amount of time after the first downlink data transmission. In some examples, the decoder 830 may decode the second downlink data transmission based on the second downlink data transmission being scheduled after the threshold amount of time after the first downlink data transmission.

In some examples, the decoder 830 may decode the second downlink data transmission regardless of when the second downlink data transmission is scheduled and regardless of a timing for reporting flow control feedback for the second downlink data transmission. In some examples, the decoder 830 may decode a first field in the DCI indicating that flow control feedback is disabled for the flow control feedback process. In some examples, the decoder 830 may decode a second field in the DCI indicating the flow control feedback process associated with the downlink data transmission, where decoding the second field is based on the first field indicating that flow control feedback is disabled for the flow control feedback process. In some cases, the first downlink data transmission and the second downlink data transmission are associated with a same flow control feedback process or include a same transport block. In some cases, the first field includes a flow control field. In some cases, the second field includes a DAI or TPC field.

The feedback process manager 840 may identify a flow control feedback process associated with the downlink data transmission. The dropping rules manager 825 may determine that the second downlink data transmission is scheduled after the first downlink data transmission and before flow control feedback for the first downlink data transmission based on the identified timing. In some examples, the dropping rules manager 825 may determine that the second downlink data transmission is scheduled after the first downlink data transmission and flow control feedback for the second downlink data transmission is scheduled before flow control feedback for the first downlink data transmission based on the identified timing. In some examples, the dropping rules manager 825 may determine that the second downlink data transmission is scheduled within the threshold amount of time after the first downlink data transmission.

In some examples, the dropping rules manager 825 may determine that the second downlink data transmission is scheduled after the threshold amount of time after the first downlink data transmission. In some cases, the threshold amount of time is based on a numerology used for the first downlink data transmission, the second downlink data transmission, or both. The RRC manager 835 may receive, in RRC signaling, a set of timings for reporting flow control feedback to the base station for the downlink data transmission. In some cases, the threshold amount of time is based at least in part on a number of symbols for the first downlink data transmission, a number of symbols for the second downlink data transmission, a DMRS pattern associated with the first downlink data transmission, a DMRS pattern associated with the second downlink data transmission, or a processing capability of the UE, or a combination thereof. In some cases, the UE and the base station are operating in an NTN. The DCI manager 820 may receive DCI scheduling the first downlink data transmission and the second downlink data transmission.

Figure 9:
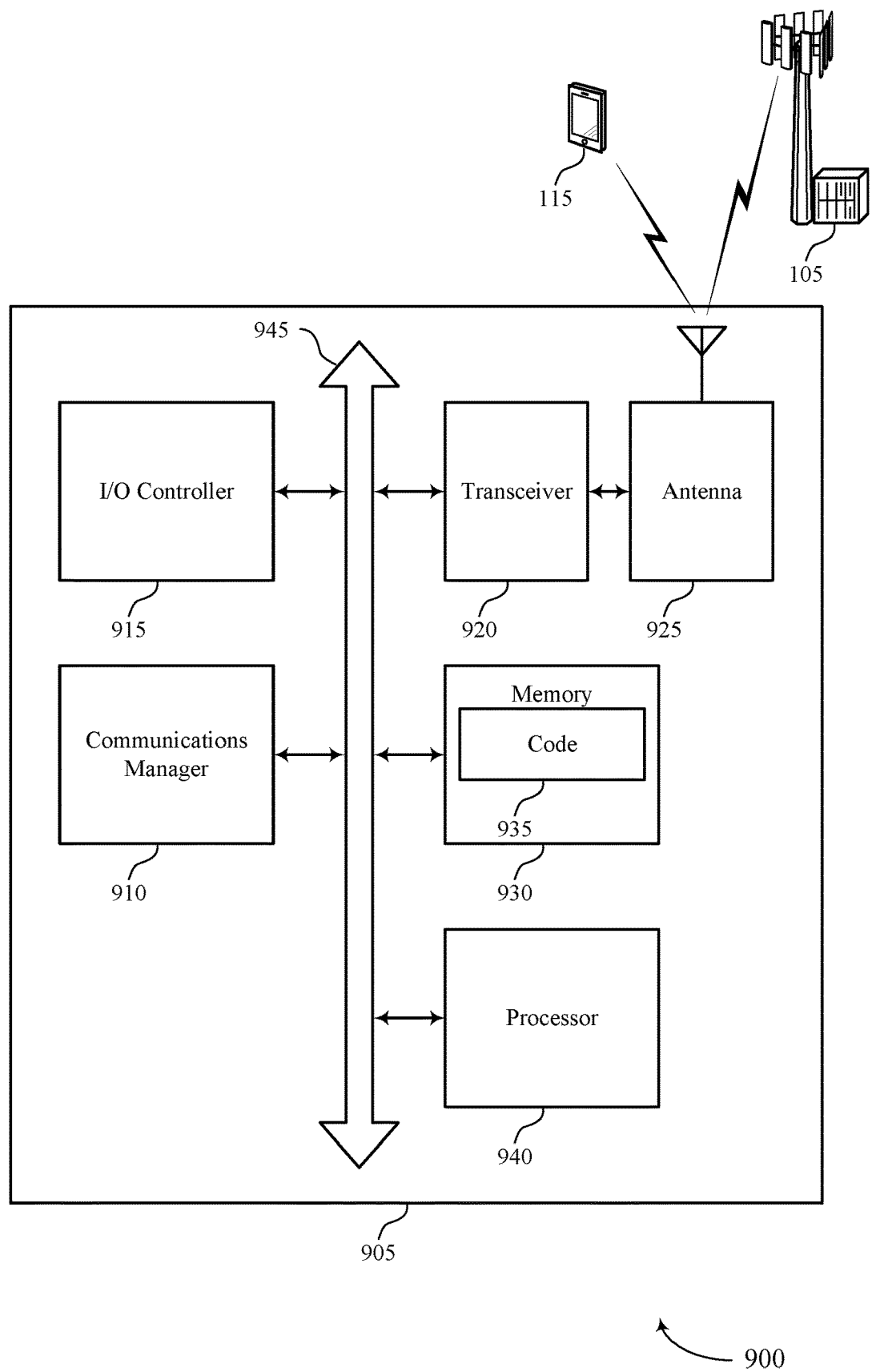
FIG. 9 shows a diagram of a system including a device that supports out-of-order handling without flow control feedback in accordance with one or more aspects of the present disclosure.

FIG. 9 shows a diagram of a system 900 including a device 905 that supports out-of-order handling without flow control feedback in accordance with one or more aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive, from a base station, a first downlink data transmission and a second downlink data transmission, the first downlink data transmission preceding the second downlink data transmission, where the first downlink data transmission and the second downlink data transmission are associated with a same flow control feedback process, and decode or refrain from decoding the second downlink data transmission based on flow control feedback being disabled for the flow control feedback process.

The communications manager 910 may also receive, from a base station, DCI scheduling a downlink data transmission, the downlink data transmission associated with a flow control feedback process, decode a first field in the DCI indicating that flow control feedback is disabled for the flow control feedback process, decode a second field in the DCI associated with the flow control feedback process associated with the downlink data transmission, where decoding the second field is based on the first field indicating that the flow control feedback is disabled for the flow control feedback process, and refrain from transmitting the flow control feedback to the base station for the downlink data transmission based on the flow control feedback being disabled for the downlink data transmission, the flow control feedback being disabled based on the flow control feedback process being associated with the downlink data transmission.

The communications manager 910 may also receive, from a base station, a downlink data transmission, where flow control feedback is disabled for the downlink data transmission, refrain from reporting the flow control feedback for the downlink data transmission based on the flow control feedback being disabled for the downlink data transmission, receive a second downlink data transmission scheduled after the downlink data transmission, the second downlink data transmission associated with a same flow control feedback process as the downlink data transmission, and refrain from decoding the second downlink data transmission based on the second downlink data transmission being received before a timing for reporting the flow control feedback to the base station for the downlink data transmission.

The communications manager 910 may receive, from a base station, DCI scheduling a downlink data transmission, where flow control feedback is disabled for the downlink data transmission, identify a timing for reporting flow control feedback to the base station for the downlink data transmission with flow control feedback being disabled for the downlink data transmission, and refrain from reporting flow control feedback for the downlink data transmission based on the flow control feedback being disabled for the downlink data transmission.

The communications manager 910 may also receive, from a base station, DCI scheduling a first downlink data transmission and a second downlink data transmission, the first downlink data transmission preceding the second downlink data transmission, determine whether flow control feedback is disabled for the first downlink data transmission, decode the first downlink data transmission, and decode or refrain from decoding the second downlink data transmission based on whether flow control feedback is disabled for the first downlink data transmission.

The communications manager 910 may also receive, from a base station, DCI scheduling a downlink data transmission, identify a flow control feedback process associated with the downlink data transmission, determine that flow control feedback is disabled for the downlink data transmission based on the flow control feedback process associated with the downlink data transmission, and refrain from transmitting flow control feedback to the base station for the downlink data transmission based on the determining.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting out-of-order handling without flow control feedback).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
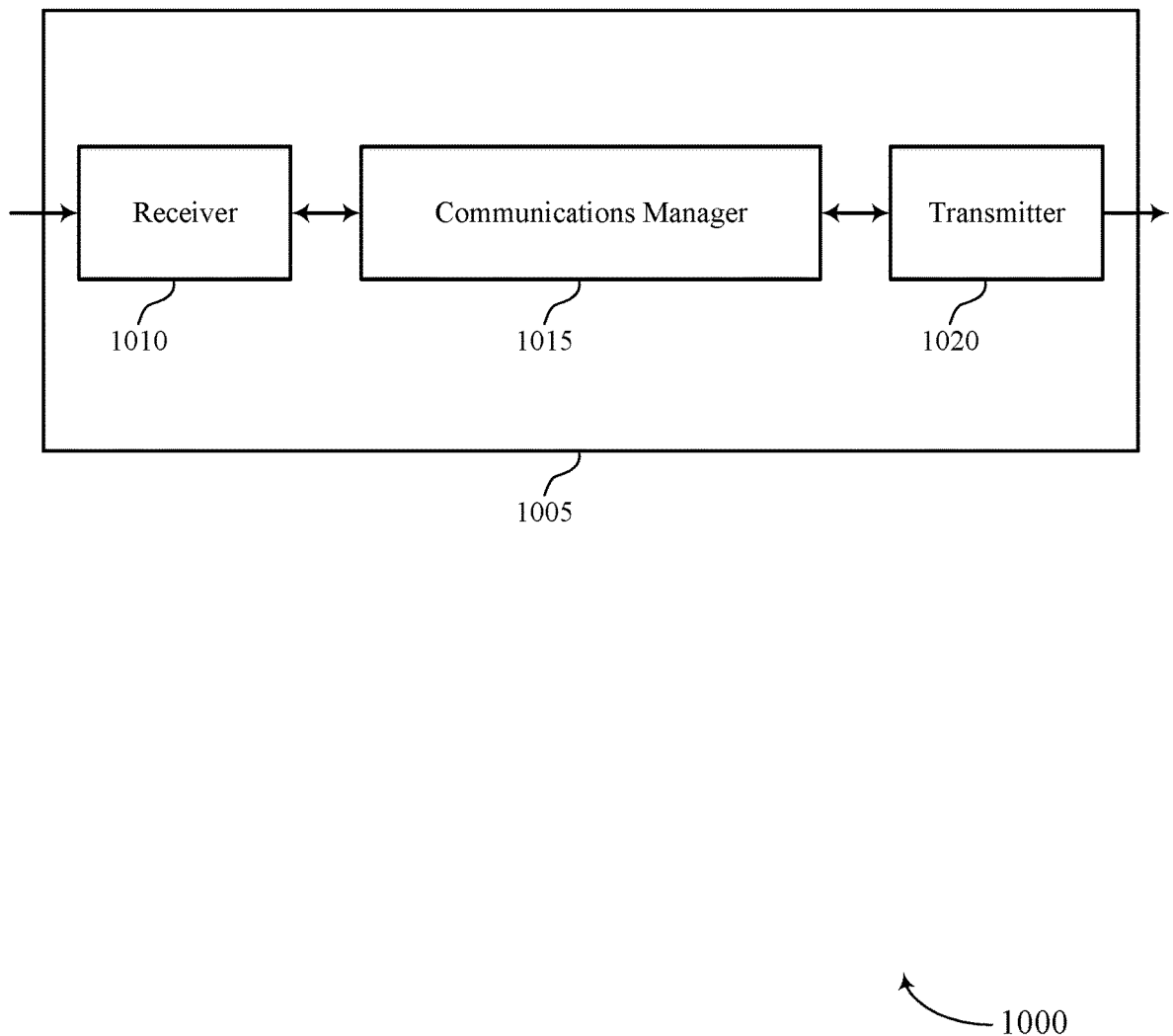
FIGS. 10 and 11 show block diagrams of devices that support out-of-order handling without flow control feedback in accordance with one or more aspects of the present disclosure.

FIG. 10 shows a block diagram 1000 of a device 1005 that supports out-of-order handling without flow control feedback in accordance with one or more aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to out-of-order handling without flow control feedback, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit a first downlink data transmission and a second downlink data transmission to a UE, the first downlink data transmission preceding the second downlink data transmission, where the first downlink data transmission and the second downlink data transmission are associated with a same flow control feedback process, and transmit the second downlink data transmission based on flow control feedback being disabled for the flow control feedback process.

The communications manager 1015 may also transmit a first field in DCI indicating that flow control feedback is disabled for a flow control feedback process, where the DCI schedules transmission of downlink data and indicates that the downlink data is associated with the flow control feedback process, and transmit a second field in the DCI associated with the flow control feedback process associated with the downlink data.

The communications manager 1015 may also transmit, to a UE, DCI scheduling a downlink data transmission to the UE, where flow control feedback is disabled for the downlink data transmission, and transmit, to the UE, an indication of a timing for reporting the flow control feedback to the base station for the downlink data transmission with the flow control feedback being disabled for the downlink data transmission.

The communications manager 1015 may also transmit, to a UE, DCI scheduling a downlink data transmission to the UE, where flow control feedback is disabled for the downlink data transmission and transmit, to the UE, an indication of a timing for reporting flow control feedback to the base station for the downlink data transmission with flow control feedback being disabled for the downlink data transmission.

The communications manager 1015 may also transmit DCI scheduling a first downlink data transmission to a UE, transmit DCI scheduling the second downlink data transmission based on whether flow control feedback is disabled for the first downlink data transmission, identify a second downlink data transmission for the UE, the first downlink data transmission preceding the second downlink data transmission, and determine whether flow control feedback is disabled for the first downlink data transmission.

The communications manager 1015 may also identify downlink data to transmit to a UE, determine to disable flow control feedback from the UE for the downlink data, identify a flow control feedback process indicating that flow control feedback from the UE is disabled based on the determining, and transmit DCI scheduling transmission of the downlink data and indicating that the downlink data is associated with the identified flow control feedback process. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The described techniques, such as those described with reference to a communications manager 1015, may support efficient techniques for facilitating downlink data transmissions and optional flow control feedback while avoiding confusion at a base station and a UE. In one example, when flow control feedback from a UE is disabled for a downlink data transmission, the UE may still operate according to a timing for reporting flow control feedback for the downlink data transmission. In this example, the UE may drop (e.g., refrain from decoding) other downlink data transmissions based on the timing for reporting flow control feedback. In another example, when flow control feedback from a UE is disabled for a downlink data transmission, other downlink data transmissions to the UE may be scheduled according to one or more rules to avoid confusion. In addition, a wireless communications system may support flow control feedback processes associated with disabled flow control feedback such that a UE may be able to identify when to refrain from reporting flow control feedback for a downlink data transmission.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
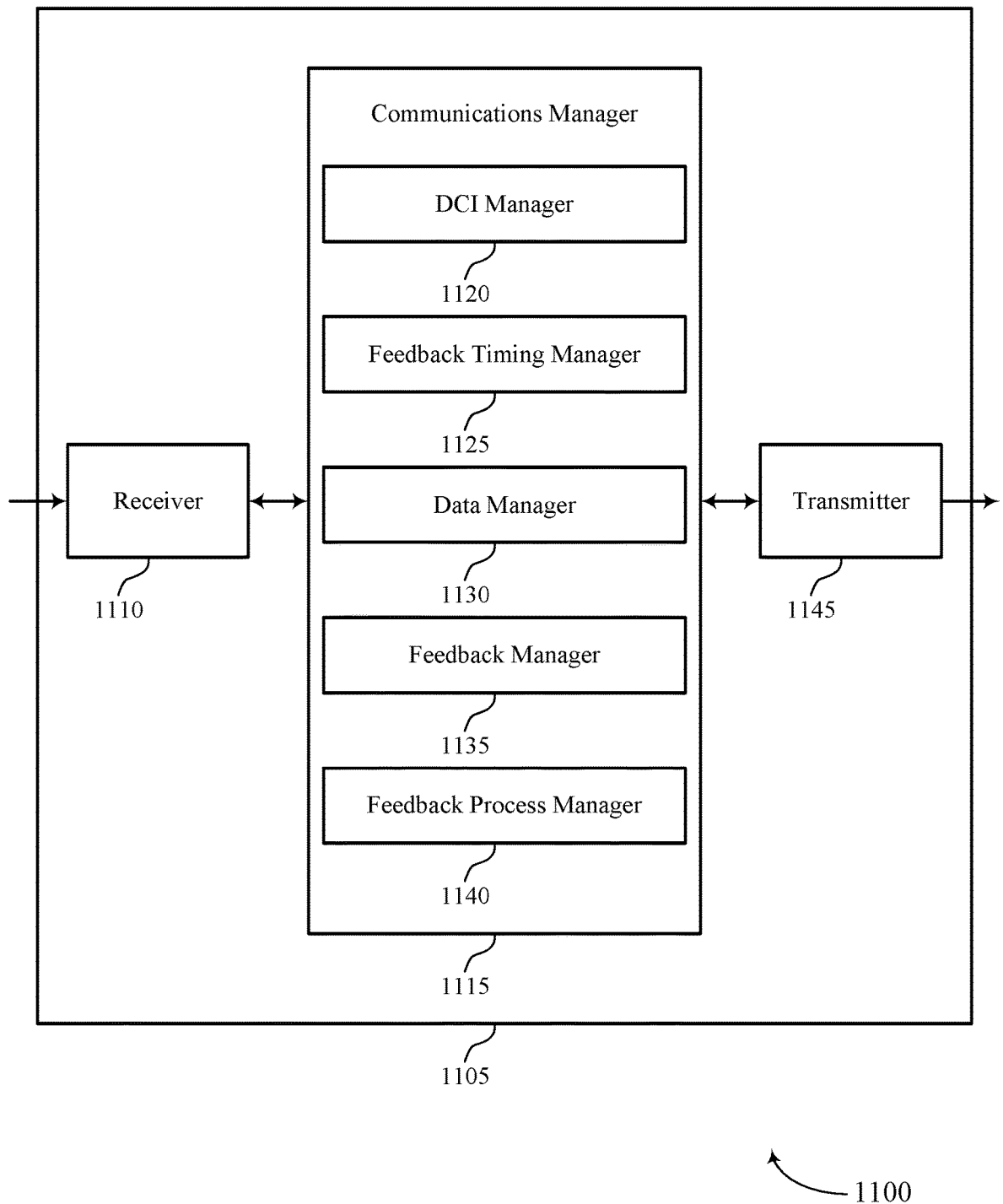

FIG. 11 shows a block diagram 1100 of a device 1105 that supports out-of-order handling without flow control feedback in accordance with one or more aspects of the present disclosure. The device 1105 may be an example of aspects of a device 1005, or a base station 105 as described herein. The device 1105 may include a receiver 1110, a communications manager 1115, and a transmitter 1145. The device 1105 may also include a processor. Each of these components may be in communication with one another (e.g., via one or more buses).

The receiver 1110 may receive information such as packets, user data, or control information associated with various information channels (e.g., control channels, data channels, and information related to out-of-order handling without flow control feedback, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a DCI manager 1120, a feedback timing manager 1125, a data manager 1130, a feedback manager 1135, and a feedback process manager 1140. The communications manager 1115 may be an example of aspects of the communications manager 1310 described herein.

The DCI manager 1120 may transmit a first downlink data transmission and a second downlink data transmission to a UE, the first downlink data transmission preceding the second downlink data transmission, where the first downlink data transmission and the second downlink data transmission are associated with a same flow control feedback process. The DCI manager 1120 may transmit the second downlink data transmission based on flow control feedback being disabled for the flow control feedback process.

The DCI manager 1120 may transmit a first field in DCI indicating that flow control feedback is disabled for a flow control feedback process, where the DCI schedules transmission of downlink data and indicates that the downlink data is associated with the flow control feedback process. The DCI manager 1120 may transmit a second field in the DCI associated with the flow control feedback process associated with the downlink data.

The DCI manager 1120 may transmit, to a UE, DCI scheduling a downlink data transmission to the UE, where flow control feedback is disabled for the downlink data transmission. The feedback timing manager 1125 may transmit, to the UE, an indication of a timing for reporting flow control feedback to the base station for the downlink data transmission with the flow control feedback being disabled for the downlink data transmission.

The DCI manager 1120 may transmit, to a UE, DCI scheduling a downlink data transmission to the UE, where flow control feedback is disabled for the downlink data transmission. The feedback timing manager 1125 may transmit, to the UE, an indication of a timing for reporting flow control feedback to the base station for the downlink data transmission with flow control feedback being disabled for the downlink data transmission.

The DCI manager 1120 may transmit DCI scheduling a first downlink data transmission to a UE. The data manager 1130 may identify a second downlink data transmission for the UE, the first downlink data transmission preceding the second downlink data transmission. The DCI manager 1120 may transmit DCI scheduling the second downlink data transmission based on whether flow control feedback is disabled for the first downlink data transmission. The feedback manager 1135 may determine whether flow control feedback is disabled for the first downlink data transmission.

The data manager 1130 may identify downlink data to transmit to a UE. The feedback manager 1135 may determine to disable flow control feedback from the UE for the downlink data. The feedback process manager 1140 may identify a flow control feedback process indicating that flow control feedback from the UE is disabled based on the determining. The DCI manager 1120 may transmit DCI scheduling transmission of the downlink data and indicating that the downlink data is associated with the identified flow control feedback process.

The transmitter 1145 may transmit signals generated by other components of the device 1105. In some examples, the transmitter 1145 may be collocated with a receiver 1110 in a transceiver module. For example, the transmitter 1145 may be an example of aspects of the transceiver 1320 described with reference to FIG. 13. The transmitter 1145 may utilize a single antenna or a set of antennas.

Figure 12:
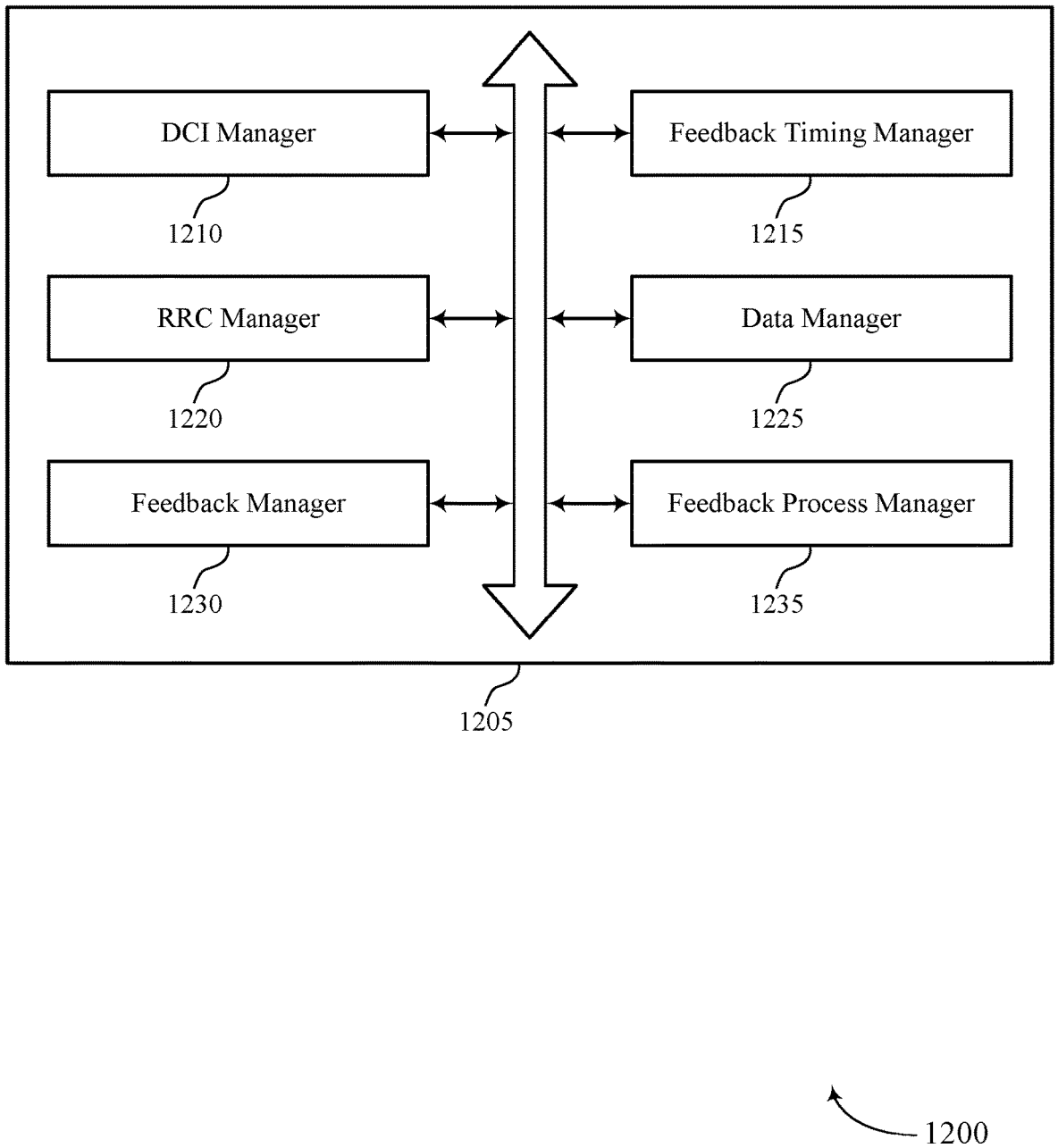
FIG. 12 shows a block diagram of a communications manager that supports out-of-order handling without flow control feedback in accordance with one or more aspects of the present disclosure.

FIG. 12 shows a block diagram 1200 of a communications manager 1205 that supports out-of-order handling without flow control feedback in accordance with one or more aspects of the present disclosure. The communications manager 1205 may be an example of aspects of a communications manager 1015, a communications manager 1115, or a communications manager 1310 described herein. The communications manager 1205 may include a DCI manager 1210, a feedback timing manager 1215, an RRC manager 1220, a data manager 1225, a feedback manager 1230, and a feedback process manager 1235. Each of these modules may communicate, directly or indirectly, with one another (e.g., via one or more buses).

The DCI manager 1210 may transmit a first downlink data transmission and a second downlink data transmission to a UE, the first downlink data transmission preceding the second downlink data transmission, where the first downlink data transmission and the second downlink data transmission are associated with a same flow control feedback process. The DCI manager 1210 may transmit the second downlink data transmission based on flow control feedback being disabled for the flow control feedback process.

The DCI manager 1210 may transmit a first field in DCI indicating that flow control feedback is disabled for a flow control feedback process, where the DCI schedules transmission of downlink data and indicates that the downlink data is associated with the flow control feedback process. The DCI manager 1210 may transmit a second field in the DCI associated with the flow control feedback process associated with the downlink data.

The DCI manager 1210 may transmit, to a UE, DCI scheduling a downlink data transmission to the UE, where flow control feedback is disabled for the downlink data transmission. The feedback timing manager 1215 may transmit, to the UE, an indication of a timing for reporting the flow control feedback to the base station for the downlink data transmission with the flow control feedback being disabled for the downlink data transmission.

The DCI manager 1210 may transmit, to a UE, DCI scheduling a downlink data transmission to the UE, where flow control feedback is disabled for the downlink data transmission. In some examples, the DCI manager 1210 may transmit DCI scheduling a first downlink data transmission to a UE. In some examples, the DCI manager 1210 may transmit DCI scheduling the second downlink data transmission based on whether flow control feedback is disabled for the first downlink data transmission. In some examples, the DCI manager 1210 may transmit DCI scheduling transmission of the downlink data and indicating that the downlink data is associated with the identified flow control feedback process.

In some examples, the DCI manager 1210 may transmit, in the DCI, the indication of the timing for reporting flow control feedback to the base station for the downlink data transmission. In some examples, the DCI manager 1210 may transmit DCI scheduling the second downlink data transmission after a threshold amount of time after the first downlink data transmission based on the flow control feedback being disabled for the first downlink data transmission. In some examples, the DCI manager 1210 may transmit DCI scheduling the second downlink data transmission regardless of when the first downlink data transmission is scheduled and regardless of a timing for reporting flow control feedback for the second downlink data transmission.

In some examples, the DCI manager 1210 may transmit a first field in the DCI indicating that flow control feedback is disabled for the flow control feedback process. In some examples, the DCI manager 1210 may transmit a second field in the DCI indicating the flow control feedback process associated with the downlink data. In some cases, the first field includes a flow control field. In some cases, the second field includes a DAI or TPC field. The feedback timing manager 1215 may transmit, to the UE, an indication of a timing for reporting flow control feedback to the base station for the downlink data transmission with flow control feedback being disabled for the downlink data transmission. In some cases, the timing for reporting flow control feedback to the base station for the downlink data transmission is preconfigured at the base station. In some cases, the timing for reporting flow control feedback to the base station for the downlink data transmission is based on a subcarrier spacing configured for the downlink data transmission.

The data manager 1225 may identify a second downlink data transmission for the UE, the first downlink data transmission preceding the second downlink data transmission. In some examples, the data manager 1225 may identify downlink data to transmit to a UE. In some cases, the first downlink data transmission and the second downlink data transmission are associated with a same flow control feedback process or include a same transport block. The feedback manager 1230 may determine whether flow control feedback is disabled for the first downlink data transmission. In some examples, the feedback manager 1230 may determine to disable flow control feedback from the UE for the downlink data. In some examples, the feedback manager 1230 may determine that flow control feedback is disabled for the first downlink data transmission. The feedback process manager 1235 may identify a flow control feedback process indicating that flow control feedback from the UE is disabled based on the determining. The RRC manager 1220 may transmit, in RRC signaling, a set of timings for reporting flow control feedback to the base station for the downlink data transmission. In some cases, the UE and the base station are operating in an NTN. The DCI manager 1210 may transmit DCI scheduling the first downlink data transmission and the second downlink data transmission.

Figure 13:
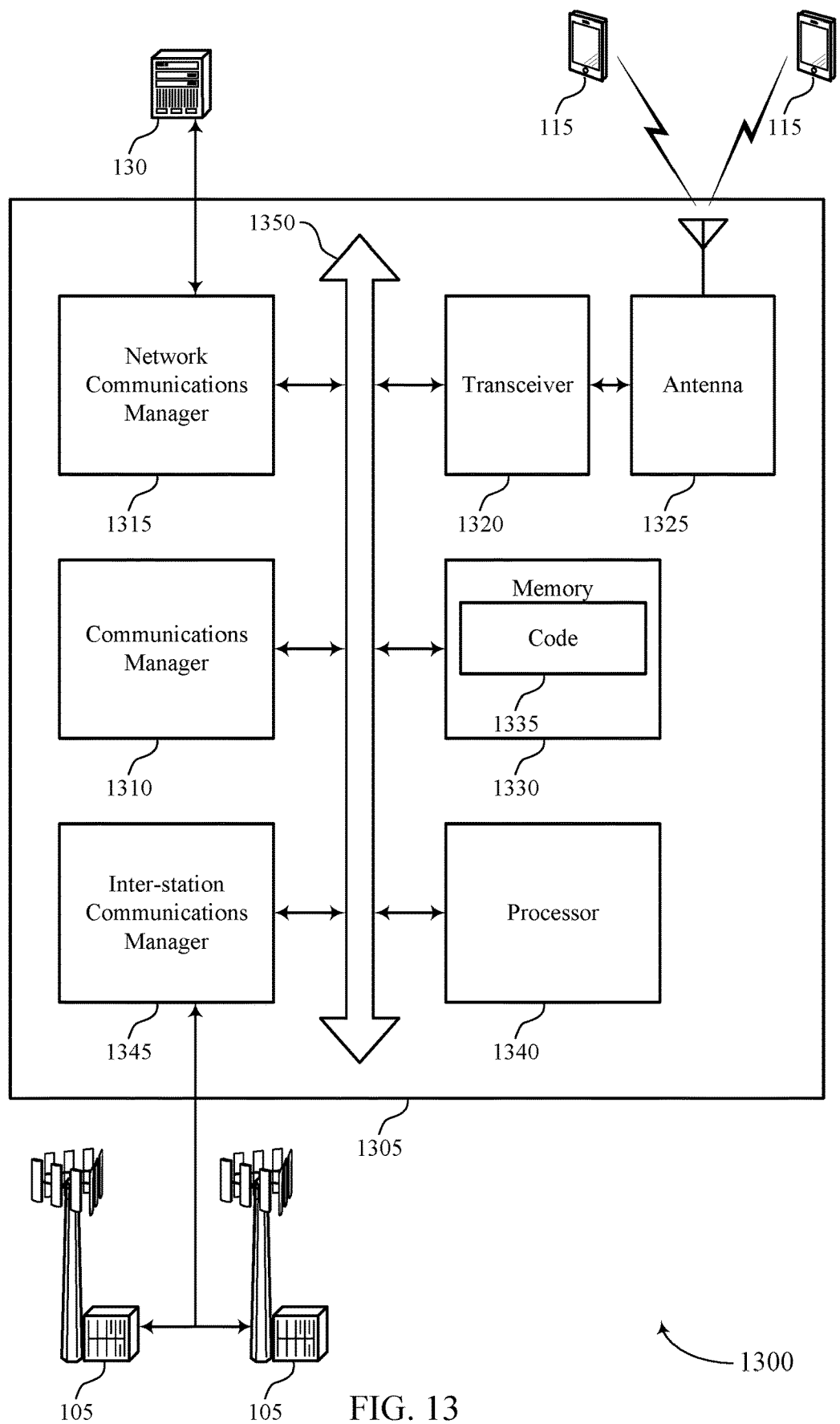
FIG. 13 shows a diagram of a system including a device that supports out-of-order handling without flow control feedback in accordance with one or more aspects of the present disclosure.

FIG. 13 shows a diagram of a system 1300 including a device 1305 that supports out-of-order handling without flow control feedback in accordance with one or more aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit a first downlink data transmission and a second downlink data transmission to a UE, the first downlink data transmission preceding the second downlink data transmission, where the first downlink data transmission and the second downlink data transmission are associated with a same flow control feedback process, and transmit the second downlink data transmission based on flow control feedback being disabled for the flow control feedback process.

The communications manager 1310 may also transmit a first field in DCI indicating that flow control feedback is disabled for a flow control feedback process, where the DCI schedules transmission of downlink data and indicates that the downlink data is associated with the flow control feedback process, and transmit a second field in the DCI associated with the flow control feedback process associated with the downlink data.

The communications manager 1310 may also transmit, to a UE, DCI scheduling a downlink data transmission to the UE, where flow control feedback is disabled for the downlink data transmission, and transmit, to the UE, an indication of a timing for reporting the flow control feedback to the base station for the downlink data transmission with the flow control feedback being disabled for the downlink data transmission.

The communications manager 1310 may also transmit, to a UE, DCI scheduling a downlink data transmission to the UE, where flow control feedback is disabled for the downlink data transmission and transmit, to the UE, an indication of a timing for reporting flow control feedback to the base station for the downlink data transmission with flow control feedback being disabled for the downlink data transmission.

The communications manager 1310 may also transmit DCI scheduling a first downlink data transmission to a UE, transmit DCI scheduling the second downlink data transmission based on whether flow control feedback is disabled for the first downlink data transmission, identify a second downlink data transmission for the UE, the first downlink data transmission preceding the second downlink data transmission, and determine whether flow control feedback is disabled for the first downlink data transmission.

The communications manager 1310 may also identify downlink data to transmit to a UE, determine to disable flow control feedback from the UE for the downlink data, identify a flow control feedback process indicating that flow control feedback from the UE is disabled based on the determining, and transmit DCI scheduling transmission of the downlink data and indicating that the downlink data is associated with the identified flow control feedback process.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting out-of-order handling without flow control feedback).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
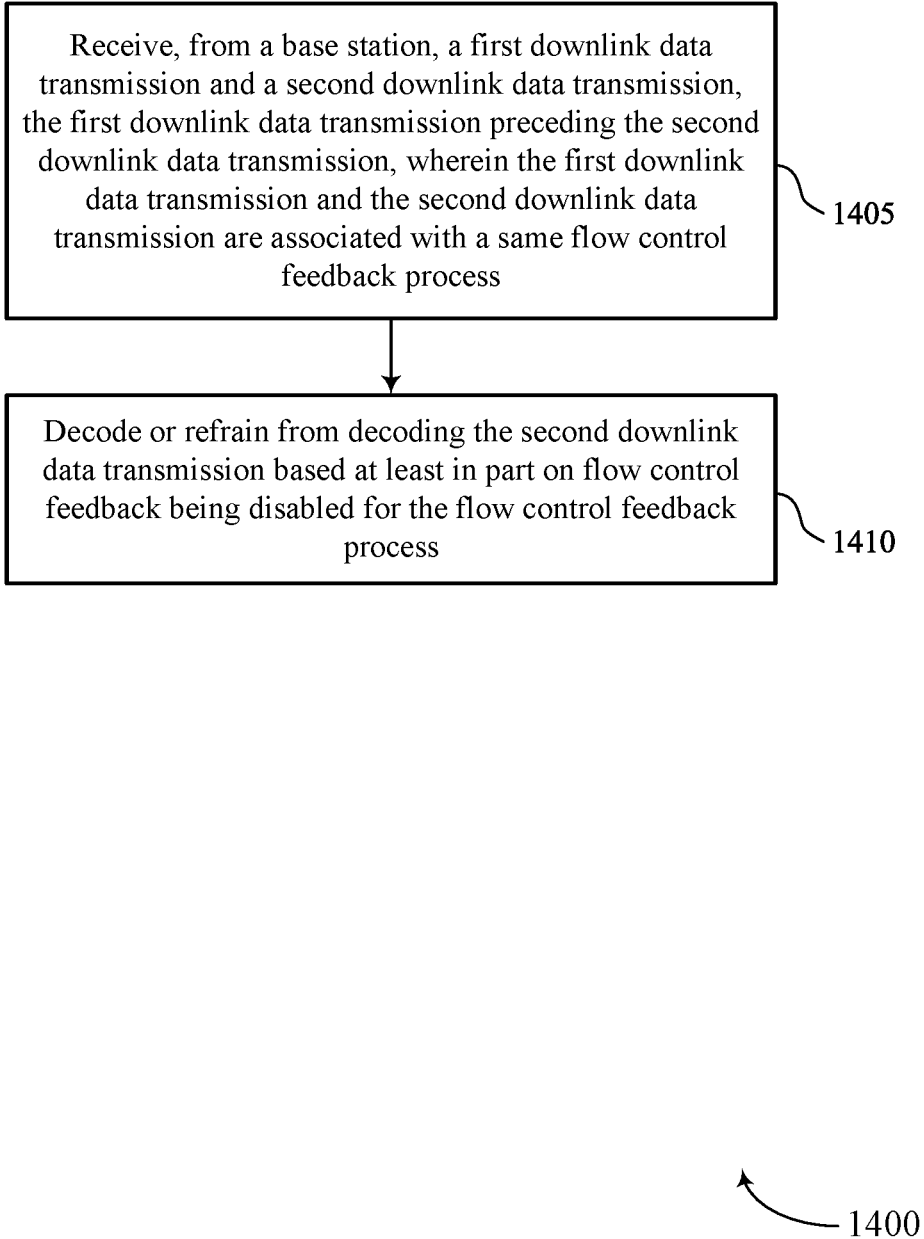
FIGS. 14 through 25 show flowcharts illustrating methods that support out-of-order handling without flow control feedback in accordance with one or more aspects of the present disclosure.

FIG. 14 shows a flowchart illustrating a method 1400 that supports out-of-order handling without flow control feedback in accordance with aspects of the present disclosure. The operations of the method 1400 may be implemented by a UE or its components as described herein. For example, the operations of method 1400 may be performed by a communications manager as described with reference to FIGS. 6 through 9. In some examples, a UE may execute a set of instructions to control the functional elements of the UE to perform the functions described below. Additionally, or alternatively, a UE may perform aspects of the functions described below using special-purpose hardware.

At 1405, the method may include receiving, from a base station, a first downlink data transmission and a second downlink data transmission, the first downlink data transmission preceding the second downlink data transmission, where the first downlink data transmission and the second downlink data transmission are associated with a same flow control feedback process. The operations of 1405 may be performed in accordance with examples as disclosed herein. In some examples, aspects of the operations of 1405 may be performed by a DCI manager as described with reference to FIGS. 6 through 9.

At 1410, the method may include decoding or refraining from decoding the second downlink data transmission based on flow control feedback being disabled for the flow control feedback process. The operations of 1410 may be performed according to the methods described herein. In some examples, aspects of the operations of 1410 may be performed by a decoder as described with reference to FIGS. 6 through 9.

Figure 15:
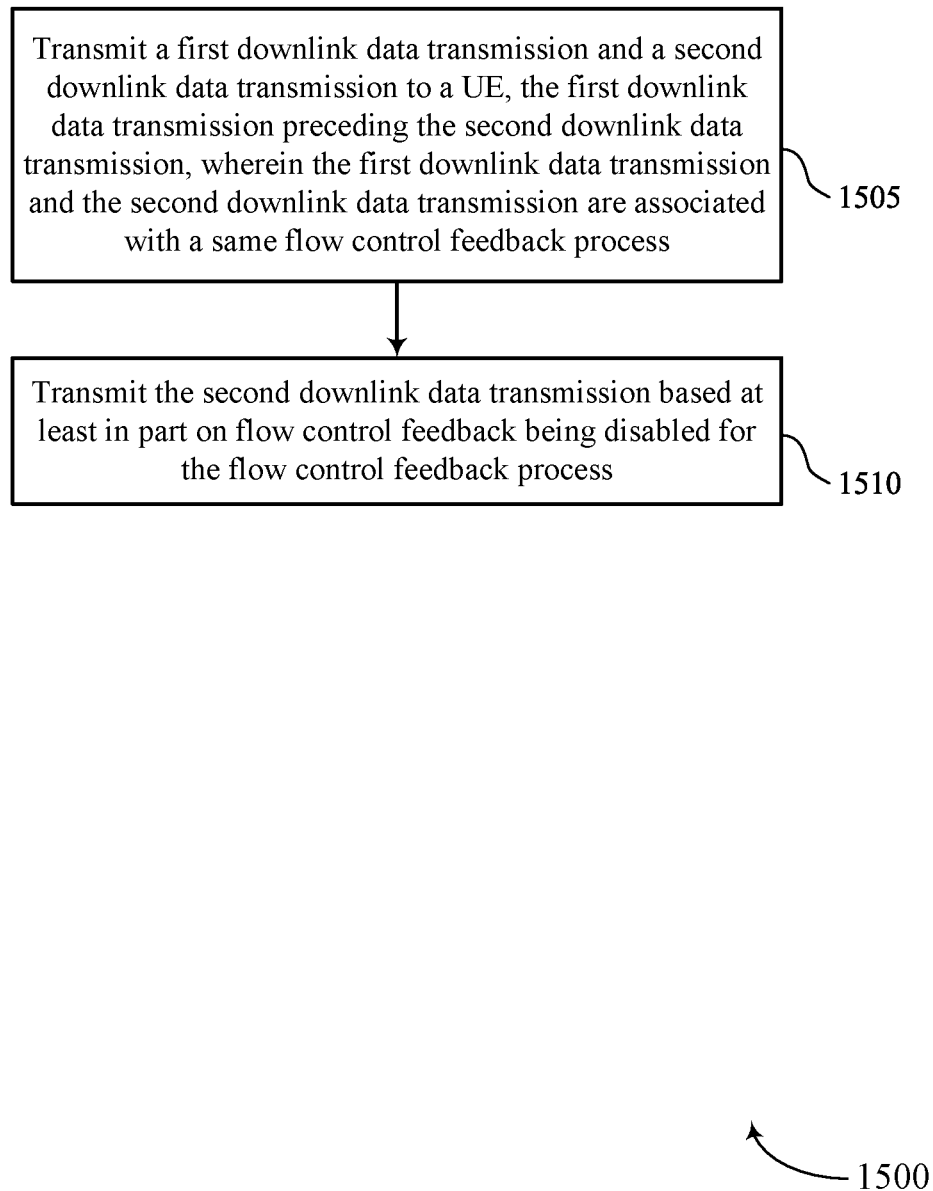

FIG. 15 shows a flowchart illustrating a method 1500 that supports out-of-order handling without flow control feedback in accordance with aspects of the present disclosure. The operations of the method 1500 may be implemented by a base station or its components as described herein. For example, the operations of method 1500 may be performed by a communications manager as described with reference to FIGS. 10 through 13. In some examples, a base station may execute a set of instructions to control the functional elements of the base station to perform the functions described below. Additionally, or alternatively, a base station may perform aspects of the functions described below using special-purpose hardware.

At 1505, the method may include transmitting a first downlink data transmission and a second downlink data transmission to a UE, the first downlink data transmission preceding the second downlink data transmission, where the first downlink data transmission and the second downlink data transmission are associated with a same flow control feedback process. The operations of 1505 may be performed in accordance with examples as disclosed herein. In some examples, aspects of the operations of 1505 may be performed by a DCI manager as described with reference to FIGS. 10 through 13.

At 1510, the method may include transmitting the second downlink data transmission based on flow control feedback being disabled for the flow control feedback process. The operations of 1510 may be performed in accordance with examples as disclosed herein. In some examples, aspects of the operations of 1510 may be performed by a DCI manager as described with reference to FIGS. 10 through 13.

Figure 16:
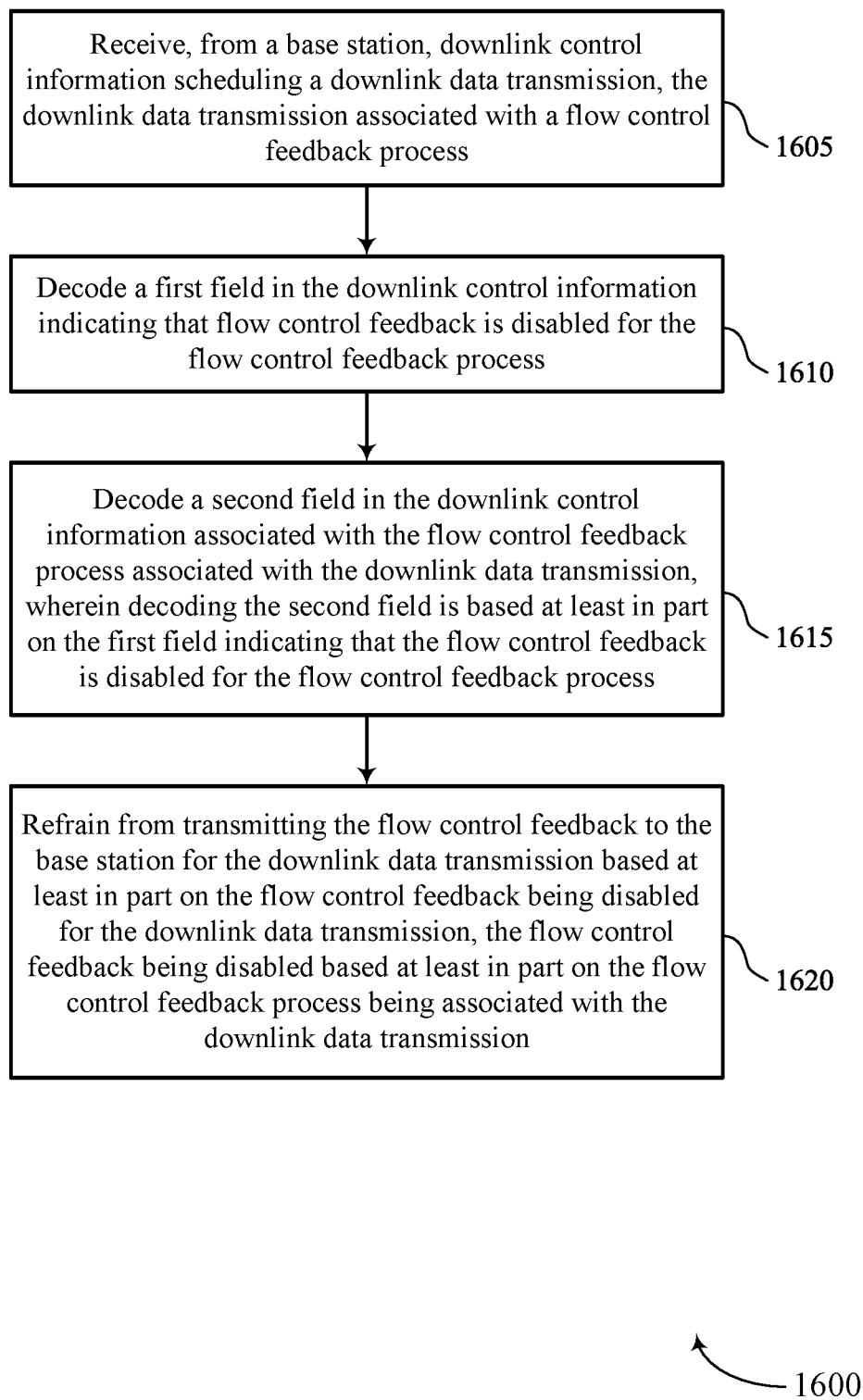

FIG. 16 shows a flowchart illustrating a method 1600 that supports out-of-order handling without flow control feedback in accordance with aspects of the present disclosure. The operations of the method 1600 may be implemented by a UE or its components as described herein. For example, the operations of method 1600 may be performed by a communications manager as described with reference to FIGS. 6 through 9. In some examples, a UE may execute a set of instructions to control the functional elements of the UE to perform the functions described below. Additionally, or alternatively, a UE may perform aspects of the functions described below using special-purpose hardware.

At 1605, the method may include receiving, from a base station, DCI scheduling a downlink data transmission, the downlink data transmission associated with a flow control feedback process. The operations of 1605 may be performed in accordance with examples as disclosed herein. In some examples, aspects of the operations of 1605 may be performed by a DCI manager as described with reference to FIGS. 6 through 9.

At 1610, the method may include decoding a first field in the DCI indicating that flow control feedback is disabled for the flow control feedback process. The operations of 1610 may be performed in accordance with examples as disclosed herein. In some examples, aspects of the operations of 1610 may be performed by a decoder as described with reference to FIGS. 6 through 9.

At 1615, the method may include decoding a second field in the DCI associated with the flow control feedback process associated with the downlink data transmission, where decoding the second field is based on the first field indicating that the flow control feedback is disabled for the flow control feedback process. The operations of 1615 may be performed in accordance with examples as disclosed herein. In some examples, aspects of the operations of 1615 may be performed by a decoder as described with reference to FIGS. 6 through 9.

At 1620, the method may include refraining from transmitting the flow control feedback to the base station for the downlink data transmission based on the flow control feedback being disabled for the downlink data transmission, the flow control feedback being disabled based on the flow control feedback process being associated with the downlink data transmission. The operations of 1620 may be performed in accordance with examples as disclosed herein. In some examples, aspects of the operations of 1620 may be performed by a feedback manager as described with reference to FIGS. 6 through 9.

Figure 17:
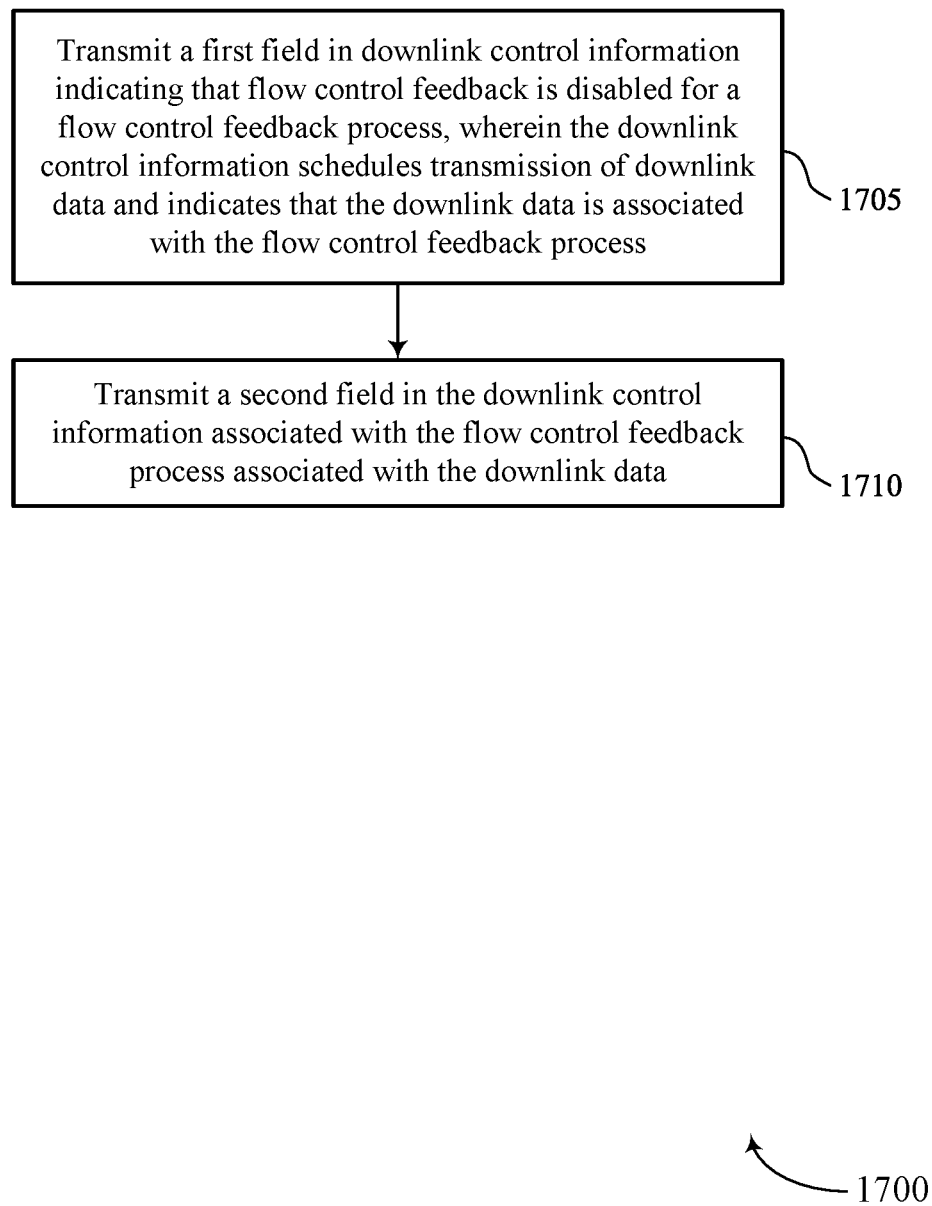

FIG. 17 shows a flowchart illustrating a method 1700 that supports out-of-order handling without flow control feedback in accordance with aspects of the present disclosure. The operations of the method 1700 may be implemented by a base station or its components as described herein. For example, the operations of method 1700 may be performed by a communications manager as described with reference to FIGS. 10 through 13. In some examples, a base station may execute a set of instructions to control the functional elements of the base station to perform the functions described below. Additionally, or alternatively, a base station may perform aspects of the functions described below using special-purpose hardware.

At 1705, the method may include transmitting a first field in DCI indicating that flow control feedback is disabled for a flow control feedback process, where the DCI schedules transmission of downlink data and indicates that the downlink data is associated with the flow control feedback process. The operations of 1705 may be performed in accordance with examples as disclosed herein. In some examples, aspects of the operations of 1705 may be performed by a DCI manager as described with reference to FIGS. 10 through 13.

At 1710, the method may include transmitting a second field in the DCI associated with the flow control feedback process associated with the downlink data. The operations of 1710 may be performed in accordance with examples as disclosed herein. In some examples, aspects of the operations of 1710 may be performed by a DCI manager as described with reference to FIGS. 10 through 13.

Figure 18:
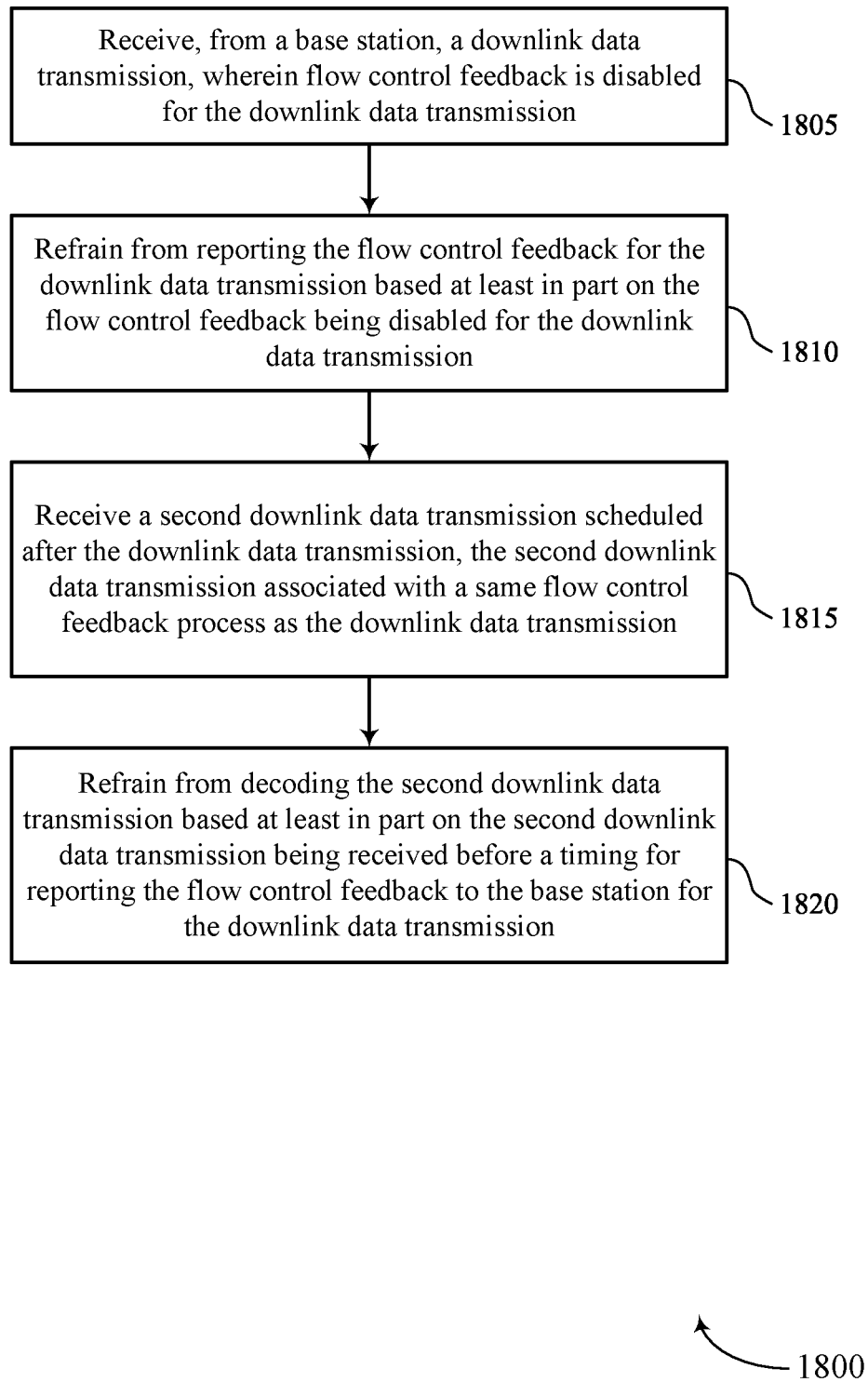

FIG. 18 shows a flowchart illustrating a method 1800 that supports out-of-order handling without flow control feedback in accordance with aspects of the present disclosure. The operations of the method 1800 may be implemented by a UE or its components as described herein. For example, the operations of method 1800 may be performed by a communications manager as described with reference to FIGS. 6 through 9. In some examples, a UE may execute a set of instructions to control the functional elements of the UE to perform the functions described below. Additionally, or alternatively, a UE may perform aspects of the functions described below using special-purpose hardware.

At 1805, the method may include receiving, from a base station, a downlink data transmission, where flow control feedback is disabled for the downlink data transmission. The operations of 1805 may be performed in accordance with examples as disclosed herein. In some examples, aspects of the operations of 1805 may be performed by a DCI manager as described with reference to FIGS. 6 through 9.

At 1810, the method may include refraining from reporting the flow control feedback for the downlink data transmission based on the flow control feedback being disabled for the downlink data transmission. The operations of 1810 may be performed in accordance with examples as disclosed herein. In some examples, aspects of the operations of 1810 may be performed by a feedback manager as described with reference to FIGS. 6 through 9.

At 1815, the method may include receiving a second downlink data transmission scheduled after the downlink data transmission, the second downlink data transmission associated with a same flow control feedback process as the downlink data transmission. The operations of 1815 may be performed in accordance with examples as disclosed herein. In some examples, aspects of the operations of 1815 may be performed by a DCI manager as described with reference to FIGS. 6 through 9.

At 1820, the method may include refraining from decoding the second downlink data transmission based on the second downlink data transmission being received before a timing for reporting the flow control feedback to the base station for the downlink data transmission. The operations of 1820 may be performed in accordance with examples as disclosed herein. In some examples, aspects of the operations of 1820 may be performed by a feedback manager as described with reference to FIGS. 6 through 9.

Figure 19:
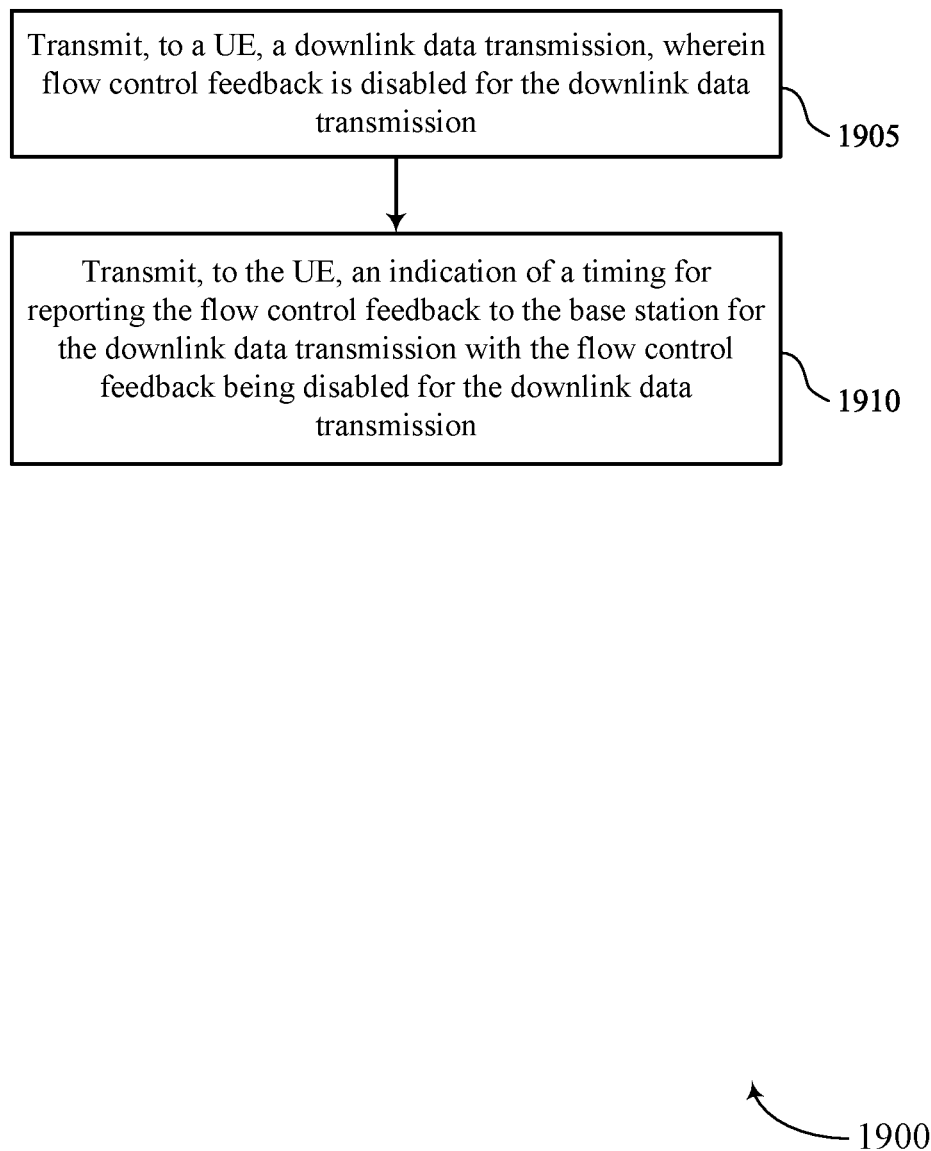

FIG. 19 shows a flowchart illustrating a method 1900 that supports out-of-order handling without flow control feedback in accordance with aspects of the present disclosure. The operations of the method 1900 may be implemented by a base station or its components as described herein. For example, the operations of method 1900 may be performed by a communications manager as described with reference to FIGS. 10 through 13. In some examples, a base station may execute a set of instructions to control the functional elements of the base station to perform the functions described below. Additionally, or alternatively, a base station may perform aspects of the functions described below using special-purpose hardware.

At 1905, the method may include transmitting, to a UE, a downlink data transmission, where flow control feedback is disabled for the downlink data transmission. The operations of 1905 may be performed in accordance with examples as disclosed herein. In some examples, aspects of the operations of 1905 may be performed by a DCI manager as described with reference to FIGS. 10 through 13.

At 1910, the method may include transmitting, to the UE, an indication of a timing for reporting the flow control feedback to the base station for the downlink data transmission with the flow control feedback being disabled for the downlink data transmission. The operations of 1910 may be performed in accordance with examples as disclosed herein. In some examples, aspects of the operations of 1910 may be performed by a feedback timing manager as described with reference to FIGS. 10 through 13.

Figure 20:
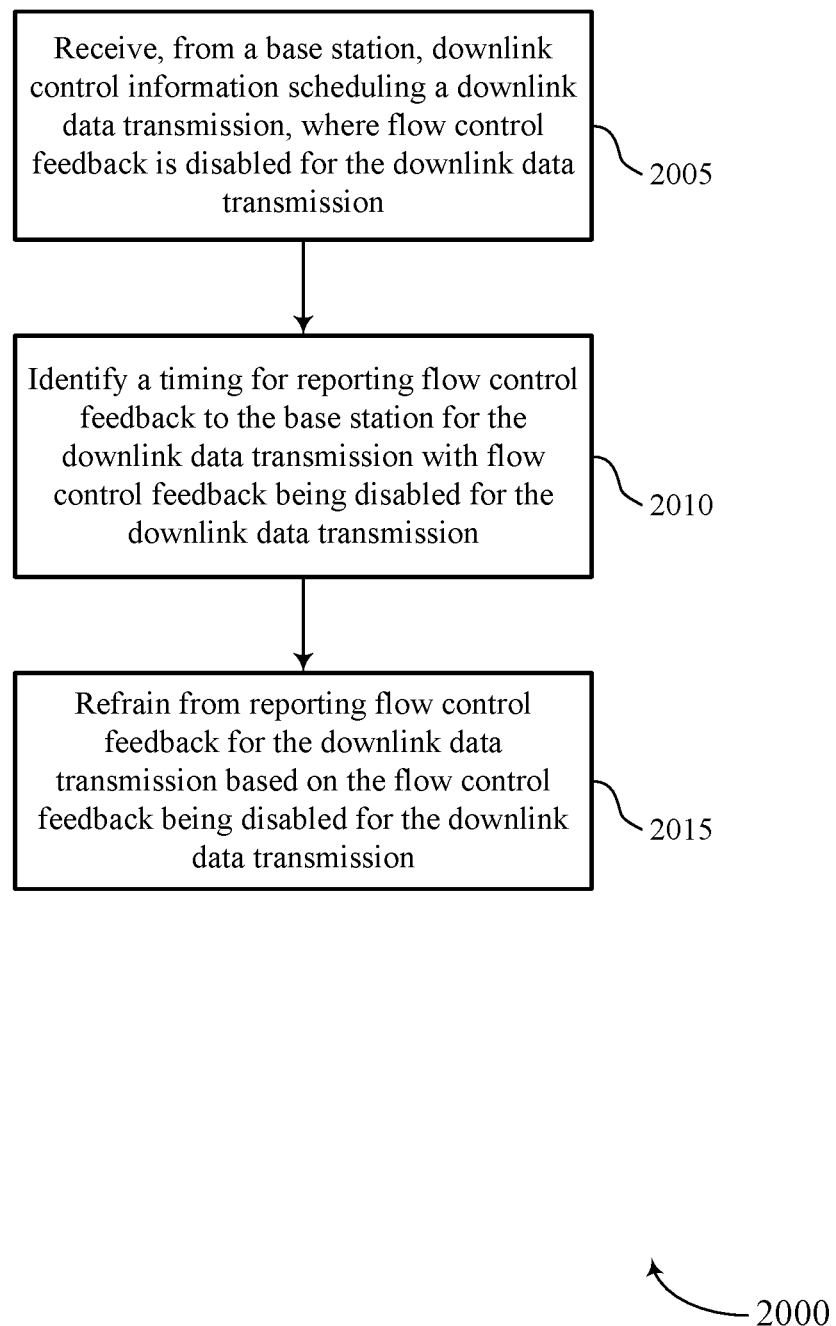

FIG. 20 shows a flowchart illustrating a method 2000 that supports out-of-order handling without flow control feedback in accordance with one or more aspects of the present disclosure. The operations of method 2000 may be implemented by a UE 115 or its components as described herein. For example, the operations of method 2000 may be performed by a communications manager as described with reference to FIGS. 6 through 9. In some examples, a UE may execute a set of instructions to control the functional elements of the UE to perform the functions described below. Additionally, or alternatively, a UE may perform aspects of the functions described below using special-purpose hardware.

At 2005, the UE may receive, from a base station, DCI scheduling a downlink data transmission, where flow control feedback is disabled for the downlink data transmission. The operations of 2005 may be performed according to the methods described herein. In some examples, aspects of the operations of 2005 may be performed by a DCI manager as described with reference to FIGS. 6 through 9.

At 2010, the UE may identify a timing for reporting flow control feedback to the base station for the downlink data transmission with flow control feedback being disabled for the downlink data transmission. The operations of 2010 may be performed according to the methods described herein. In some examples, aspects of the operations of 2010 may be performed by a feedback timing manager as described with reference to FIGS. 6 through 9.

At 2015, the UE may refrain from reporting flow control feedback for the downlink data transmission based on the flow control feedback being disabled for the downlink data transmission. The operations of 2015 may be performed according to the methods described herein. In some examples, aspects of the operations of 2015 may be performed by a feedback manager as described with reference to FIGS. 6 through 9.

Figure 21:
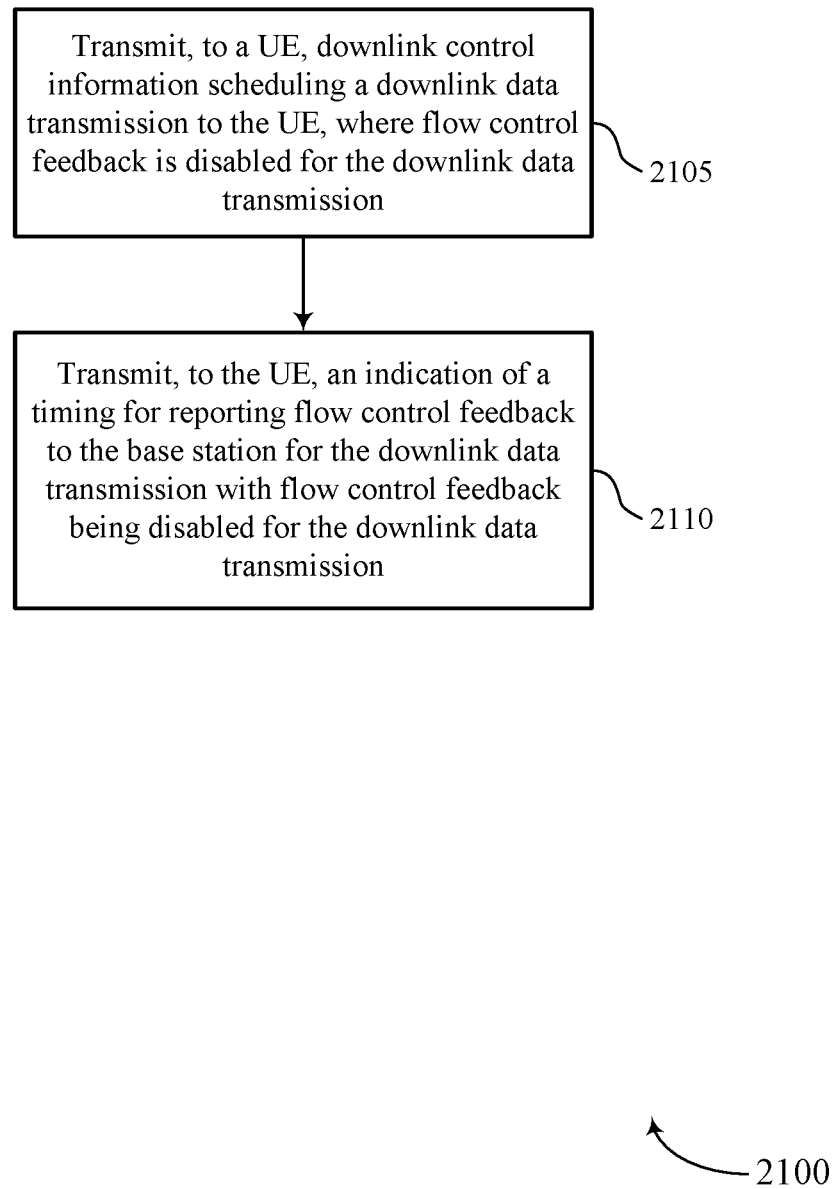

FIG. 21 shows a flowchart illustrating a method 2100 that supports out-of-order handling without flow control feedback in accordance with one or more aspects of the present disclosure. The operations of method 2100 may be implemented by a base station 105 or its components as described herein. For example, the operations of method 2100 may be performed by a communications manager as described with reference to FIGS. 10 through 13. In some examples, a base station may execute a set of instructions to control the functional elements of the base station to perform the functions described below. Additionally, or alternatively, a base station may perform aspects of the functions described below using special-purpose hardware.

At 2105, the base station may transmit, to a UE, DCI scheduling a downlink data transmission to the UE, where flow control feedback is disabled for the downlink data transmission. The operations of 2105 may be performed according to the methods described herein. In some examples, aspects of the operations of 2105 may be performed by a DCI manager as described with reference to FIGS. 10 through 13.

At 2110, the base station may transmit, to the UE, an indication of a timing for reporting flow control feedback to the base station for the downlink data transmission with flow control feedback being disabled for the downlink data transmission. The operations of 2110 may be performed according to the methods described herein. In some examples, aspects of the operations of 2110 may be performed by a feedback timing manager as described with reference to FIGS. 10 through 13.

Figure 22:
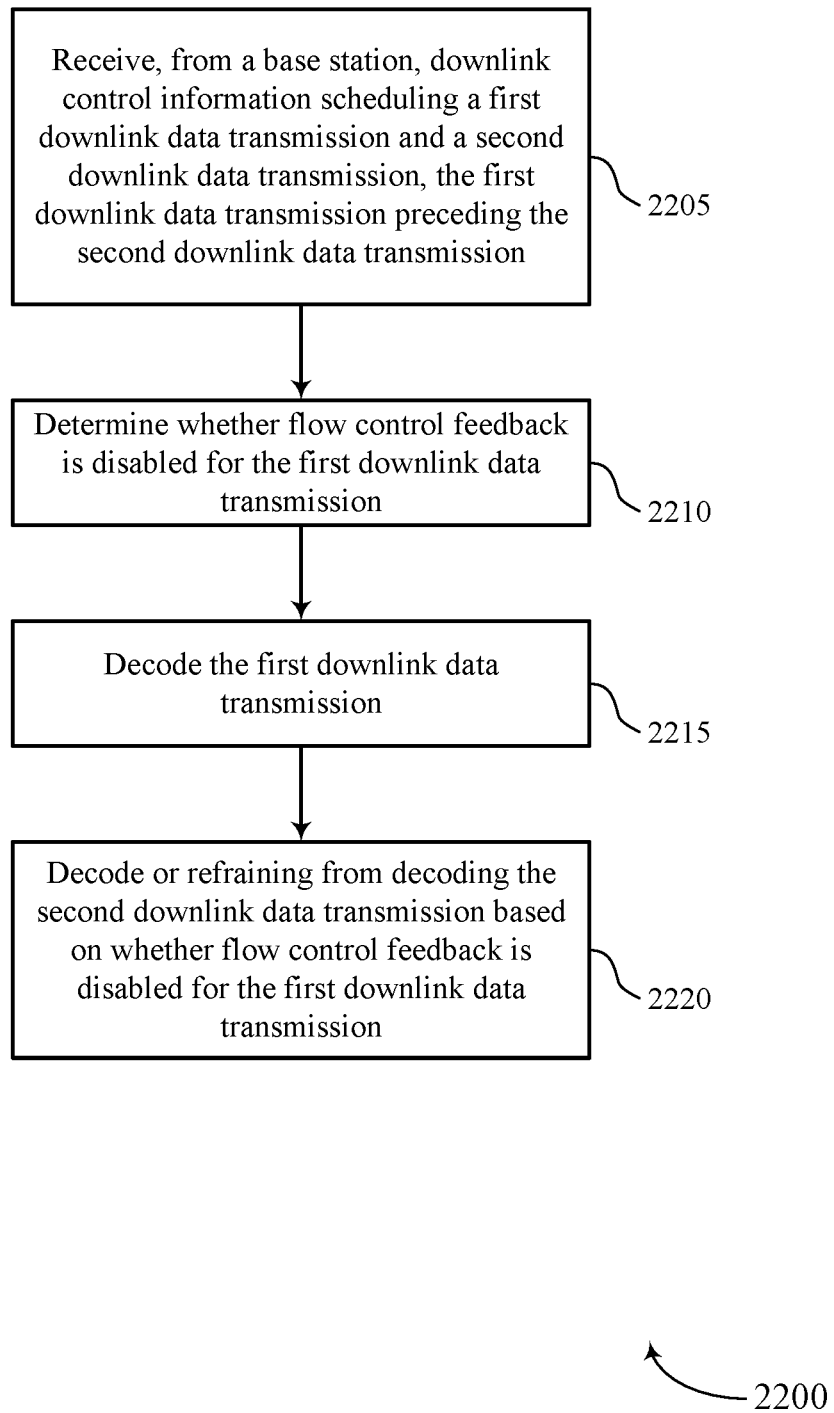

FIG. 22 shows a flowchart illustrating a method 2200 that supports out-of-order handling without flow control feedback in accordance with one or more aspects of the present disclosure. The operations of method 2200 may be implemented by a UE 115 or its components as described herein. For example, the operations of method 2200 may be performed by a communications manager as described with reference to FIGS. 6 through 9. In some examples, a UE may execute a set of instructions to control the functional elements of the UE to perform the functions described below. Additionally, or alternatively, a UE may perform aspects of the functions described below using special-purpose hardware.

At 2205, the UE may receive, from a base station, DCI scheduling a first downlink data transmission and a second downlink data transmission, the first downlink data transmission preceding the second downlink data transmission. The operations of 2205 may be performed according to the methods described herein. In some examples, aspects of the operations of 2205 may be performed by a DCI manager as described with reference to FIGS. 6 through 9.

At 2210, the UE may determine whether flow control feedback is disabled for the first downlink data transmission. The operations of 2210 may be performed according to the methods described herein. In some examples, aspects of the operations of 2210 may be performed by a feedback manager as described with reference to FIGS. 6 through 9.

At 2215, the UE may decode the first downlink data transmission. The operations of 2215 may be performed according to the methods described herein. In some examples, aspects of the operations of 2215 may be performed by a decoder as described with reference to FIGS. 6 through 9.

At 2220, the UE may decode or refrain from decoding the second downlink data transmission based on whether flow control feedback is disabled for the first downlink data transmission. The operations of 2220 may be performed according to the methods described herein. In some examples, aspects of the operations of 2220 may be performed by a decoder as described with reference to FIGS. 6 through 9.

Figure 23:
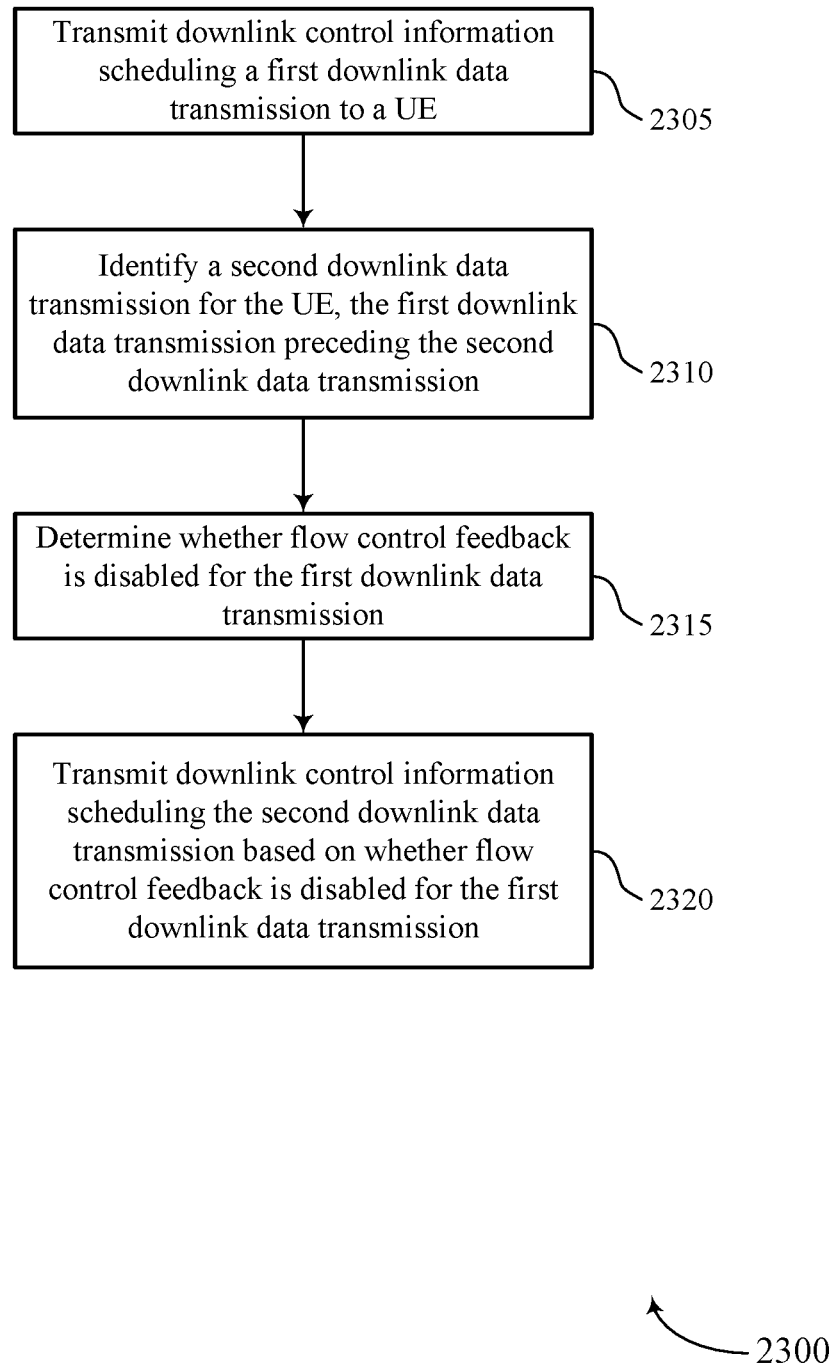

FIG. 23 shows a flowchart illustrating a method 2300 that supports out-of-order handling without flow control feedback in accordance with one or more aspects of the present disclosure. The operations of method 2300 may be implemented by a base station 105 or its components as described herein. For example, the operations of method 2300 may be performed by a communications manager as described with reference to FIGS. 10 through 13. In some examples, a base station may execute a set of instructions to control the functional elements of the base station to perform the functions described below. Additionally, or alternatively, a base station may perform aspects of the functions described below using special-purpose hardware.

At 2305, the base station may transmit DCI scheduling a first downlink data transmission to a UE. The operations of 2305 may be performed according to the methods described herein. In some examples, aspects of the operations of 2305 may be performed by a DCI manager as described with reference to FIGS. 10 through 13.

At 2310, the base station may identify a second downlink data transmission for the UE, the first downlink data transmission preceding the second downlink data transmission. The operations of 2310 may be performed according to the methods described herein. In some examples, aspects of the operations of 2310 may be performed by a data manager as described with reference to FIGS. 10 through 13.

At 2315, the base station may determine whether flow control feedback is disabled for the first downlink data transmission. The operations of 2315 may be performed according to the methods described herein. In some examples, aspects of the operations of 2315 may be performed by a feedback manager as described with reference to FIGS. 10 through 13.

At 2320, the base station may transmit DCI scheduling the second downlink data transmission based on whether flow control feedback is disabled for the first downlink data transmission. The operations of 2320 may be performed according to the methods described herein. In some examples, aspects of the operations of 2320 may be performed by a DCI manager as described with reference to FIGS. 10 through 13.

Figure 24:
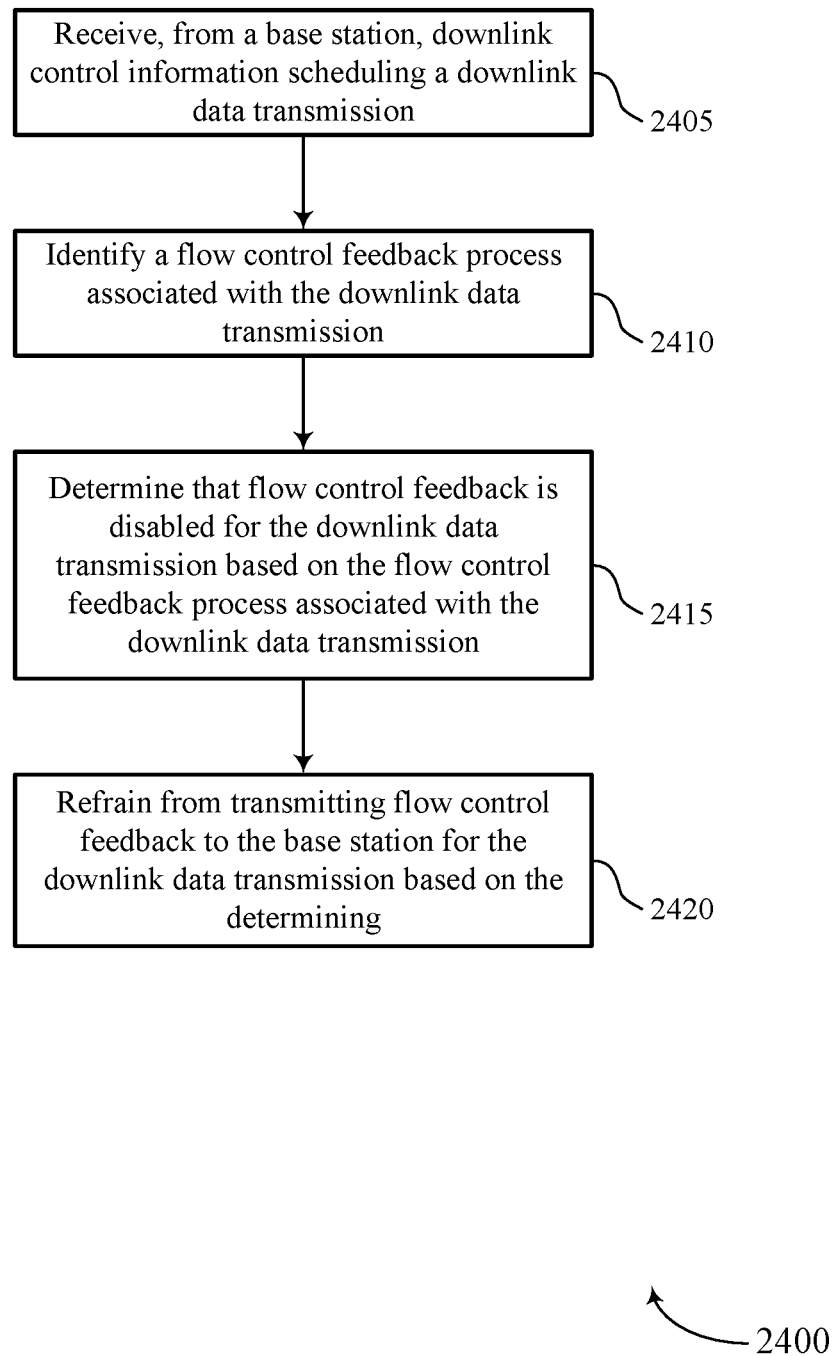

FIG. 24 shows a flowchart illustrating a method 2400 that supports out-of-order handling without flow control feedback in accordance with one or more aspects of the present disclosure. The operations of method 2400 may be implemented by a UE 115 or its components as described herein. For example, the operations of method 2400 may be performed by a communications manager as described with reference to FIGS. 6 through 9. In some examples, a UE may execute a set of instructions to control the functional elements of the UE to perform the functions described below. Additionally, or alternatively, a UE may perform aspects of the functions described below using special-purpose hardware.

At 2405, the UE may receive, from a base station, DCI scheduling a downlink data transmission. The operations of 2405 may be performed according to the methods described herein. In some examples, aspects of the operations of 2405 may be performed by a DCI manager as described with reference to FIGS. 6 through 9.

At 2410, the UE may identify a flow control feedback process associated with the downlink data transmission. The operations of 2410 may be performed according to the methods described herein. In some examples, aspects of the operations of 2410 may be performed by a feedback process manager as described with reference to FIGS. 6 through 9.

At 2415, the UE may determine that flow control feedback is disabled for the downlink data transmission based on the flow control feedback process associated with the downlink data transmission. The operations of 2415 may be performed according to the methods described herein. In some examples, aspects of the operations of 2415 may be performed by a feedback manager as described with reference to FIGS. 6 through 9.

At 2420, the UE may refrain from transmitting flow control feedback to the base station for the downlink data transmission based on the determining. The operations of 2420 may be performed according to the methods described herein. In some examples, aspects of the operations of 2420 may be performed by a feedback manager as described with reference to FIGS. 6 through 9.

Figure 25:
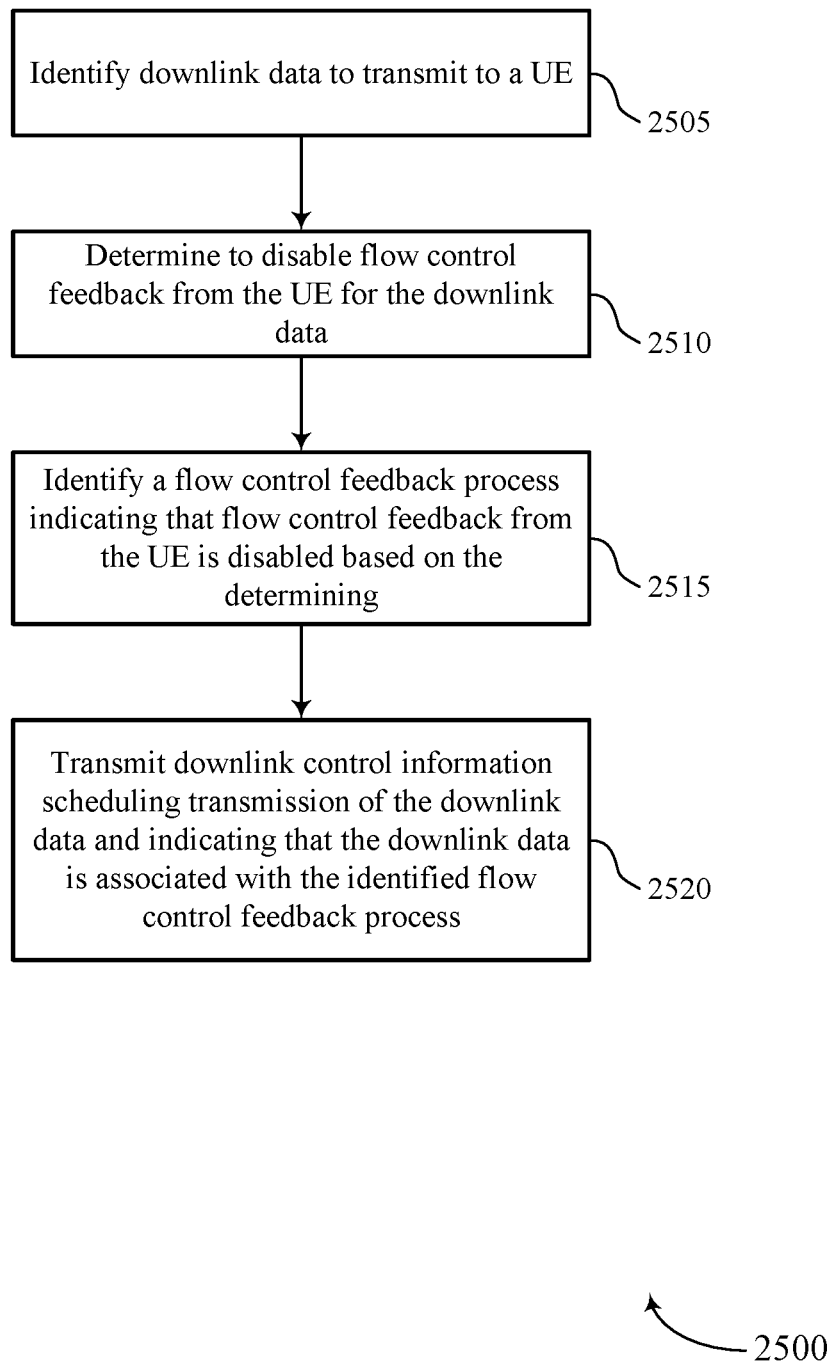

FIG. 25 shows a flowchart illustrating a method 2500 that supports out-of-order handling without flow control feedback in accordance with one or more aspects of the present disclosure. The operations of method 2500 may be implemented by a base station 105 or its components as described herein. For example, the operations of method 2500 may be performed by a communications manager as described with reference to FIGS. 10 through 13. In some examples, a base station may execute a set of instructions to control the functional elements of the base station to perform the functions described below. Additionally, or alternatively, a base station may perform aspects of the functions described below using special-purpose hardware.

At 2505, the base station may identify downlink data to transmit to a UE. The operations of 2505 may be performed according to the methods described herein. In some examples, aspects of the operations of 2505 may be performed by a data manager as described with reference to FIGS. 10 through 13.

At 2510, the base station may determine to disable flow control feedback from the UE for the downlink data. The operations of 2510 may be performed according to the methods described herein. In some examples, aspects of the operations of 2510 may be performed by a feedback manager as described with reference to FIGS. 10 through 13.

At 2515, the base station may identify a flow control feedback process indicating that flow control feedback from the UE is disabled based on the determining. The operations of 2515 may be performed according to the methods described herein. In some examples, aspects of the operations of 2515 may be performed by a feedback process manager as described with reference to FIGS. 10 through 13.

At 2520, the base station may transmit DCI scheduling transmission of the downlink data and indicating that the downlink data is associated with the identified flow control feedback process. The operations of 2520 may be performed according to the methods described herein. In some examples, aspects of the operations of 2520 may be performed by a DCI manager as described with reference to FIGS. 10 through 13.

The following provides an overview of examples of the present disclosure:

Aspect 1: A method for wireless communication at a UE, comprising: receiving, from a base station, a first downlink data transmission and a second downlink data transmission, the first downlink data transmission preceding the second downlink data transmission, wherein the first downlink data transmission and the second downlink data transmission are associated with a same flow control feedback process; and decoding or refraining from decoding the second downlink data transmission based at least in part on flow control feedback being disabled for the flow control feedback process.

Aspect 2: The method of aspect 1, further comprising: decoding or refraining from decoding the second downlink data transmission based at least in part on whether the second downlink data transmission is scheduled within or after a threshold amount of time after the first downlink data transmission.

Aspect 3: The method of aspect 2, further comprising: refraining from decoding the second downlink data transmission based at least in part on the second downlink data transmission being scheduled within the threshold amount of time after the first downlink data transmission.

Aspect 4: The method of any of aspects 2 through 3, further comprising: decoding the second downlink data transmission based at least in part on the second downlink data transmission being scheduled after the threshold amount of time after the first downlink data transmission.

Aspect 5: The method of any of aspects 2 through 4, wherein the first downlink data transmission and the second downlink data transmission include a same transport block.

Aspect 6: The method of any of aspects 2 through 5, wherein the threshold amount of time is based at least in part on a numerology used for the first downlink data transmission, the second downlink data transmission, or both.

Aspect 7: The method of any of aspects 2 through 6, wherein the threshold amount of time is based at least in part on a number of symbols for the first downlink data transmission, a number of symbols for the second downlink data transmission, a demodulation reference signal pattern associated with the first downlink data transmission, a demodulation reference signal pattern associated with the second downlink data transmission, or a processing capability of the UE, or a combination thereof.

Aspect 8: The method of any of aspects 1 through 7, further comprising: decoding the second downlink data transmission regardless of when the second downlink data transmission is scheduled and regardless of a timing for reporting the flow control feedback for the second downlink data transmission.

Aspect 9: The method of any of aspects 1 through 8, wherein the UE and the base station are operating in a non-terrestrial network (NTN).

Aspect 10: The method of any of aspects 1 through 9, further comprising: receiving downlink control information scheduling the first downlink data transmission and the second downlink data transmission.

Aspect 11: A method for wireless communication at a base station, comprising: transmitting a first downlink data transmission and a second downlink data transmission to a UE, the first downlink data transmission preceding the second downlink data transmission, wherein the first downlink data transmission and the second downlink data transmission are associated with a same flow control feedback process; and transmitting the second downlink data transmission based at least in part on flow control feedback being disabled for the flow control feedback process.

Aspect 12: The method of aspect 11, further comprising: determining that the flow control feedback is disabled for the first downlink data transmission; and transmitting downlink control information scheduling the second downlink data transmission after a threshold amount of time after the first downlink data transmission based at least in part on the flow control feedback being disabled for the first downlink data transmission.

Aspect 13: The method of aspect 12, wherein the first downlink data transmission and the second downlink data transmission include a same transport block.

Aspect 14: The method of any of aspects 11 through 13, further comprising: determining that the flow control feedback is disabled for the first downlink data transmission; and transmitting downlink control information scheduling the second downlink data transmission regardless of when the first downlink data transmission is scheduled and regardless of a timing for reporting the flow control feedback for the second downlink data transmission.

Aspect 15: The method of any of aspects 11 through 14, wherein the UE and the base station are operating in a non-terrestrial network (NTN).

Aspect 16: The method of any of aspects 11 through 15, further comprising: transmitting downlink control information scheduling the first downlink data transmission and the second downlink data transmission.

Aspect 17: A method for wireless communication at a UE, comprising: receiving, from a base station, downlink control information scheduling a downlink data transmission, the downlink data transmission associated with a flow control feedback process; decoding a first field in the downlink control information indicating that flow control feedback is disabled for the flow control feedback process; decoding a second field in the downlink control information associated with the flow control feedback process associated with the downlink data transmission, wherein decoding the second field is based at least in part on the first field indicating that the flow control feedback is disabled for the flow control feedback process; and refraining from transmitting the flow control feedback to the base station for the downlink data transmission based at least in part on the flow control feedback being disabled for the downlink data transmission, the flow control feedback being disabled based at least in part on the flow control feedback process being associated with the downlink data transmission.

Aspect 18: The method of aspect 17, wherein the first field comprises a flow control field.

Aspect 19: The method of any of aspects 17 through 18, wherein the second field comprises a downlink assignment index or transmit power control field.

Aspect 20: The method of any of aspects 17 through 19, wherein the UE and the base station are operating in a non-terrestrial network (NTN).

Aspect 21: A method for wireless communication at a base station, comprising: transmitting a first field in downlink control information indicating that flow control feedback is disabled for a flow control feedback process, wherein the downlink control information schedules transmission of downlink data and indicates that the downlink data is associated with the flow control feedback process; and transmitting a second field in the downlink control information associated with the flow control feedback process associated with the downlink data.

Aspect 22: The method of aspect 21, wherein the first field comprises a flow control field.

Aspect 23: The method of any of aspects 21 through 22, wherein the second field comprises a downlink assignment index or transmit power control field.

Aspect 24: The method of any of aspects 21 through 23, wherein the UE and the base station are operating in a non-terrestrial network (NTN).

Aspect 25: A method for wireless communication at a UE, comprising: receiving, from a base station, a downlink data transmission, wherein flow control feedback is disabled for the downlink data transmission; refraining from reporting the flow control feedback for the downlink data transmission based at least in part on the flow control feedback being disabled for the downlink data transmission; receiving a second downlink data transmission scheduled after the downlink data transmission, the second downlink data transmission associated with a same flow control feedback process as the first downlink data transmission; and refraining from decoding the second downlink data transmission based at least in part on the second downlink data transmission being received before a timing for reporting the flow control feedback to the base station for the first downlink data transmission.

Aspect 26: The method of aspect 25, the downlink data transmission scheduled by downlink control information, the downlink control information comprising first downlink control information, and the downlink data transmission comprising a first downlink data transmission, the method further comprising: receiving second downlink control information scheduling a second downlink data transmission; determining that the second downlink data transmission is scheduled after the first downlink data transmission and the flow control feedback for the second downlink data transmission is scheduled before the flow control feedback for the first downlink data transmission; and refraining from decoding the second downlink data transmission based at least in part on the determining.

Aspect 27: The method of any of aspects 25 through 26, further comprising: receiving, in downlink control information, an indication of the timing for reporting the flow control feedback to the base station for the downlink data transmission.

Aspect 28: The method of any of aspects 25 through 27, further comprising: receiving, in radio resource control signaling, a plurality of timings for reporting the flow control feedback to the base station for the downlink data transmission.

Aspect 29: The method of aspect 28, the identifying the timing comprising: selecting the timing for reporting the flow control feedback to the base station from the plurality of timings in the radio resource control signaling.

Aspect 30: The method of aspect 29, wherein the selected timing is a maximum, minimum, or a first timing of the plurality of timings in the radio resource control signaling, or the selected timing of the plurality of timings is indicated by another parameter.

Aspect 31: The method of any of aspects 29 through 30, wherein the selected timing is based at least in part on a flow control feedback round trip time configured in the radio resource control signaling.

Aspect 32: The method of any of aspects 25 through 31, wherein the timing for reporting the flow control feedback to the base station for the downlink data transmission is preconfigured at the UE.

Aspect 33: The method of aspect 32, wherein the timing for reporting the flow control feedback to the base station for the downlink data transmission is based at least in part on a subcarrier spacing configured for the downlink data transmission.

Aspect 34: The method of any of aspects 25 through 33, wherein the UE and the base station are operating in a non-terrestrial network (NTN).

Aspect 35: The method of any of aspects 25 through 34, further comprising: receiving downlink control information scheduling the downlink data transmission.

Aspect 36: A method for wireless communication at a base station, comprising: transmitting, to a UE, a downlink data transmission, wherein flow control feedback is disabled for the downlink data transmission; and transmitting, to the UE, an indication of a timing for reporting the flow control feedback to the base station for the downlink data transmission with the flow control feedback being disabled for the downlink data transmission.

Aspect 37: The method of aspect 36, the transmitting the indication of the timing comprising: transmitting, in downlink control information, the indication of the timing for reporting the flow control feedback to the base station for the downlink data transmission.

Aspect 38: The method of any of aspects 36 through 37, the transmitting the indication of the timing comprising: transmitting, in radio resource control signaling, a plurality of timings for reporting the flow control feedback to the base station for the downlink data transmission.

Aspect 39: The method of any of aspects 36 through 38, wherein the timing for reporting the flow control feedback to the base station for the downlink data transmission is preconfigured at the base station.

Aspect 40: The method of aspect 39, wherein the timing for reporting the flow control feedback to the base station for the downlink data transmission is based at least in part on a subcarrier spacing configured for the downlink data transmission.

Aspect 41: The method of any of aspects 36 through 40, wherein the UE and the base station are operating in a non-terrestrial network (NTN).

Aspect 42: The method of any of aspects 36 through 41, further comprising: transmitting downlink control information scheduling the downlink data transmission to the UE.

Aspect 43: An apparatus for wireless communication at a UE, comprising a processor; and memory coupled to the processor, the processor and memory configured to perform a method of any of aspects 1 through 10.

Aspect 44: An apparatus for wireless communication at a UE, comprising at least one means for performing a method of any of aspects 1 through 10.

Aspect 45: A non-transitory computer-readable medium storing code for wireless communication at a UE, the code comprising instructions executable by a processor to perform a method of any of aspects 1 through 10.

Aspect 46: An apparatus for wireless communication at a base station, comprising a processor; and memory coupled to the processor, the processor and memory configured to perform a method of any of aspects 11 through 16.

Aspect 47: An apparatus for wireless communication at a base station, comprising at least one means for performing a method of any of aspects 11 through 16.

Aspect 48: A non-transitory computer-readable medium storing code for wireless communication at a base station, the code comprising instructions executable by a processor to perform a method of any of aspects 11 through 16.

Aspect 49: An apparatus for wireless communication at a UE, comprising a processor; and memory coupled to the processor, the processor and memory configured to perform a method of any of aspects 17 through 20.

Aspect 50: An apparatus for wireless communication at a UE, comprising at least one means for performing a method of any of aspects 17 through 20.

Aspect 51: A non-transitory computer-readable medium storing code for wireless communication at a UE, the code comprising instructions executable by a processor to perform a method of any of aspects 17 through 20.

Aspect 52: An apparatus for wireless communication at a base station, comprising a processor; and memory coupled to the processor, the processor and memory configured to perform a method of any of aspects 21 through 24.

Aspect 53: An apparatus for wireless communication at a base station, comprising at least one means for performing a method of any of aspects 21 through 24.

Aspect 54: A non-transitory computer-readable medium storing code for wireless communication at a base station, the code comprising instructions executable by a processor to perform a method of any of aspects 21 through 24.

Aspect 55: An apparatus for wireless communication at a UE, comprising a processor; and memory coupled to the processor, the processor and memory configured to perform a method of any of aspects 25 through 35.

Aspect 56: An apparatus for wireless communication at a UE, comprising at least one means for performing a method of any of aspects 25 through 35.

Aspect 57: A non-transitory computer-readable medium storing code for wireless communication at a UE, the code comprising instructions executable by a processor to perform a method of any of aspects 25 through 35.

Aspect 58: An apparatus for wireless communication at a base station, comprising a processor; and memory coupled to the processor, the processor and memory configured to perform a method of any of aspects 36 through 42.

Aspect 59: An apparatus for wireless communication at a base station, comprising at least one means for performing a method of any of aspects 36 through 42.

Aspect 60: A non-transitory computer-readable medium storing code for wireless communication at a base station, the code comprising instructions executable by a processor to perform a method of any of aspects 36 through 42.

Aspect 61: A method for wireless communications at a UE, comprising: receiving, from a base station, downlink control information scheduling a downlink data transmission, wherein flow control feedback is disabled for the downlink data transmission; identifying a timing for reporting flow control feedback to the base station for the downlink data transmission with flow control feedback being disabled for the downlink data transmission; and refraining from reporting flow control feedback for the downlink data transmission based at least in part on the flow control feedback being disabled for the downlink data transmission.

Aspect 62: The method of aspect 61, wherein the downlink control information comprises first downlink control information, and the downlink data transmission comprises a first downlink data transmission, the method further comprising: receiving second downlink control information scheduling a second downlink data transmission, the second downlink data transmission associated with a same flow control feedback process as the first downlink data transmission; determining that the second downlink data transmission is scheduled after the first downlink data transmission and before flow control feedback for the first downlink data transmission based at least in part on the identified timing; and refraining from decoding the second downlink data transmission based at least in part on the determining.

Aspect 63: The method of any one of aspects 61 or 62, wherein the downlink control information comprises first downlink control information, and the downlink data transmission comprises a first downlink data transmission, the method further comprising: receiving second downlink control information scheduling a second downlink data transmission; determining that the second downlink data transmission is scheduled after the first downlink data transmission and flow control feedback for the second downlink data transmission is scheduled before flow control feedback for the first downlink data transmission based at least in part on the identified timing; and refraining from decoding the second downlink data transmission based at least in part on the determining.

Aspect 64: The method of any one of aspects 61 through 63, further comprising: receiving, in the downlink control information, an indication of the timing for reporting flow control feedback to the base station for the downlink data transmission.

Aspect 65: The method of any one of aspects 61 through 64, further comprising: receiving, in radio resource control signaling, a plurality of timings for reporting flow control feedback to the base station for the downlink data transmission.

Aspect 66: The method of any one of aspects 61 through 65, wherein identifying the timing comprises: selecting the timing for reporting flow control feedback to the base station from the plurality of timings in the radio resource control signaling.

Aspect 67: The method of any one of aspects 61 through 66, wherein the selected timing is a maximum, minimum, or first timing of the plurality of timings in the radio resource control signaling, or the selected timing of the plurality of timings is indicated by another parameter.

Aspect 68: The method of any one of aspects 61 through 67, wherein the selected timing is based at least in part on a flow control feedback round trip time configured in the radio resource control signaling.

Aspect 69: The method of any one of aspects 61 through 68, wherein the timing for reporting flow control feedback to the base station for the downlink data transmission is preconfigured at the UE.

Aspect 70: The method of any one of aspects 61 through 69, wherein the timing for reporting flow control feedback to the base station for the downlink data transmission is based at least in part on a subcarrier spacing configured for the downlink data transmission.

Aspect 71: The method of any one of aspects 61 through 70, wherein the UE and the base station are operating in an NTN.

Aspect 72: A method for wireless communications at a base station, comprising: transmitting, to a UE, downlink control information scheduling a downlink data transmission to the UE, wherein flow control feedback is disabled for the downlink data transmission; and transmitting, to the UE, an indication of a timing for reporting flow control feedback to the base station for the downlink data transmission with flow control feedback being disabled for the downlink data transmission.

Aspect 73: The method of aspect 72, wherein transmitting the indication of the timing comprises: transmitting, in the downlink control information, the indication of the timing for reporting flow control feedback to the base station for the downlink data transmission.

Aspect 74: The method of any one of aspects 72 or 73, wherein transmitting the indication of the timing comprises: transmitting, in radio resource control signaling, a plurality of timings for reporting flow control feedback to the base station for the downlink data transmission.

Aspect 75: The method of any one of aspects 72 through 74, wherein the timing for reporting flow control feedback to the base station for the downlink data transmission is preconfigured at the base station.

Aspect 76: The method of any one of aspects 72 through 75, wherein the timing for reporting flow control feedback to the base station for the downlink data transmission is based at least in part on a subcarrier spacing configured for the downlink data transmission.

Aspect 77: The method of any one of aspects 72 through 76, wherein the UE and the base station are operating in an NTN.

Aspect 78: A method for wireless communications at a UE, comprising: receiving, from a base station, downlink control information scheduling a first downlink data transmission and a second downlink data transmission, the first downlink data transmission preceding the second downlink data transmission; determining whether flow control feedback is disabled for the first downlink data transmission; decoding the first downlink data transmission; and decoding or refraining from decoding the second downlink data transmission based at least in part on whether flow control feedback is disabled for the first downlink data transmission.

Aspect 79: The method of aspect 78, further comprising: determining that flow control feedback is disabled for the first downlink data transmission; and decoding or refraining from decoding the second downlink data transmission based at least in part on whether the second downlink data transmission is scheduled within or after a threshold amount of time after the first downlink data transmission.

Aspect 80: The method of any one of aspects 78 or 79, further comprising: determining that the second downlink data transmission is scheduled within the threshold amount of time after the first downlink data transmission; and refraining from decoding the second downlink data transmission based at least in part on the second downlink data transmission being scheduled within the threshold amount of time after the first downlink data transmission.

Aspect 81: The method of any one of aspects 78 or 79, further comprising: determining that the second downlink data transmission is scheduled after the threshold amount of time after the first downlink data transmission; and decoding the second downlink data transmission based at least in part on the second downlink data transmission being scheduled after the threshold amount of time after the first downlink data transmission.

Aspect 82: The method of any one of aspects 78 through 81, wherein the first downlink data transmission and the second downlink data transmission are associated with a same flow control feedback process or include a same transport block.

Aspect 83: The method of any one of aspects 78 through 82, wherein the threshold amount of time is based at least in part on a numerology used for the first downlink data transmission, the second downlink data transmission, or both.

Aspect 84: The method of any one of aspects 78 through 83, further comprising: determining that flow control feedback is disabled for the first downlink data transmission; and decoding the second downlink data transmission regardless of when the second downlink data transmission is scheduled and regardless of a timing for reporting flow control feedback for the second downlink data transmission.

Aspect 85: The method of any one of aspects 78 through 84, wherein the UE and the base station are operating in an NTN.

Aspect 86: A method for wireless communications at a base station, comprising: transmitting downlink control information scheduling a first downlink data transmission to a UE; identifying a second downlink data transmission for the UE, the first downlink data transmission preceding the second downlink data transmission; determining whether flow control feedback is disabled for the first downlink data transmission; and transmitting downlink control information scheduling the second downlink data transmission based at least in part on whether flow control feedback is disabled for the first downlink data transmission.

Aspect 87: The method of aspect 86, further comprising: determining that flow control feedback is disabled for the first downlink data transmission; and transmitting downlink control information scheduling the second downlink data transmission after a threshold amount of time after the first downlink data transmission based at least in part on the flow control feedback being disabled for the first downlink data transmission.

Aspect 88: The method of any one of aspects 86 or 87, wherein the first downlink data transmission and the second downlink data transmission are associated with a same flow control feedback process or include a same transport block.

Aspect 89: The method of any one of aspects 86 through 88, further comprising: determining that flow control feedback is disabled for the first downlink data transmission; and transmitting downlink control information scheduling the second downlink data transmission regardless of when the first downlink data transmission is scheduled and regardless of a timing for reporting flow control feedback for the second downlink data transmission.

Aspect 90: The method of aspects 86 through 89, wherein the UE and the base station are operating in an NTN.

Aspect 91: A method for wireless communications at a UE, comprising: receiving, from a base station, downlink control information scheduling a downlink data transmission; identifying a flow control feedback process associated with the downlink data transmission; determining that flow control feedback is disabled for the downlink data transmission based at least in part on the flow control feedback process associated with the downlink data transmission; and refraining from transmitting flow control feedback to the base station for the downlink data transmission based at least in part on the determining.

Aspect 92: The method of aspect 91, wherein identifying the flow control feedback process comprises: decoding a first field in the downlink control information indicating that flow control feedback is disabled for the flow control feedback process; and decoding a second field in the downlink control information indicating the flow control feedback process associated with the downlink data transmission, wherein decoding the second field is based at least in part on the first field indicating that flow control feedback is disabled for the flow control feedback process.

Aspect 93: The method of any one of aspects 91 or 92, wherein the first field comprises a flow control field.

Aspect 94: The method of any one of aspects 91 through 93, wherein the second field comprises a downlink assignment index or transmit power control field.

Aspect 95: The method of any one of aspects 91 through 94, wherein the UE and the base station are operating in an NTN.

Aspect 96: A method for wireless communications at a base station, comprising: identifying downlink data to transmit to a UE; determining to disable flow control feedback from the UE for the downlink data; identifying a flow control feedback process indicating that flow control feedback from the UE is disabled based at least in part on the determining; and transmitting downlink control information scheduling transmission of the downlink data and indicating that the downlink data is associated with the identified flow control feedback process.

Aspect 97: The method of aspect 96, wherein transmitting downlink control information indicating that the downlink data is associated with the identified flow control feedback process comprises: transmitting a first field in the downlink control information indicating that flow control feedback is disabled for the flow control feedback process; and transmitting a second field in the downlink control information indicating the flow control feedback process associated with the downlink data.

Aspect 98: The method of any one of aspects 96 or 97, wherein the first field comprises a flow control field.

Aspect 99: The method of any one of aspects 96 through 98, wherein the second field comprises a downlink assignment index or transmit power control field.

Aspect 100: The method of any one of aspects 96 through 99, wherein the UE and the base station are operating in an NTN.

Aspect 101: An apparatus for wireless communication comprising at least one means for performing a method of any one of aspects 61 through 71.

Aspect 102: An apparatus for wireless communication comprising a processor and memory coupled to the processor. The processor and memory may be configured to cause the apparatus to perform a method of any one of aspects 61 through 71.

Aspect 103: A non-transitory computer-readable medium storing code for wireless communication comprising a processor, memory coupled to the processor, and instructions stored in the memory and executable by the processor to cause the apparatus to perform a method of any one of aspects 61 through 71.

Aspect 104: An apparatus for wireless communication comprising at least one means for performing a method of any one of aspects 72 through 77.

Aspect 105: An apparatus for wireless communication comprising a processor and memory coupled to the processor. The processor and memory may be configured to cause the apparatus to perform a method of any one of aspects 72 through 77.

Aspect 106: A non-transitory computer-readable medium storing code for wireless communication comprising a processor, memory coupled to the processor, and instructions stored in the memory and executable by the processor to cause the apparatus to perform a method of any one of aspects 72 through 77.

Aspect 107: An apparatus for wireless communication comprising at least one means for performing a method of any one of aspects 78 through 85.

Aspect 108: An apparatus for wireless communication comprising a processor and memory coupled to the processor. The processor and memory may be configured to cause the apparatus to perform a method of any one of aspects 78 through 85.

Aspect 109: A non-transitory computer-readable medium storing code for wireless communication comprising a processor, memory coupled to the processor, and instructions stored in the memory and executable by the processor to cause the apparatus to perform a method of any one of aspects 78 through 85.

Aspect 110: An apparatus for wireless communication comprising at least one means for performing a method of any one of aspects 86 through 90.

Aspect 111: An apparatus for wireless communication comprising a processor and memory coupled to the processor. The processor and memory may be configured to cause the apparatus to perform a method of any one of aspects 86 through 90.

Aspect 112: A non-transitory computer-readable medium storing code for wireless communication comprising a processor, memory coupled to the processor, and instructions stored in the memory and executable by the processor to cause the apparatus to perform a method of any one of aspects 86 through 90.

Aspect 113: An apparatus for wireless communication comprising at least one means for performing a method of any one of aspects 91 through 95.

Aspect 114: An apparatus for wireless communication comprising a processor and memory coupled to the processor. The processor and memory may be configured to cause the apparatus to perform a method of any one of aspects 91 through 95.

Aspect 115: A non-transitory computer-readable medium storing code for wireless communication comprising a processor, memory coupled to the processor, and instructions stored in the memory and executable by the processor to cause the apparatus to perform a method of any one of aspects 91 through 95.

Aspect 116: An apparatus for wireless communication comprising at least one means for performing a method of any one of aspects 96 through 100.

Aspect 117: An apparatus for wireless communication comprising a processor and memory coupled to the processor. The processor and memory may be configured to cause the apparatus to perform a method of any one of aspects 96 through 100.

Aspect 118: A non-transitory computer-readable medium storing code for wireless communication comprising a processor, memory coupled to the processor, and instructions stored in the memory and executable by the processor to cause the apparatus to perform a method of any one of aspects 96 through 100.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
identifying a threshold amount of time, from reception of a first downlink data transmission, for reporting flow control feedback to a network device for the first downlink data transmission;
receiving, from the network device, the first downlink data transmission and a second downlink data transmission, the first downlink data transmission preceding the second downlink data transmission, wherein the first downlink data transmission and the second downlink data transmission are associated with a same flow control feedback process; and
based at least in part on the flow control feedback being disabled for the flow control feedback process:
decoding the second downlink data transmission when the second downlink data transmission is scheduled after the threshold amount of time from reception of the first downlink data transmission; and
refraining from decoding the second downlink data transmission when the second downlink data transmission is scheduled within the threshold amount of time from reception of the first downlink data transmission.

2. The method of claim 1, wherein the first downlink data transmission and the second downlink data transmission include a same transport block.

3. The method of claim 1, wherein the threshold amount of time is based at least in part on a numerology used for the first downlink data transmission, the second downlink data transmission, or both.

4. The method of claim 1, wherein the threshold amount of time is based at least in part on a number of symbols for the first downlink data transmission, a number of symbols for the second downlink data transmission, a demodulation reference signal pattern associated with the first downlink data transmission, a demodulation reference signal pattern associated with the second downlink data transmission, or a processing capability of the UE, or a combination thereof.

5. The method of claim 1, wherein the UE and the network device are operating in a non-terrestrial network (NTN).

6. The method of claim 1, further comprising:
receiving downlink control information scheduling the first downlink data transmission and the second downlink data transmission.

7. The method of claim 1, wherein when the flow control feedback is disabled for the flow control feedback process, the threshold amount of time for reporting flow control feedback to the network device for the first downlink data transmission is used to determine whether to decode or to refrain from decoding the second downlink data transmission.

8. The method of claim 1, further comprising:
receiving an indication that the flow control feedback is disabled for the flow control feedback process; and
determining, based at least in part on indication that the flow control feedback is disabled, to use the threshold amount of time for reporting flow control feedback to the network device for the first downlink data transmission to determine whether to decode or refrain from decoding the second downlink data transmission.

9. A method for wireless communication at a network device, comprising:
identifying a threshold amount of time, from reception of a first downlink data transmission by a user equipment (UE), for receiving flow control feedback from the UE for the first downlink data transmission;
transmitting, to the UE, the first downlink data transmission; and
based at least in part on determining that the flow control feedback is disabled for the first downlink data transmission:
determining, based at least in part on the threshold amount of time, scheduling of a second downlink data transmission;
transmitting downlink control information scheduling the second downlink data transmission after the threshold amount of time; and
transmitting the second downlink data transmission based at least in part on the threshold amount of time.

10. The method of claim 9, wherein the first downlink data transmission and the second downlink data transmission include a same transport block.

11. The method of claim 9, wherein the UE and the network device are operating in a non-terrestrial network (NTN).

12. The method of claim 9, further comprising:
transmitting the downlink control information scheduling the first downlink data transmission and the second downlink data transmission.

13. The method of claim 9, wherein when the flow control feedback is disabled for the first downlink data transmission, the threshold amount of time for receiving flow control feedback from the UE for the first downlink data transmission is used to determine whether to schedule the second downlink data transmission.

14. A method for wireless communication at a user equipment (UE), comprising:
receiving, from a network device, downlink control information scheduling a downlink data transmission, the downlink data transmission associated with a first flow control feedback process of a plurality of flow control feedback processes;
decoding a first field in the downlink control information indicating that flow control feedback is disabled for at least one flow control feedback process of the plurality of flow control feedback processes;
decoding, based at least in part on the first field indicating that flow control feedback is disabled for the at least one flow control feedback process, a second field in the downlink control information to determine the at least one flow control feedback process for which flow control feedback is disabled comprises the first flow control feedback process associated with the downlink data transmission, wherein the second field comprises a transmit power control field; and
refraining from transmitting the flow control feedback to the network device for the downlink data transmission based at least in part on the flow control feedback being disabled for the first flow control feedback process associated with the downlink data transmission.

15. The method of claim 14, wherein the first field comprises a flow control field.

16. The method of claim 14, wherein the UE and the network device are operating in a non-terrestrial network (NTN).

17. A method for wireless communication at a network device, comprising:
transmitting, to a user equipment (UE), a first field in downlink control information indicating that flow control feedback is disabled for at least one flow control feedback process of a plurality of flow control feedback processes, wherein the downlink control information schedules transmission of downlink data and indicates that the downlink data is associated with a first flow control feedback process of the plurality of flow control feedback processes; and
transmitting, based at least in part on the first field indicating that flow control feedback is disabled for the at least one flow control feedback process, a second field in the downlink control information indicating that the first flow control feedback process associated with the downlink data is disabled, wherein the second field comprises a transmit power control field.

18. The method of claim 17, wherein the first field comprises a flow control field.

19. The method of claim 17, wherein the UE and the network device are operating in a non-terrestrial network (NTN).

20. A method for wireless communication at a user equipment (UE), comprising:
identifying a first timing, from reception of a first downlink data transmission, for reporting flow control feedback to a network device for the first downlink data transmission;
receiving, from the network device, the first downlink data transmission, wherein the flow control feedback is disabled for the first downlink data transmission;
refraining from reporting the flow control feedback for the first downlink data transmission based at least in part on the flow control feedback being disabled for the first downlink data transmission;
receiving a second downlink data transmission scheduled after the first downlink data transmission; and
when the flow control feedback is disabled for the first downlink data transmission, refraining from decoding the second downlink data transmission when the second downlink data transmission is received before the first timing and a second timing, from reception of the second downlink data transmission, for reporting the flow control feedback to the network device for the second downlink data transmission, is before the first timing.

21. The method of claim 20, the first downlink data transmission scheduled by first downlink control information, and the second downlink data transmission scheduled by second downlink control information.

22. The method of claim 20, further comprising:
receiving, in downlink control information, an indication of the first timing for reporting the flow control feedback to the network device for the first downlink data transmission.

23. The method of claim 20, further comprising:
receiving, in radio resource control signaling, a plurality of timings for reporting the flow control feedback to the network device for the first downlink data transmission.

24. The method of claim 23, further comprising:
selecting the first timing for reporting the flow control feedback to the network device for the first downlink data transmission from the plurality of timings in the radio resource control signaling.

25. The method of claim 24, wherein the selected timing is a maximum, minimum, or a first timing of the plurality of timings in the radio resource control signaling, or the selected timing of the plurality of timings is indicated by another parameter.

26. The method of claim 24, wherein the selected timing is based at least in part on a flow control feedback round trip time configured in the radio resource control signaling.

27. The method of claim 20, wherein the first timing for reporting the flow control feedback to the network device for the first downlink data transmission is preconfigured at the UE.

28. The method of claim 27, wherein the first timing for reporting the flow control feedback to the network device for the first downlink data transmission is based at least in part on a subcarrier spacing configured for the first downlink data transmission.

29. The method of claim 20, wherein the UE and the network device are operating in a non-terrestrial network (NTN).

30. The method of claim 20, further comprising:
receiving downlink control information scheduling the first downlink data transmission.

31. The method of claim 20, further comprising:
identifying the second timing, from reception of the second downlink data transmission, for reporting the flow control feedback to the network device for the second downlink data transmission.

32. A method for wireless communication at a network device, comprising:
identifying a timing, from reception of a first downlink data transmission by a user equipment (UE), for reporting flow control feedback to the network device for the first downlink data transmission;
transmitting, to the UE, the first downlink data transmission, wherein the flow control feedback is disabled for the first downlink data transmission; and
when the flow control feedback is disabled for the first downlink data transmission:
determining, based at least in part on the timing, whether to schedule a second downlink data transmission for the UE; and
transmitting, to the UE, an indication of the timing for reporting the flow control feedback to the network device for the first downlink data transmission.

33. The method of claim 32, the transmitting the indication of the timing comprising:
transmitting, in downlink control information, the indication of the timing for reporting the flow control feedback to the network device for the first downlink data transmission.

34. The method of claim 32, the transmitting the indication of the timing comprising:
transmitting, in radio resource control signaling, a plurality of timings for reporting the flow control feedback to the network device for the first downlink data transmission.

35. The method of claim 32, wherein the timing for reporting the flow control feedback to the network device for the first downlink data transmission is preconfigured at the network device.

36. The method of claim 35, wherein the timing for reporting the flow control feedback to the network device for the first downlink data transmission is based at least in part on a subcarrier spacing configured for the first downlink data transmission.

37. The method of claim 32, wherein the UE and the network device are operating in a non-terrestrial network (NTN).

38. The method of claim 32, further comprising:
transmitting downlink control information scheduling the first downlink data transmission to the UE.

39. The method of claim 32, further comprising:
transmitting, to the UE, an indication of a second timing, from reception of the second downlink data transmission by the UE, for reporting the flow control feedback to the network device for the second downlink data transmission.

40. An apparatus for wireless communication at a user equipment (UE), comprising:
a processor;
memory coupled with the processor; and
instructions stored in the memory and executable by the processor to cause the apparatus to:
identify a threshold amount of time, from reception of a first downlink data transmission, for reporting flow control feedback to a network device for the first downlink data transmission;
receive, from the network device, the first downlink data transmission and a second downlink data transmission, the first downlink data transmission preceding the second downlink data transmission, wherein the first downlink data transmission and the second downlink data transmission are associated with a same flow control feedback process; and
based at least in part on the flow control feedback being disabled for the flow control feedback process:
decode the second downlink data transmission when the second downlink data transmission is scheduled after the threshold amount of time from reception of the first downlink data transmission; and
refrain from decoding the second downlink data transmission when the second downlink data transmission is scheduled within the threshold amount of time from reception of the first downlink data transmission.

41. The apparatus of claim 40, wherein the first downlink data transmission and the second downlink data transmission include a same transport block.

42. The apparatus of claim 40, wherein when the flow control feedback is disabled for the flow control feedback process, the threshold amount of time for reporting flow control feedback to the network device for the first downlink data transmission is used to determine whether to decode or to refrain from decoding the second downlink data transmission.

43. The apparatus of claim 40, wherein the instructions are further executable by the processor to cause the apparatus to:
receive an indication that the flow control feedback is disabled for the flow control feedback process; and
determine, based at least in part on indication that the flow control feedback is disabled, to use the threshold amount of time for reporting flow control feedback to the network device for the first downlink data transmission to determine whether to decode or refrain from decoding the second downlink data transmission.

* * * * *